(12) United States Patent
Furukawa et al.

(10) Patent No.: US 6,739,929 B2
(45) Date of Patent: May 25, 2004

(54) METHOD AND APPARATUS FOR PRODUCING A DISPLAY PANEL, METHOD FOR ADHERING AN ADHESIVE SHEET AND METHOD FOR ADHERING PLATES

(75) Inventors: Keiichi Furukawa, Osaka (JP); Masakazu Okada, Osaka (JP); Tatsuo Taniguchi, Osaka (JP); Masanori Negoro, Osaka (JP); Masashi Nishikado, Osaka (JP); Hideo Hotomi, Osaka (JP)

(73) Assignee: Minolta Co., Ltd., Osaka (JP)

( * ) Notice: Subject to any disclaimer, the term of this patent is extended or adjusted under 35 U.S.C. 154(b) by 28 days.

(21) Appl. No.: 09/821,174

(22) Filed: Mar. 29, 2001

(65) Prior Publication Data

US 2001/0053648 A1 Dec. 20, 2001

(30) Foreign Application Priority Data

| Mar. 31, 2000 | (JP) | 2000-096542 |
| Mar. 31, 2000 | (JP) | 2000-096545 |
| Mar. 31, 2000 | (JP) | 2000-096546 |
| Mar. 31, 2000 | (JP) | 2000-096614 |
| Mar. 31, 2000 | (JP) | 2000-096620 |
| Mar. 31, 2000 | (JP) | 2000-098095 |

(51) Int. Cl.[7] .................................................. H01J 9/24
(52) U.S. Cl. ......................................................... 445/24
(58) Field of Search ....................................... 445/23, 24

(56) References Cited

U.S. PATENT DOCUMENTS 4,952,459 A * 8/1990 Thatcher ..................... 428/426
5,426,522 A * 6/1995 Takahara et al. .............. 349/92
5,853,446 A * 12/1998 Carre et al. .................. 65/17.3

FOREIGN PATENT DOCUMENTS

JP        11-249152 A     9/1999

* cited by examiner

Primary Examiner—Tho D. Ta
Assistant Examiner—James R. Harvey
(74) Attorney, Agent, or Firm—Sidley Austin Brown & Wood LLP

(57) ABSTRACT

A first panel element and a second panel element, each having at least one display layer, are positioned and opposed to each other. The elements are progressively adhered from a staring position with an adhesive material supplied beforehand. Examples of the adhesive material include those which are in a liquid state before curing (such as photocuring adhesive materials), and also include adhesive sheets. The adhesive material having fluidity can be spread between the two panel elements in the adhering step.

3 Claims, 41 Drawing Sheets

Fig.9
(5)
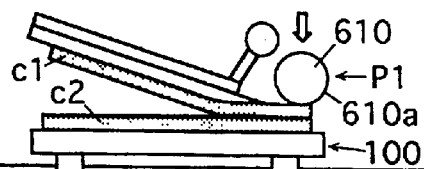
(6)
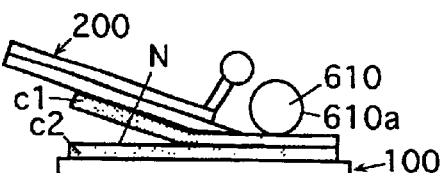
(7)
(8)
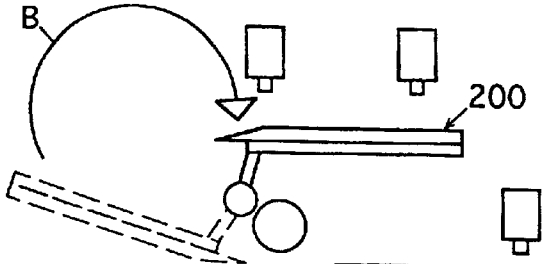

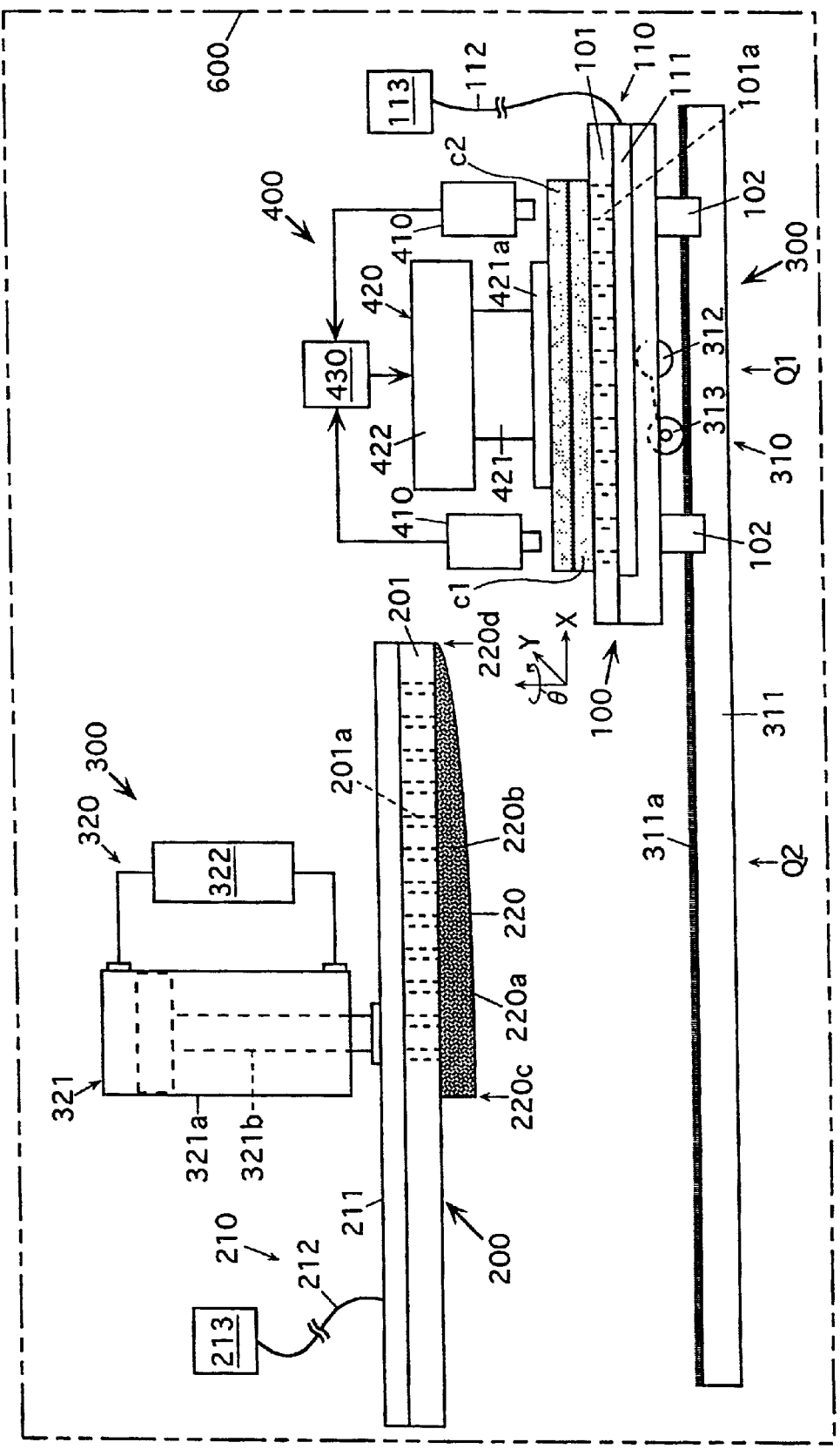
Fig.1.5

Fig.31
(1)
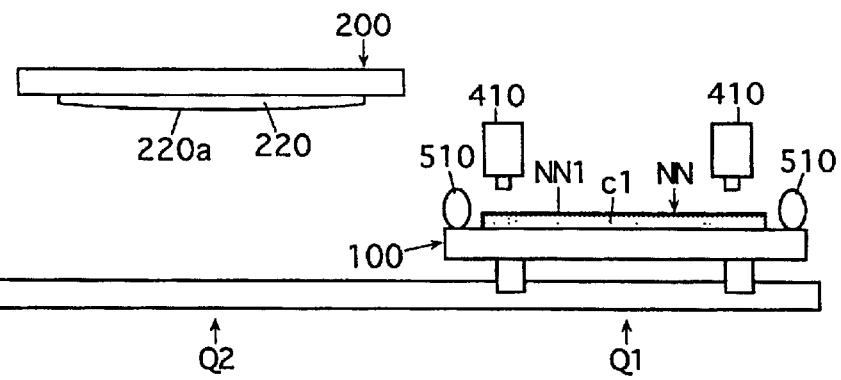
(2)
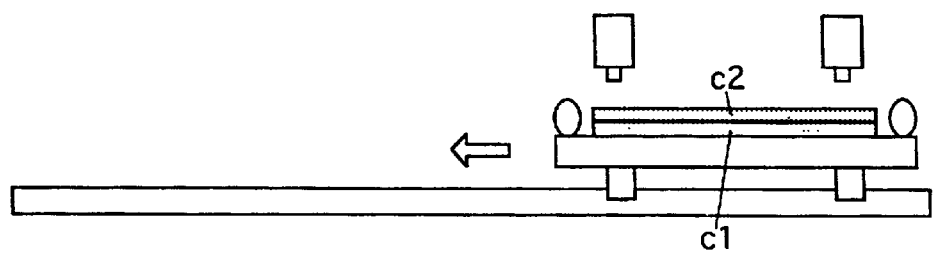
(3)
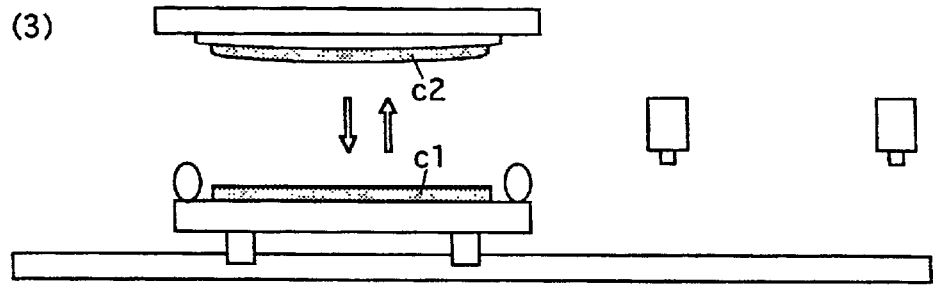
(4)
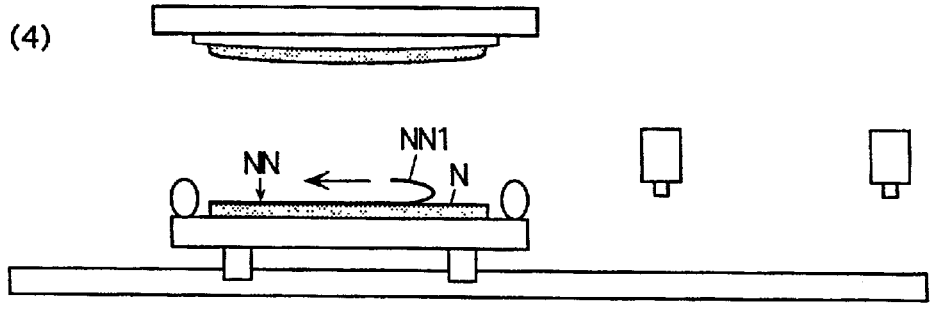

METHOD AND APPARATUS FOR PRODUCING A DISPLAY PANEL, METHOD FOR ADHERING AN ADHESIVE SHEET AND METHOD FOR ADHERING PLATES

This invention is based on patent application Nos. 2000-96620 Pat., 2000-96614 Pat., 2000-98095 Pat., 2000-96542 Pat., 2000-96545 Pat. and 2000-96546 Pat., filed in Japan, the contents of which are hereby incorporated by reference.

BACKGROUND OF THE INVENTION

1. Field of the Invention

The present invention relates to a method and apparatus for producing a display panel for display of images. This invention also concerns with a method for adhering an adhesive sheet and with a method for adhering plates, these methods being applicable to the methods for producing a display panel.

2. Description of the Background Art

A wide variety of image display panels are available, and include liquid crystal display panels, electroluminescence display panels, display panels comprising a combination of these panels, and the like.

Such image display panels include those comprising a layer of panel element and those comprising layered panel elements.

For example, display panels for display of color images are available which are formed by layering a plurality of panel elements for display of images in different colors.

Liquid crystal display panels for display of images in multi-colors include, for example, those formed by layering a panel element for blue display, a panel element for green display and a panel element for red display to give a display panel which can perform display of images in full colors.

In any case, when an image display panel is formed by layering a plurality of panel elements, it is required to adhere together adjacent panel elements for performing the desired image display. More specifically, it is necessary to meet at least one of the requirements: (1) adjacent panel elements should be adhered to each other after alignment, (2) the panel elements should be adhered together in close contact, and (3) the panel elements should be adhered together in a manner to avoid creation of wrinkles.

Generally an adhesive sheet is often used to fix two plates. When a display panel is produced by layering a plurality of panel elements, adjacent panel elements may be adhered together by interposing an adhesive sheet between these elements.

When panel elements or other plates are fixed to each other with an adhesive sheet interposed therebetween as in the above case, an adhesive sheet having separators each on respective sides may be used as follows. After removing a separator from one side of the adhesive sheet, the adhesive sheet is fixed to a first plate placed on a flat plate. Thereafter, a second plate is fixed to the adhesive sheet after removing the other separator from the other side of the adhesive sheet.

In this operation, however, when the adhesive sheet is fixed to the first plate on the flat plate, air bubbles may be readily generated therein. It is difficult to eliminate the air bubbles once generated therein. The fixing operation may be conducted in a chamber having a reduced pressure to prevent the inclusion of air bubbles, but this procedure incurs a high cost.

SUMMARY OF THE INVENTION

An object of the present invention is to provide a method and apparatus for producing a display panel for display of images, the method and apparatus being capable of adhering the adjacent panel elements in the required state and capable of producing a display panel which can perform the display of better images.

Stated more specifically, another object of the invention is to provide a method and apparatus for producing a display panel by layering panel elements for forming a display panel for display of images, the method and apparatus being capable of producing a display panel in such manner that adjacent panel elements are adhered together as accurately aligned, so that the display of better images can be performed.

A further object of the invention is to provide a method and apparatus for producing a display panel for display of images by layering panel elements for forming a display panel for display of images, the method and apparatus being capable of producing a display panel in such manner that adjacent panel elements are adhered together in a state free of air bubbles between the two panel elements so that they can be adhered together in a state free of wrinkles and the display of better images can be performed.

A still further object of the invention is to provide a method and apparatus for producing a display panel by layering panel elements for forming a display panel for display of images, the method and apparatus being capable of producing a display panel in such manner that adjacent panel elements can be firmly adhered to each other so that the display panel can stably perform the display of better images for a prolonged period.

An additional object of the invention is to provide a method for adhering an adhesive sheet and a method for adhering plates, the methods being applicable to the production of display panels and for other purposes, the methods in which the adhesive sheet can be adhered to the plate in a manner to prevent the entry of air bubbles therebetween and the plates can be adhered together with the adhesive sheet interposed between the plates in a manner to prevent entry of air bubbles therebetween.

The present invention basically provides the following first to fourth types of methods and the following apparatus for producing a display panel. The present invention also provides the apparatuses to be described later. This invention also provides the following first to third types of methods for adhering an adhesive sheet and the following first to third types of methods for adhering plates.

(1) Methods for Producing a Display Panel (1-1) First Type Method for Producing a Display Panel The first type method for producing a display panel for display of images comprises the steps of:

opposing a first panel element and a second panel element, each having at least one display layer, with positioning the first and second panel elements relatively to each other (panel-opposing step); and progressively adhering, after the panel-opposing step, the first and second panel elements from a starting position with an adhesive material (panel-adhering step).

(1-2) Second Type Method for Producing a Display Panel

The second type method for producing a display panel for display of images comprises the steps of: bringing a first panel element and a second panel element, each having at least one display layer, to an opposed position; adhering the first and second panel elements with an uncured adhesive material; relatively moving the first and second panel elements to position them; and curing the adhesive material after positioning the panel elements.

(1-3) Third Type Method for Producing a Display Panel

The third type method for producing a display panel for display of images comprises the steps of: supplying an adhesive material on at least one of first and second panel elements; positioning the first and second panel elements and placing them in an opposed position; splicing under pressure (pressure-splicing) the first and second panel elements with the adhesive material interposed between them under a first condition (first pressure-splicing step); and splicing under pressure (pressure-splicing) the first and second panel elements with the adhesive material under a second condition different from the first condition (second pressure-splicing step).

(1-4) Fourth Type Method for Producing a Display Panel

The fourth type method for producing a display panel for display of images comprises the steps of: causing a first stage to hold a first panel element; causing a second stage to hold a second panel element; placing the first and second panel elements held on the first and second stages, respectively in opposed positions; positioning the first and second panel elements relative to each other; supplying an adhesive material to at least one of the first and second panel elements; splicing under pressure (pressure-splicing) the positioned first and second panel elements held by the first and second stages with an adhesive material interposed between the panel elements under a first condition in such manner that the first and second panel elements are pressure-spliced as interposed between the first and second stages (first pressure-splicing step); and splicing under pressure (pressure-splicing) the first and second panel elements with the adhesive material under a second condition different from the first condition in such manner that the first and second panel elements are pressure-spliced as interposed between the first and second stages (second pressure-splicing step).

(2) Apparatus for Producing a Display Panel

The apparatus for producing a display panel comprises: a first stage for holding a panel element; a second stage for holding another panel element; a stage-driving device for driving at least one of the first and second stages to relatively move the first and second stages to positions closer to each other or away from each other with panel element-holding surfaces of the stages as opposed, wherein at least one of the first and second stages has an elastic pad having a panel element-holding surface, and the panel element-holding surface of the pad has a convex curved face, and wherein the stage-driving device is such that when the first and second stages are relatively moved closer to each other, the panel element held by the first stage and the panel element held by the second stage are spliced to each other under a first pressure and are further spliced to each other under a specific second pressure higher than the first pressure.

(3) Method for Adhering an Adhesive Sheet (3-1) First Type Method for Adhering an Adhesive Sheet A first type method for adhering an adhesive sheet is a method for adhering an adhesive sheet to a plate, the method comprising the steps of: relatively positioning one end of a plate and one end of an adhesive sheet at which through-holes are formed; and adhering the adhesive sheet to the plate progressively from the end toward the other end of the sheet while holding the other end of the adhesive sheet as spaced away from the plate.

(3-2) Second Type Method for Adhering an Adhesive Sheet

The second type method for adhering an adhesive sheet is a method for adhering an adhesive sheet to a plate, the method comprising the steps of: relatively positioning one end of a plate and one end of an adhesive sheet having through-holes and wound into a roll; and rollingly moving the wound adhesive sheet from the end of the plate toward the other end thereof on the plate to adhere the adhesive sheet to the Plate (3-3) Third Type Method for Adhering an Adhesive Sheet The third type method for adhering an adhesive sheet is a method for adhering an adhesive sheet to a plate, the method comprising the steps of: providing an adhesive sheet having a groove on one surface of the sheet, at least one end of the groove extending to one side of the sheet; adhering the adhesive sheet to a plate in a manner such that the surface of the sheet having the groove is opposed to the plate; and pressing the adhesive sheet as adhered to the plate.

(4) Method for Adhering Plates (4-1) First Type Method for Adhering Plates

The first type method for adhering plates comprises the steps of: relatively positioning one end of a first plate and one end of an adhesive sheet having through-holes; adhering the adhesive sheet to the first plate from the end toward the other end of the sheet while holding the other end of the adhesive sheet as spaced away from the first plate; and adhering a second plate to the adhesive sheet with the adhesive sheet.

(4-2) Second Type Method for Adhering Plates

The second type method for adhering plates comprises the steps of: relatively positioning one end of a first plate and one end of an adhesive sheet having through-holes and wound into a roll; rollingly moving the wound adhesive sheet on the first plate from the end of the first plate toward the other end thereof to adhere the adhesive sheet to the first plate; and adhering a second plate to the adhesive sheet via the adhesive sheet.

(4-3) Third Type Method for Adhering Plates

The third type method for adhering plates comprises the steps of: providing an adhesive sheet having a groove on one surface of the sheet, at least one end of the groove extending to one side of the sheet; adhering the adhesive sheet to a first plate in a manner so that the surface of the sheet having the groove is opposed to the plate; adhering a second plate to the adhesive sheet; and applying pressure to the adhesive sheet fixed to the first plate.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a view for describing the steps (5) to (8) subsequent to the steps shown in FIG. 8.

FIG. 15 schematically shows a structure of another example of an apparatus for producing the liquid crystal display panel shown in FIG. 1.

FIG. 31 is a view for describing the steps (1) to (4) in an example of steps for producing a liquid crystal display panel by the apparatus for producing the liquid crystal display panel shown in FIG. 30.

DESCRIPTION OF PREFERRED EMBODIMENTS

Figure 1:
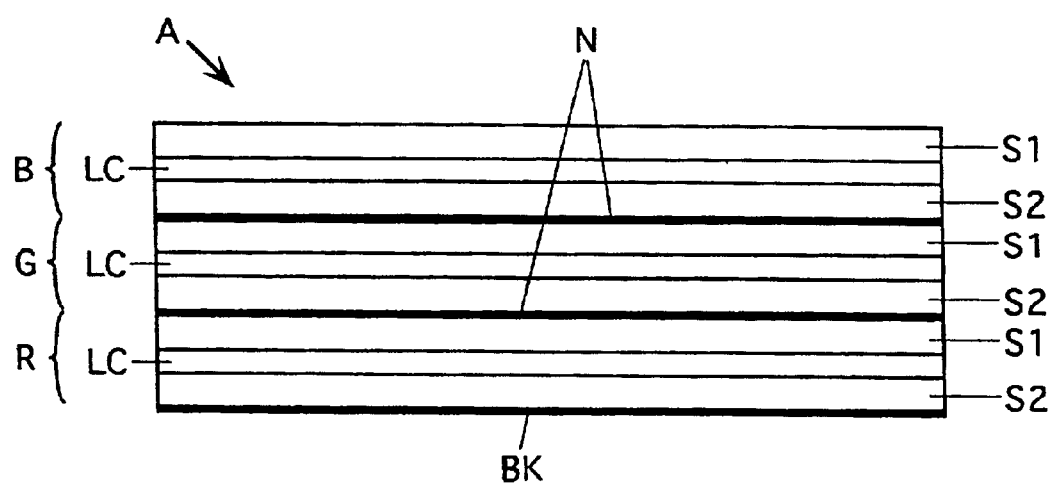
FIG. 1 is schematic side view showing an example of a liquid crystal display panel to be produced.

A method for producing a display panel which is one of preferred embodiments of the invention includes the steps of opposing a first and second panel elements, each having at least one display layer, with positioning the first and second panel elements relatively to each other (panel-opposing step); and progressively adhering, after the panel-opposing step, the first and second panel elements from a starting position with an adhesive material interposed between them (panel-adhering step).

The panel-opposing step may include the steps of causing a first stage to hold the first panel element with positioning the first panel element and causing a second stage to hold the second panel element with positioning the second panel element.

The panel-opposing step may further include the step of disposing the adhesive material on at least one of the first panel element held by the first stage and the second panel element held by the second stage.

In this case, the panel-opposing step may additionally include the step of moving at least one of the first and second stages to bring the first and second panel elements to a face-to-face position with the adhesive material interposed between them.

The adhering of first and second panel elements in the panel-adhering step can be carried out by, for example, pressing a pressing member against the first stage at the starting position via the first and second panel elements, and relatively moving the pressing member relative to the first stage.

In this case, the second panel element may be separated from the second stage when relatively moving the pressing member relative to the first stage in adhering the first and second panel elements.

The panel-adhering step may include the steps of moving at least one of the first and second stages to position the first and second panel elements and superimpose them over each other (panel-superimposing step); at least partially separating the first and second panel elements positioned and superimposed over each other (panel-separating step); supplying the adhesive material between the first and second panel elements thus separated; and progressively adhering the first and second panel elements thus separated from the starting position via the adhesive material interposed between them (separated panel-adhering step).

In this case, in the panel-separating step, it is desirable to separate the first and second panel elements at least so partially as to reproduce the state that the first and second panel elements are positioned and superimposed.

In the panel-separating step, for example, the first and second panel elements can be separated while the first and second panel elements are held as superimposed in the vicinity of the starting position.

In this case, the first and second panel elements can be held as superimposed, for example, by use of through-holes each formed in the first and second panel elements, respectively.

In the panel-separating step, the first and second panel elements may be at least partially separated from each other, for example while the second panel element is held by a holding member having a panel-holding convex-curved surface, and in the separated panel-adhering step, the first and second panel elements may be adhered together, for example, by pressing the second panel element held by the holding member against the first panel element by the holding member.

In any case, the first panel element can be adhered to the second panel element in the panel-adhering step, for example, by initially pressing one of the first and second panel elements against the other element at the starting position, and gradually extending a region to be pressed from the starting position.

In this case, an elastic pad having a convex curved surface for pressing the element may be used to press one of the two panel elements against the other element.

In this case, the elastic pad is formed preferably of an elastic body having an elastic coefficient of 60 kgf/cm$^2$ to 200 kgf/cm$^2$. The pressing surface of the elastic pad has preferably a radius of curvature in the range of 2000 mm to 5000 mm.

In any case, the starting position may be located typically on ends of the first and second panel elements or in the center thereof.

In any case, it is preferred to adhere the first panel element to the second panel element in the panel-adhering step in an atmosphere of reduced pressure. The pressure in the atmosphere of reduced pressure is, e.g. in the range of 13 Pa to 14 Pa.

The method for producing a display panel which is another preferred embodiment includes the steps of bringing first and second panel elements, each having at least one display layer, to an opposed position (panel-opposing step); adhering the first and second panel elements with an uncured adhesive material interposed between them (panel-adhering step); relatively moving the first and second panel elements adhered together to position them (panel-positioning step); curing the adhesive material after the panel-positioning step (adhesive material-curing step).

In the panel-adhering step, typically the first and second panel elements can be adhered together progressively from a starting position with the adhesive material interposed between them.

In this case, it is preferable to spread the adhesive material in adhering the first and second panel elements.

A typical example of the starting position in the panel-adhering step include ends of the first and second panel elements.

In the panel-adhering step, the first and second panel elements may be adhered together, for example, by pressing the second panel element held by a holding member having a convex curved panel-holding surface against the first panel element by the holding member.

In any case, the panel-opposing step may include the step of positioning the first panel element and causing a first stage to hold the first panel element; the step of positioning the second panel element and causing a second stage to hold the second panel element; and the step of moving at least one of the first and second stages to bring the first and second panel elements to a face-to-face position.

When the first and second panel elements are adhered in the panel-adhering step, the second panel element may be separated from the second stage.

In any case, examples of the adhesive material include photo-curing adhesive materials which is irradiated with light in the adhesive material-curing step.

In any case, the panel-adhering step is preferably carried out in an atmosphere of reduced pressure.

The foregoing embodiments of he invention and other embodiments thereof will be described with reference to the drawings.

In the following description and drawings, like parts and like portions will be indicated with like reference numerals or so by utmost efforts, but it is possible that different parts or portions may be indicated with like reference numerals or so. Therefore the following description should be understood substantially from the drawings and the related elucidation.

[A] Method and Apparatus for Producing a Display Panel Relating to FIGS. 1 to 14(D)

The method and apparatus for producing a display panel relating to FIGS. 1 to 14(D) are based on at least one of following (A-1) type to (A-4) type of methods and apparatuses for producing a display panel.

[A-1]

(A-1) Type Method for Producing a Display Panel

The method is to produce a display panel by layering panel elements for forming a display panel for display of images, and includes the steps of positioning a first panel element in a first stage and causing the first stage to hold the first panel element; positioning a second panel element in a second stage and causing the second stage to hold the second panel element; supplying an adhesive material to at least one of the surfaces to be adhered of the first and second panel elements; moving at least one of the first stage holding the first panel element and the second stage holding the second panel element to bring the first and second panel elements in a face-to-face position, superimposing the specified ends of the two panel elements, and holding the ends of the panel elements as superimposed; and adhering the two panel elements progressively from the ends thereof held as superimposed toward the entire area via the adhesive material.

In the step of adhering the two panel elements in the method, for example, using a pressing member for pressing the two panel elements against the first stage, the two panel elements may be adhered by moving the first stage relative to the pressing member while maintaining the two panel elements as pressed by the pressing member.

In this case, the pressing member may also serve as means for holding the superimposed ends of the two panel elements as pressed against the first stage. It is a matter of course that means for holding the superimposed ends of the two panel elements as pressed against the first stage may be provided in addition to the pressing member.

In either case, the pressing member may have a convex curved surface for pressing the panel elements and the panel element-pressing surface may be relatively rolled against the panel element in the panel-adhering step, whereby the panel-adhering step can be smoothly carried out. Typical examples of the pressing member having the convex curved panel element-pressing surface are pressing rollers having a circular section. A pressing member having a panel element-pressing surface showing an arc or a sector profile when viewed from the side surface can be also used. When a pressing roller having a circular section is used, the so-called inverted-crown shaped press roller having a central portion smaller in diameter than end portions may be used to avoid creation of wrinkles in the panel element by compression with the pressing member.

For example, the following method for producing a display panel using the pressing member can be mentioned.

In the step of moving at least one of the first stage holding the first panel element and the second stage holding the second panel element to bring the first and second panel elements into the face-to-face position, and superimposing the specified ends of the two panel elements and holding the ends of the panel elements as superimposed, the ends of the panel elements are held as superimposed by the pressing member which presses the panel elements against the first stage.

In the panel elements-adhering step in which the two panel elements are adhered, via the adhesive material, from the superimposed ends of the elements progressively over the entire area, the first stage having the ends of panel elements pressed by the pressing member is moved relative to the pressing member and the second stage while the panel elements are held as pressed by the pressing member. At that time, while the second panel element is drawn from the second stage, the two panel elements are progressively adhered together on the first stage with the adhesive material.

When the pressing member having a convex curved surface for pressing the panel element is used in this method, the panel element-pressing surface can be relatively rolled against the panel element in the panel-adhering step, whereby the two panel elements can be smoothly adhered together.

In any case, in the step of causing the second stage to hold the second panel element, the second panel element may be held by the second stage with the end of the second panel element projected from the second stage, in order to make it easy to carry out the step of holding the specified ends of the two panel elements as superimposed, which step is conducted later.

In any of the foregoing methods for producing a display panel, the first and second panel elements may be held by the first and second stages, respectively, e. g., typically by sucking air through perforations formed in the stage for suction of air to draw and hold the panel element onto the stage, although not limited thereto.

In any of the foregoing producing methods, the first and second panel elements can be relatively positioned by various methods, for example, by per se known methods of positioning or aligning a substrate or a panel.

Examples of positioning methods are as follows.

First, register marks for positioning the first and second panel elements are formed on the first and second stages so that at a later step, the superimposed ends of the first and second panel elements are held and the panel elements are adhered in a state in which the first and second panel elements are precisely positioned or aligned. Further, a register mark to be in register with the register mark on the first stage is formed on the first panel element while a register mark to be in register with the register mark on the second stage is formed on the second panel element:

(a1) the corresponding panel element is disposed on each stage, and is manually moved for alignment while visually inspecting or observing through a camera the register marks on the stage and panel element; or (b1) the corresponding panel element is placed on or above each stage and is manually moved for alignment with use of X-Y-θ drive device while visually inspecting or observing through a camera the register marks on the stage and panel element. When the corresponding panel element is disposed above each stage for positioning, the panel element is placed on each stage after completion of alignment.

Optionally the following method is also available. The stage is provided with a holding member for holding a panel element which enables X-Y-θ drive, and the holding member is permitted to hold a panel element having a register mark. The holding member is moved by X-Y-θ drive device to achieve positioning of the panel element while the register mark on the panel element is observed through a camera. In this case, the panel element positioning is conducted so that the ends of the first and second panel elements are superimposed and held, and the adhering step are carried out later in the precisely positioned state of the two panel elements.

In any case, the alignment with use of X-Y-θ drive device may be conducted by manually operating the X-Y-θ drive device. Optionally the operation of X-Y-θ drive device may be controlled so as to position the panel element according to the mark data (e.g. information on the position) obtained by inspection with a camera. In the latter case, an image processing method for alignment of substrates, panels and the like can be employed.

The X-Y-θ drive device is, needless to say, capable of moving an object in a direction X and in a direction Y vertical to that and rotating the object about an axis vertically of X-Y planar surface.

The register marks include, for example, liquid crystal marks, electroluminescence marks and the like, which emit light rays on application of electric power.

The step of applying an adhesive material onto at least one of surfaces to be adhered of the first and second panel elements may be, for example, the step of removing a protective sheet from pressure sensitive adhesive double-coated sheet (or tape) or adhesive sheet (or tape) adhered to the surface of panel element to expose the adhesive surface, or the step of applying an adhesive material to the panel element surface by hands or by an applicator for applying the adhesive material. The adhesive material may be applied or supplied by any optional methods which are not problematic. When applied, the adhesive material may be applied to one of the two panel elements over its entire surface area. The adhesive material may be supplied to one of the panel elements by placing the adhesive material on the starting end or any other suitable part and spreading the material into between the two panel elements with the progress of adhering operation.

The step of applying or supplying the adhesive material is carried out prior to superimposition of the specified ends of two panel elements, and may be done at any stage insofar as it is conducted prior to superimposition of the specified ends of two panel elements.

When three or more panel elements are layered, the panel elements adhered by the adhering step may be regarded as the first panel element and a panel element to be adhered next may be regarded as the second panel element. In this way, new panel elements may be adhered, one by one, to the previously adhered panel elements substantially by repeating the foregoing respective steps.

(A-1) Type Apparatus for Producing a Display Panel

Typical example of the apparatus capable of carrying out the above-mentioned (A-1) type method for producing a display panel is as described below.

An apparatus for producing a display panel comprising layered panel elements for forming a display panel for display of images is provided, the apparatus comprising: a first stage for holding a first panel element; a device for positioning the first panel element on the first stage; a second stage disposed in a specified positional relationship with the first stage and holding the second panel element; a device for positioning the second panel element on the second stage; a first drive device for relatively moving the first and second stages to bring to an opposed position the first and second panel elements held on the first and second stages, respectively after positioning and to superimpose the specified ends of the first and second panel elements; a pressing member for holding the specified ends of the first and second panel elements as pressed against the first stage, the first and second panel elements being held on the first and second stages, respectively and having the specified ends superimposed; and a second drive device for moving, relatively to the pressing member and the second stage, the first stage against which the ends of two panel elements are pressed by the pressing member, while maintaining the state of the panel elements as pressed by the pressing member and while drawing off the second panel element from the second stage in a manner such that the two panel elements are progressively adhered to each other on the first stage under pressure by the pressing member.

In the apparatus, the pressing member may have a convex curved surface for pressing the panel element. The panel element-pressing surface of the pressing member is one capable of rolling over the panel elements relatively, in the step of progressively adhering the two panel elements on the first stage.

Typical example of the pressing member having the convex curved panel element-pressing surface is a pressing roller with a circular section. It is possible to use a pressing member having a panel element-pressing surface with an arc or sector profile when viewed from the side surface or the like. When a pressing roller with a circular section is used, an inverted-crown shaped pressing roller with the central portion smaller in diameter than the end portions may be used to avoid creation of wrinkles in the panel element by compression with the pressing member.

According to this apparatus, the first panel element and the second panel element are held by the first and second stages, respectively by positioning the panel elements in these stages by positioning devices.

An adhesive material is set in at least one of surfaces of the first and second panel elements to be adhered together.

Thereafter the first and second stages are relatively moved by the first drive device to bring the two panel elements to an opposed position and superimpose the specified ends of the panel elements.

The superimposed ends of the panel elements are held on the first stage by the pressing member.

Then, the first and second stages and the pressing member are co-relatively moved by the second drive device so that the two panel elements as pressed by the pressing member are successively adhered with the adhesive material while maintaining the state of the two panel elements being pressed by the pressing member and pulling the second panel element from the second stage.

The first and second stages include a device for holding the panel element, respectively. Useful holding device includes, for example, perforations for suction of air to draw and hold the panel element onto the stage, which are formed in the stage and connected with an exhausting device, although not limited thereto.

The adhesive material can be arranged or supplied in the same manner as described concerning the method for producing a display panel. The apparatus for producing a display panel may include a device for applying an adhesive material.

The device for positioning panel element on the corresponding stage may include the following.

(a1')

Register marks on the first and second stages, the marks being located by being positioned such that, in later step, the superimposed ends of the two panel elements can be held and the two panel elements can be adhered together after the two panel elements have been precisely positioned.

Employing such register marks, the panel elements are positioned on the respective stages as described in the example (a) of positioning methods in said method for producing a display panel.

(b1')

A positioning device including a camera for inspection of register mark(s) and a X-Y-θ drive device for making a positional adjustment in a way described above in the example (b) of positioning methods in said method for producing a display panel to allow the panel element to be held by the stage and laid on or above the stage to correspond with the register mark on the stage as mentioned above in (a1'). The positioning device may further include a controller for control of the operation of X-Y-θ drive device in a manner to position the panel element based on the information of register mark(s) (such as positional information) from the camera.

The following positioning device can also be used. A positioning device is available which includes a holding member provided on the stage for holding a panel element, a X-Y-θ drive device for driving the holding member, a camera for detecting the register mark(s) of the panel element held by the holding member, and a controller for control of the operation of X-Y-θ drive device in a manner to position the panel element based on the information of register mark(s) from the camera.

The first drive device and second drive device may have a partially common structure. Further, one of them may be a constituent of the other.

When three or more panel elements are layered, the panel elements adhered by the adhering step may be regarded as the first panel element and a panel element to be adhered next may be regarded as the second panel element. In this way, new panel elements may be adhered, one by one, to the previously adhered panel elements substantially by repeating the foregoing respective steps.

[A-2]

(A-2) Type Method for Producing a Display Panel

The method is to produce a display panel by layering panel elements for forming a display panel for display of images, and includes the steps of allowing a first stage to hold a first panel element; overlaying a second panel element on the first panel element held by the first stage; positioning the second panel element relative to the first panel element; causing a convex curved panel element-pressing surface of specified curvature of a second stage to hold the second panel element, after positioning, over the first panel element on the first stage; applying an adhesive material onto at least one of surfaces to be adhered of the first and second panel elements; and adhering the second panel element to the first panel element via the adhesive material progressively from one end of the second panel element to the other end thereof for complete splicing of the two panel elements by relatively rolling under pressure the panel element-pressing surface of the second stage holding the second panel element on the first stage with the first and second panel elements sandwiched therebetween.

In this method for producing a display panel, each of the panel elements may be held by the corresponding stage otherwise or in a manner not limited to the manner described above. In typical example of holding the panel element on the stage, inlet perforations are formed in the stage for suction of air to hold the panel element by suction of air. The first and second panel elements can be relatively positioned or aligned by various methods, for example, by per se known methods of positioning a substrate or a panel.

Examples of positioning methods are as follows.

(a2) Register marks are formed on respective panel elements. After the first panel element is held in a specified position of the first stage, the second panel element is set on or above the first panel element, and the register marks of the two panel elements are visually inspected or observed through a camera so that the second panel element is manually moved to achieve matching of register marks.

(b2) Register marks are formed on respective panel elements. After the first panel element is held in a specified position of the first stage, the second panel element is set on or above the first panel element, and the register marks of the two panel elements are observed through a camera so that the second panel element is moved by a X-Y-θ drive device to match the register marks of the two panel elements. When the second panel element is positioned above the first panel element, the second panel element is overlaid on the first panel element after positioning.

When the method (b2) is practiced, a third stage holding the second panel element may be used. After the third stage is made to hold the second stage by means of vacuum suction or the like, the third stage may be moved by a X-Y-θ drive device while watching the register marks of the two panel elements with a camera, whereby the register marks of the first and second panel elements are matched. After alignment of the second panel element, the second panel element may be removed from the third stage and superimposed on the first panel element. The third stage may be a panel element-chucking member provided in the X-Y-θ drive device.

In positioning by X-Y-θ drive device, the panel element may be positioned by automatic control using the image processing technique described above concerning the first type method for producing a display panel.

When the third stage for holding the second panel element is used for positioning purpose, the first panel element is positioned in the first stage and the second panel element is positioned in the third stage in the same manner as described above concerning the first type method for producing a display panel. Then the first and second panel elements are brought to an opposed position by relatively moving the first stage holding the first panel element as positioned and the third stage holding the second panel element as positioned after which the second panel element is released and overlaid on the first panel element.

Of the two panel elements layered on the first stage after alignment, the second panel element may be held by the convex curved panel element-pressing surface (having a specific curvature). The holding operation by the surface may be easily done by bringing the panel element-pressing surface of the second stage into a rolling contact with the second panel element superimposed on the first panel element over the first stage in a co-relative manner.

The adhesive material is supplied onto at least one of surfaces to be adhered of the first and second panel elements. The adhesive material may be supplied in the same manner as described above concerning the first type method for producing a display panel.

The supply of the adhesive material can be conducted before the step of adhering the first and second panel elements. The adhesive material may be supplied at any stage before the adhering step unless it is problematic.

In this way, the second panel element is adhered via the adhesive material from its one end to its other end to the first panel element progressively over the entire area by rolling the second stage holding the second panel element under pressure relative to the first stage with the first and second panel elements as interposed therebetween.

The convex curved surface of the second stage having a specific curvature may be an outer peripheral surface of a cylinder or pillar or may be a surface showing an arc or a sector profile when viewed from the side.

When three or more panel elements are layered, the panel elements adhered by the above-mentioned adhering step are taken as the first panel element, and one panel element to be adhered next is taken as the second panel element. More panel elements to be adhered next are adhered, one by one, to the panel elements already adhered by repeating the respective steps described above.

(A-2) Type Apparatus for Producing a Display Panel

Typical example of the apparatus capable of carrying out the above-mentioned (A-2) type method for producing a display panel is the following apparatus.

An apparatus for producing a display panel comprising layered panel elements for forming a display panel for display of images is available, the apparatus comprising: a first stage for holding a first panel element; positioning device for positioning a second panel element relative to the first panel element held by the first stage and overlaying the second panel element over the first panel element on the first stage; a second stage holding the second panel element overlaid over the first element on the first stage, the second stage having a convex curved panel element-pressing surface having a specified curvature for holding the second panel element thereon; and a stage-driving device for relatively rolling under pressure the second stage on the first stage, in such a manner that the panel element-pressing surface of the second stage is brought into a rolling contact with the second panel element overlaid over the first panel element on the first stage so that the second panel element is once held by the panel element-pressing surface of the second stage and thereafter the second stage holding the second panel element is rolled under pressure relative to the first stage holding the first panel element to adhere the second panel element, from its one end to its other end, progressively to the first panel element.

In this apparatus, the convex curved panel element-pressing surface of the second stage may be an outer peripheral surface of a cylinder or pillar or may be a curved surface showing an arc or a sector when viewed from the side.

According to the apparatus, the first panel element is held by the first stage and the second panel element is laid over the first panel element after alignment by the positioning device.

The second panel element is once transferred to and held by the second stage by the stage-driving device. This transfer of the second panel element can be smoothly performed by bringing the panel-holding surface of the second stage into a rolling contact with the second panel element.

The adhesive material is supplied onto at least one of surfaces to be adhered of the first and second panel elements.

Then, the second stage holding the second panel element is relatively rolled under pressure on the first panel element on the first stage by the stage-driving device to adhere the second panel element, progressively from its one end to the other end via the adhesive material.

Each of the first and second stages includes a device for holding panel element. Useful holding device includes, for example, perforations for suction of air to draw and hold the panel element onto the stage, which are formed in the stage and connected with an exhausting device, although not limited thereto.

The adhesive material can be arranged or supplied in the same manner as described concerning the (A-1) type method for producing a display panel. The apparatus for producing a display panel may include a device for supplying an adhesive material.

The positioning device may be, for example, a device which can carry out the positioning methods as described concerning the (A-1) type method for producing a display panel, such as a camera for inspection of register mark(s). The positioning device may be a device comprising a camera for inspection of register mark(s), and a X-Y-θ drive device or may be a device comprising the camera, the X-Y-θ drive device and a controller for control of the operation of the X-Y-θ drive device in a manner to position the panel element based on the information of register mark(s) (such as information on position of register mark(s)) from the camera.

When three or more panel elements are layered, the panel elements adhered by the adhering step may be regarded as the first panel element and a panel element to be adhered next may be regarded as the second panel element. In this way, new panel elements may be adhered, one by one, to the previously adhered panel elements substantially by repeating the foregoing respective steps.

(A-3) Type Method for Producing a Display Panel

The method is to produce a display panel by layering panel elements for forming a display panel for display of images, and includes the steps of allowing a stage to hold a first panel element; overlaying a second panel element on the first panel element held by the stage; positioning the second panel element relative to the first panel element; holding the ends of overlaid and positioned first and second panel elements as superimposed over each other; forming a gap between the first and second panel elements leaving the ends of the elements held as superimposed; providing an adhesive material on at least one of surfaces to be adhered of the first and second panel elements; and adhering the first and second panel elements from their ends held as superimposed, progressively forward over the entire area (adhering step).

More specific example of the foregoing method for producing a display panel is as follows:

The method is to produce a display panel by layering panel elements for forming a display panel for display of images, and includes the steps of allowing a stage to hold a first panel element; overlaying a second panel element on the first panel element held by the stage; positioning the second panel element relative to the first panel element; holding the ends of overlaid and positioned first and second panel elements as superimposed over each other to the stage; forming a gap between the first and second panel elements leaving the ends of the elements held as superimposed; providing an adhesive material on at least one of surfaces to be adhered of the first and second panel elements; and adhering the first and second panel elements via the adhesive material from their ends held as superimposed, progressively forward over the entire area by a pressing member which is movable relative to the stage (adhering step).

The pressing member may have a convex curved panel element-pressing surface and may be adapted to permit the curved surface to roll on the panel element relatively in the adhering step.

Typical example of the pressing member having a convex curved panel element-pressing surface is a pressing roller having a circular section. It is possible to use a pressing member with a panel element-pressing surface exhibiting an arc or a section profile when viewed from the side or the like. When a pressing roller having a circular section is used, the so-called inverted-crown shaped pressing roller with the central portion smaller in diameter than the end portions may be used to avoid creation of wrinkles in the panel element by compression with the pressing member.

In (A-3) type method for producing a display panel, the first panel element is held by the stage, typically by inlet perforations formed in the stage for suction of air to hold the panel element, although not limited thereto.

The first and second panel elements can be positioned relative to each other by the positioning method described concerning the (A-2) type method for producing a display panel.

The overlaid and positioned first and second panel elements are held with the ends of the elements as superimposed, and may be so held by the stage as already stated. In this case, a holding device (such as holding clips) provided in the stage may be used for holding purpose.

After holding the ends of the two panel elements, a gap is formed between the first and second panel elements, leaving the ends thereof as so superimposed. The gap can be easily formed by picking up and separating the other end of one of the panel elements than the ends superimposed thereof.

After formation of the gap between the first and second panel elements, the adhesive material is supplied in the gap thus formed. The adhesive material can be supplied in the same manner as described concerning the (A-1) type method for producing a display panel.

After supply of the adhesive material, the adhering step is conducted.

When three or more panel elements are layered, the panel elements adhered by the adhering step may be regarded as the first panel element and a panel element to be adhered next may be regarded as the second panel element. In this way, new panel elements may be adhered, one by one, to the previously adhered panel elements substantially by repeating the foregoing respective steps.

(A-3) Type Apparatus for Producing a Display Panel

Typical example of the apparatus capable of carrying out the above-mentioned (A-3) type method for producing a display panel is the following apparatus.

An apparatus for producing a display panel comprising layered panel elements for forming a display panel for display of images is available, the apparatus comprising: a stage for holding a first panel element; positioning device for positioning a second panel element relative to the first panel element held by the stage and overlaying the second panel element over the first panel element held by the stage; an end-holding device for holding the superimposed ends of the overlaid and positioned first and second panel elements on the stage; a gap-forming device for forming a gap between the first and second panel elements, leaving the ends of the elements held as superimposed by the holding device; and a pressing member which is movable relative to the stage for adhering the first and second panel elements having the gap formed by the gap-forming device to adhere the first and second panel elements progressively from the ends of the elements held by the holding device over the entire area.

To smoothly adhere the panel elements, a pressing member may be used which has a convex curved panel element-pressing surface so that the panel element-pressing surface thereof can relatively roll on the panel elements to adhere the two panel elements successively. Typical example of the pressing member having a convex curved panel element-pressing surface is pressing roller having a circular section. A pressing member having a panel element-pressing surface with an arc or a sector profile when viewed from the side surface can be also used.

When a pressing roller having a circular section is used, the so-called inverted-crown shaped pressing roller with the central portion smaller in diameter than the end portions may be used to avoid creation of wrinkles in the panel element by compression with the pressing member.

According to this apparatus for producing a display panel, the first panel element is held by the stage and the second panel element is positioned by the positioning device and overlaid over the first panel element.

The stage includes a device for holding the panel element. Useful holding devices include, for example, inlet perforations for suction of air to draw and hold the panel element, which are formed in the stage and connected with an exhausting device, although not limited thereto.

The positioning device may be, for example, a device which can carry out the positioning methods as described above concerning the (A-2) type method for producing a display panel, such as a camera for inspection of register marks. positioning device may be a device comprising a camera for inspection of register mark(s) and a X-Y-θ drive device or may be a device comprising the camera, the X-Y-θ drive device and a controller for control of the operation of the X-Y-θ drive device in a manner to position the panel elements based on the information of register mark(s) (such as information on position of register mark(s)) from the camera.

The ends of the superimposed and a positioned two panel elements are held as superimposed on the stage with the end-holding device.

A gap is formed between the first and second panel elements by the gap-forming device, leaving the ends of the elements held as superimposed by the holding device.

The gap-forming device may be, for example, a device having a structure in which the other end of the second panel element than the end held on the stage is held and picked up and the other end is brought toward the first panel element with the progress of adhering the two panel elements by the pressing member.

After formation of the gap between the first and second panel elements, the adhesive material is supplied to at least one of the opposed surfaces to be adhered of the two panel elements.

The adhesive material can be supplied in the same manner as described concerning the (A-1) type method for producing a display panel. The apparatus for producing a display panel may include a device for applying an adhesive material.

After supply of the adhesive material, the first and second panel elements are adhered together progressively from the side of the ends held by the end-holding device toward the entire area.

When three or more panel elements are adhered, the panel elements adhered by the adhering step may be regarded as one of the two panel elements to be adhered.

[A-4]

(A-4) Type Method for Producing a Display Panel

The method is to produce a display panel by layering panel elements for forming a display panel for display of images, and includes the steps of allowing a stage to hold a first panel element; overlaying a second panel element on the first panel element held by the stage (panel element-overlaying step); positioning the second panel element relative to the first panel element (positioning step); temporarily fixing the first and second panel elements to the stage in order to maintain the mutual positional relationship between the first and second panel elements (temporarily fixing step); forming perforations in the first and second panel elements for positioning the two panel elements to determine the mutual positional relationship between the first and second panel elements (boring step); and supplying an adhesive material onto at least one of surfaces to be adhered of the first and second panel elements and adhering the first and second panel elements via the adhesive material while determining the mutual positional relationship between the two panel elements using the position-determining perforation (adhering step).

In the (A-4) type method for producing a display panel, the first panel element is held by the stage, e.g., typically by sucking air through perforations formed in the stage for suction of air to draw and hold the panel element onto the stage.

The mutual positioning of the first and second panel elements can be done by the positioning method described above concerning the (A-2)type method for producing a display panel.

The overlaid and positioned first and second panel elements are temporarily fixed to the stage to keep the mutual positional relationship between the first and second panel elements. The panel elements can be temporarily fixed to the stage, for example, by allowing the stage to hold at least one ends of the opposite ends of the panel elements using, e.g. a temporary fixing device such as clip(s) provided on the stage.

After temporarily fixing the two panel elements, position-determining perforations are formed in the first and second panel elements to determine the mutual positional relationship between them.

After supplying the adhesive material onto at least one of surfaces to be adhered of the first and second panel elements, the first and second panel elements are adhered to each other via the adhesive material while determining the mutual positions thereof using the position-determining perforations.

The step of holding the ends of overlaid and positioned first and second panel elements as superimposed over each other to the stage in (A-3) type method for producing a display panel is carried out using the position-determining perforations, and a display panel having adhered panel elements can be produced by conducting; forming a gap between the first and second panel elements leaving the ends of the elements held as superimposed; providing an adhesive material on at least one of opposed surfaces to be adhered of the first and second panel elements; and adhering the first and second panel elements from their ends held as superimposed, progressively forward over the entire area (adhering step).

When three or more panel elements are layered, the panel elements temporarily fixed on the stage in the state of being superimposed and positioned by the above-mentioned temporarily fixing step may be regarded as the first panel element and also the next panel element may be regarded as the second panel element. In this way, new panel elements are overlaid and positioned on the previously overlaid and positioned panel elements one by one by substantially repeating the steps of panel element-overlaying step, positioning step and temporarily fixing step. The steps of forming perforations and adhering each adjacent panel elements via the adhesive material are conducted after completing temporary fixing of all panel elements.

(A-4) Type Apparatus for Producing a Display Panel

A typical example of the apparatus capable of carrying out the above-mentioned (A-4) type method for producing a display panel is the following apparatus.

An apparatus for producing a display panel comprising layered panel elements for forming a display panel for display of images is available, the apparatus comprising: a stage for holding a first panel element; a positioning device for positioning a second panel element relative to the first panel element held by the stage and overlaying the second panel element over the first panel element held by the stage (positioning device); a device for temporarily fixing the first and second panel elements to the stage to maintain a mutual positional relationship between the overlaid and positioned first and second panel elements (temporarily fixing device); and a device for forming a perforation for determining the position to determine a mutual positional relationship between the first and second panel elements temporarily fixed to the stage (perforation boring device).

Also in the producing apparatus, the first panel element is held by the stage and the second panel element is positioned and overlaid over the first panel element by the positioning device.

The stage includes a device for holding the panel element such as, for example, a device including perforations for suction of air to draw and hold the panel element onto the stage, which are formed in the stage and connected with an exhausting device, although not limited thereto.

The positioning device may be, for example, devices which can carry out the positioning methods as described concerning the (A-2) type method for producing a display panel, such as: a camera for inspection of register mark(s); a positioning device comprising a camera for inspection of register mark(s), and a X-Y-θ drive device; or a positioning device comprising the camera, the X-Y-θ drive device and a controller for control of the operation of the X-Y-θ drive device in a manner to position the panel elements based on the information of register mark(s) (such as information on the position of register mark(s)) from the camera.

The temporarily fixing device for temporarily fixing the overlaid and positioned first and second panel elements to the stage, includes, for example, devices such as clip(s) provided in the stage for temporarily fixing at least one ends of opposite ends of the two panel elements.

This apparatus for producing a display panel may have an adhering device for adhering the first and second panel elements via an adhesive material while determining the mutual positions of the panel elements using the positioning perforations formed in the panel elements.

The adhering device may be provided with an end-holding device for holding the ends of panel elements using the positioning perforations which is used in place of the end-holding device employed in the (A-3) type apparatus for producing a display panel; a gap-forming device for forming a gap between the first and second panel elements, leaving the ends of the elements held as superimposed by the end-holding device; and a device including a pressing member which is movable relative to the stage to adhere the first and second panel elements with a gap formed by the gap-forming device progressively from the side of the ends held by the end-holding device, and may further include a device for applying the adhesive material.

To smoothly adhere the panel elements, the pressing member may be used which has a convex curved panel element-pressing surface so that the panel element-pressing surface thereof can relatively roll on the panel elements to adhere the two panel elements successively. A typical example of the pressing member having a convex curved panel element-pressing surface is a pressing roller having a circular section. A pressing member having a panel element-pressing surface with an arc or a sector profile when viewed from the side surface can be also used. When the pressing roller having a circular section is used, the so-called inverted-crown shaped pressing roller with the central portion smaller in diameter than the end portions may be used to avoid creation of wrinkles in the panel element by compression with the pressing member.

In any of the methods and apparatuses for producing a display panel according to the invention, adjacent panel elements are adhered together in a state of being precisely positioned and accordingly a display panel is provided which can perform display of better images.

In any of (A-1) to (A-3) types of methods and apparatuses for producing a display panel, neighboring panel elements are adhered together progressively from the ends of the elements so that the air is released from between the panel elements, thereby bringing them in a close contact and they can be adhered without creating any wrinkle, whereby a display panel capable of performing display of better images can be obtained.

In the (A-4) type method and apparatus for producing a display panel, neighboring panel elements can be adhered together progressively from the ends of the elements so that the air is released from between the panel elements, thereby bringing them in a close contact and they can be adhered without creating any wrinkle.

In any of (A-1) to (A-4) types of methods for producing a display panel as described above, at least the adhering step may be conducted in an atmosphere of specified reduced pressure to assure release of air between neighboring panel elements.

For this purpose, the apparatus for producing a display panel may have a vacuum chamber for adjusting the atmosphere surrounding the two panel elements to a reduced pressure in adhering the neighboring panel elements.

The (A-1) to (A-4) types of methods and apparatuses described above can be applied to the production of display panels. Examples of methods and apparatuses for producing liquid display panels will be described below with reference to FIGS. 1 to 14(D).

FIG. 1 is a schematic section view showing an example of a liquid crystal display panel of the reflection type to be produced. The liquid crystal display panel A is a panel produced by layering a panel element for blue display (hereinafter referred to as "B panel element"), a panel element for green display (hereinafter referred to as "G panel element") and a panel element for red display (hereinafter referred to as "R panel element") to perform the display of multi-color images. The liquid crystal display panel A is produced by adhering together the neighboring B panel element and G panel element, and the neighboring G panel element and R panel element, respectively via an adhesive material N. A light absorbing black layer BK is formed on the outer side of the R panel element.

In each of B, G, R panel elements, a liquid crystal-containing layer LC for display of images in a specified color is interposed between a pair of opposed transparent substrates S1, S2. In each of the substrates S1, S2, an electrode or electrodes (not shown) are provided on its surface opposed to the liquid crystal-containing layer LC.

FIGS. 2 to 5 schematically show structures of examples of the apparatus for producing the liquid crystal display panel A.

Figure 2:
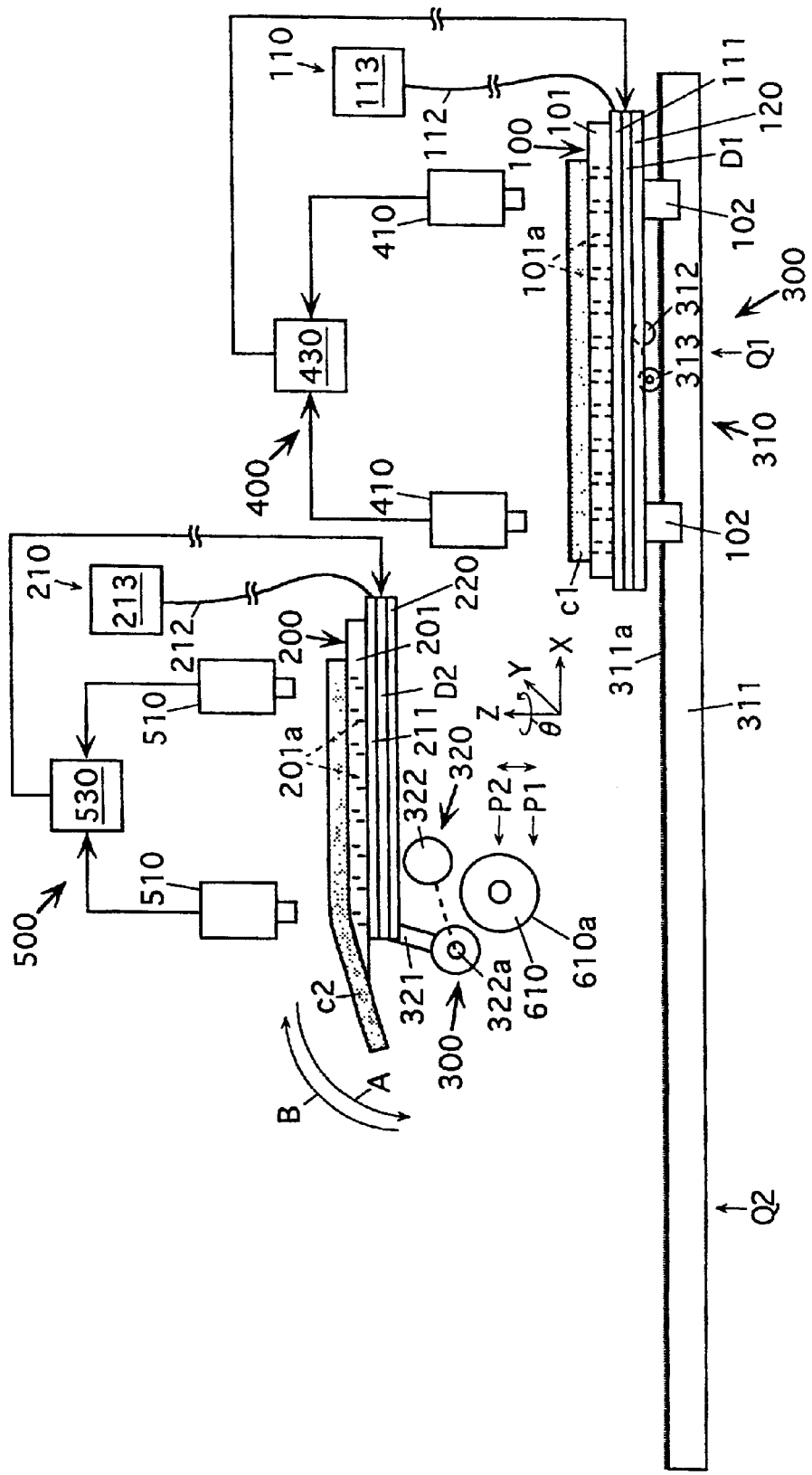
FIG. 2 schematically shows a structure of an example of an apparatus for producing the liquid crystal display panel shown in FIG. 1.

The apparatus of FIG. 2 for producing a display panel comprises: a first stage 100 for holding a first panel element c1; a positioning device 400 for positioning the first panel element c1 on the first stage 100; a second stage 200 disposed in a specified positional relationship with the first stage 100 to hold a second panel element c2; a positioning device 500 for positioning the second panel element c2 on the second stage 200; a first driving device 300 (a combination of a drive device 310 for the first stage 100 and a drive device 320 for the second stage 200) for relatively moving the first stage 100 and the second stage 200 in a manner to bring to an opposed position the first and second panel elements c1, c2 positioned and held on the first and second stages 100, 200, respectively and to superimpose the specified ends of the panel elements c1, c2 over each other; a pressing member 610 for pressing against the first stage 100 the superimposed ends of the panel elements c1, c2 held by the first and second stages 100, 200; and a second drive device 310 for moving the first stage 100, against which the ends of the two panel elements are pressed by the pressing member 610, relative to the pressing member 610 and the second stage 200 while maintaining the panel elements as pressed by the pressing member 610 and pulling the second panel element c2 from the second stage 200 in order to adhere the two panel elements c1, c2 as pressed by the pressing member 610 on the first stage 100. The second drive device 310 is a constituent member of the first driving device 300 which comprises drive devices 310, 320.

Figure 3:
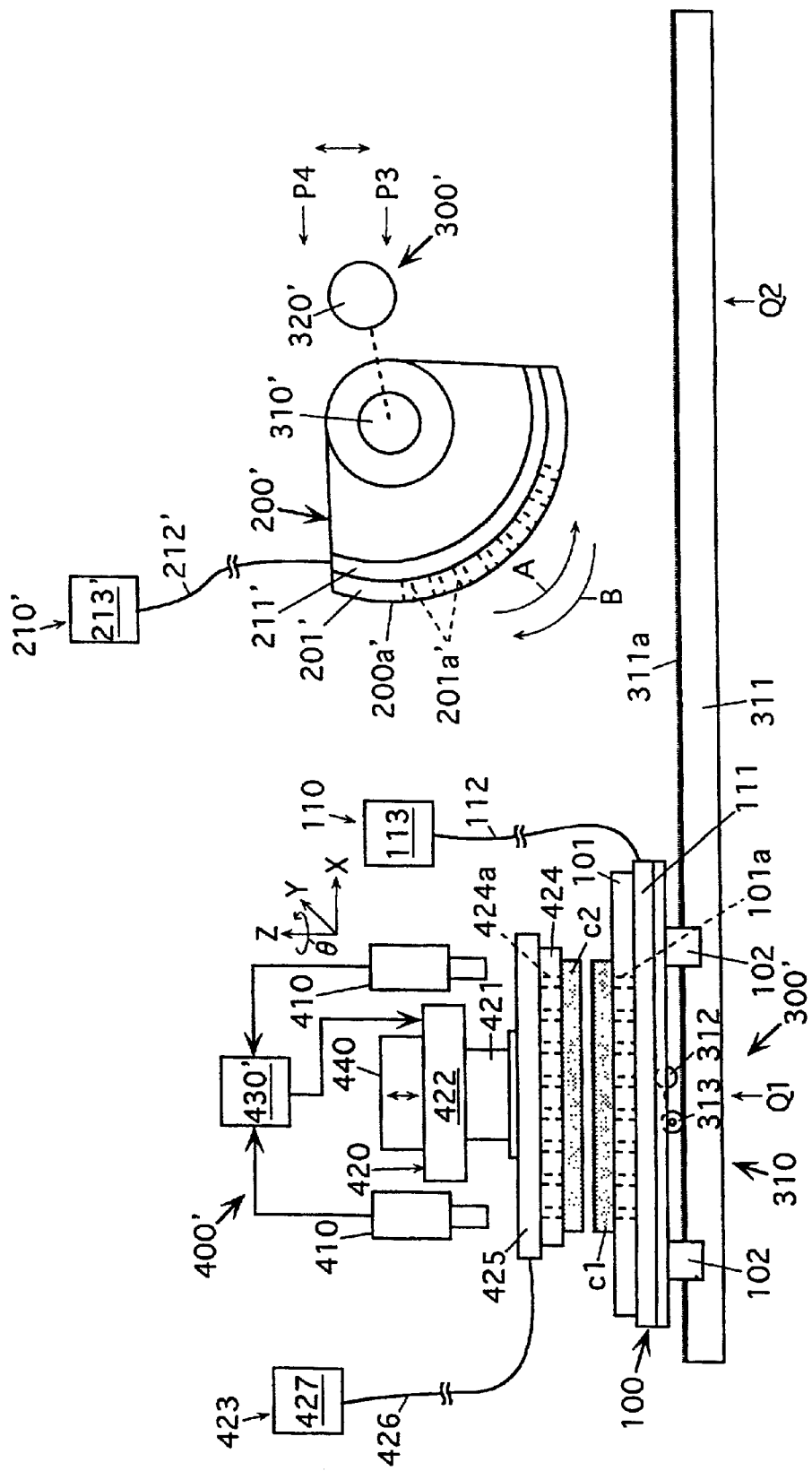
FIG. 3 schematically shows a structure of another example of an apparatus for producing the liquid crystal display panel shown in FIG. 1.

The apparatus of FIG. 3 for producing a display panel comprises: a first stage 100 for holding a first panel element c1; a positioning device 400' for positioning a second panel element c2 relative to the first panel element c1 and superimposing the second panel element c2 over the first panel element c1 held by the first stage 100; a second stage 200' having a convex curved panel element-holding surface 200a' having a specified curvature which can take up and lift the second panel element c2 positioned and overlaid on the first panel element on the first stage 100; and a device 300' for driving stages 100, 200' in the following situation in which the panel element-holding surface 200a' of the second stage 200' is brought into a rolling contact with the second panel element c2 positioned and overlaid over the first panel element c1 so that the second panel element c2 is once held by the panel element-holding surface 200a' and then the second stage 200' holding the second panel element c2 is relatively rollingly moved under pressure on the first stage 100 holding the first panel element c1 with the first and second panel elements c1, c2 interposed between the two stages to adhere the second panel element c2, progressively from its one end thereof to the other end thereof, to the first panel element c1.

Figure 4:
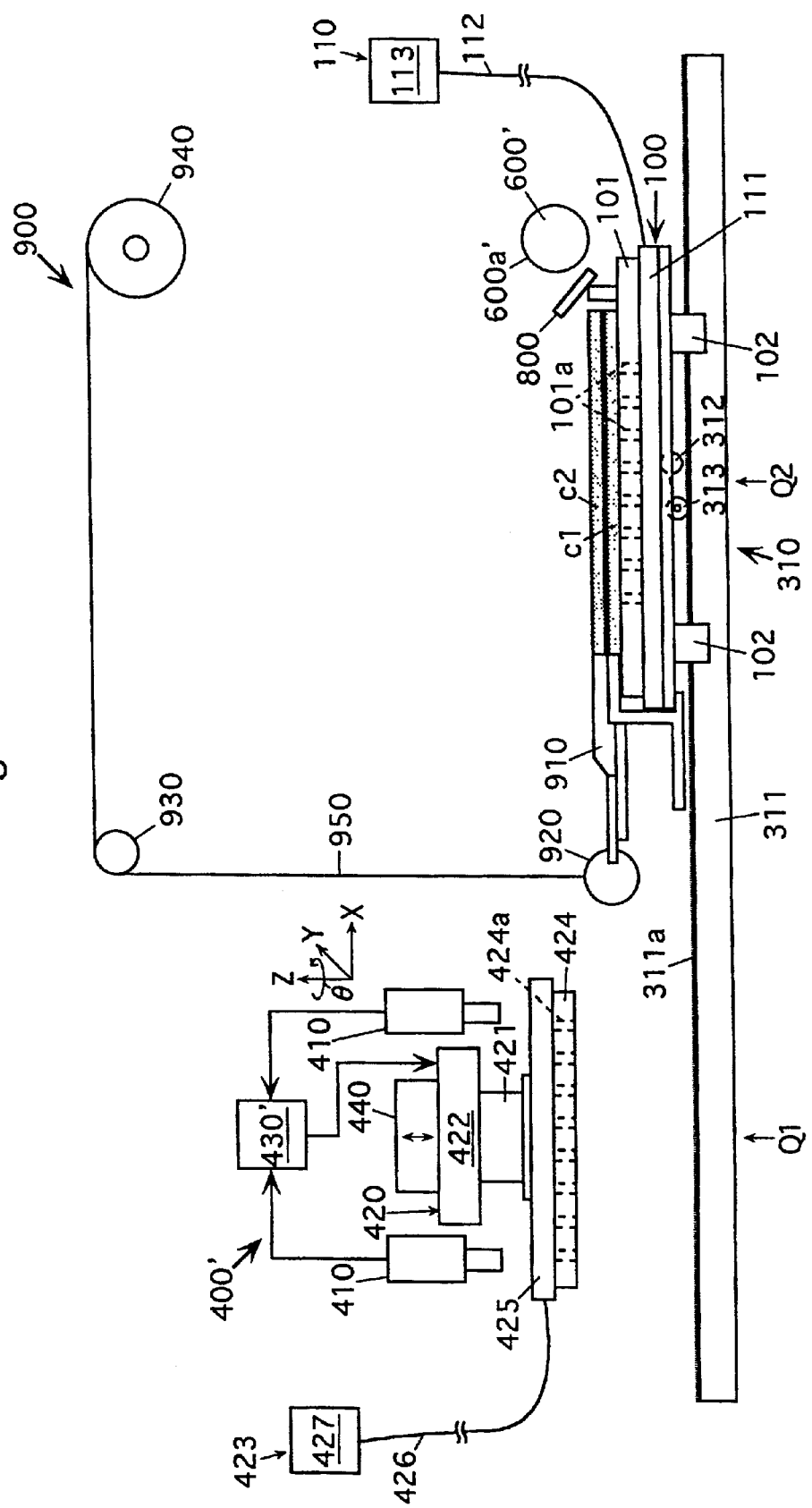
FIG. 4 schematically shows a structure of a further example of an apparatus for producing the liquid crystal display panel shown in FIG. 1.

The apparatus of FIG. 4 for producing a display panel comprises: a stage 100 for holding a first panel element c1; a positioning device 400' for positioning a second panel element c2 relative to the first panel element c1 and superimposing the second panel element c2 over the first panel element c1 held by the first stage 100; a holding clip 800 for holding the ends of the positioned and overlaid first panel element c1 and second panel element c2 as superimposed on the first stage 100; a gap-forming device 900 for forming a gap between the first and second panel elements, leaving the ends of the elements held as superimposed by the holding clip 800; and a pressing roller 600' which is movable relative to the stage 100 for adhering the first and second panel elements c1, c2 with the gap formed by the gap-forming device 900 progressively from the ends of the elements held by the holding clip 800 forward over the entire area.

Figure 5:
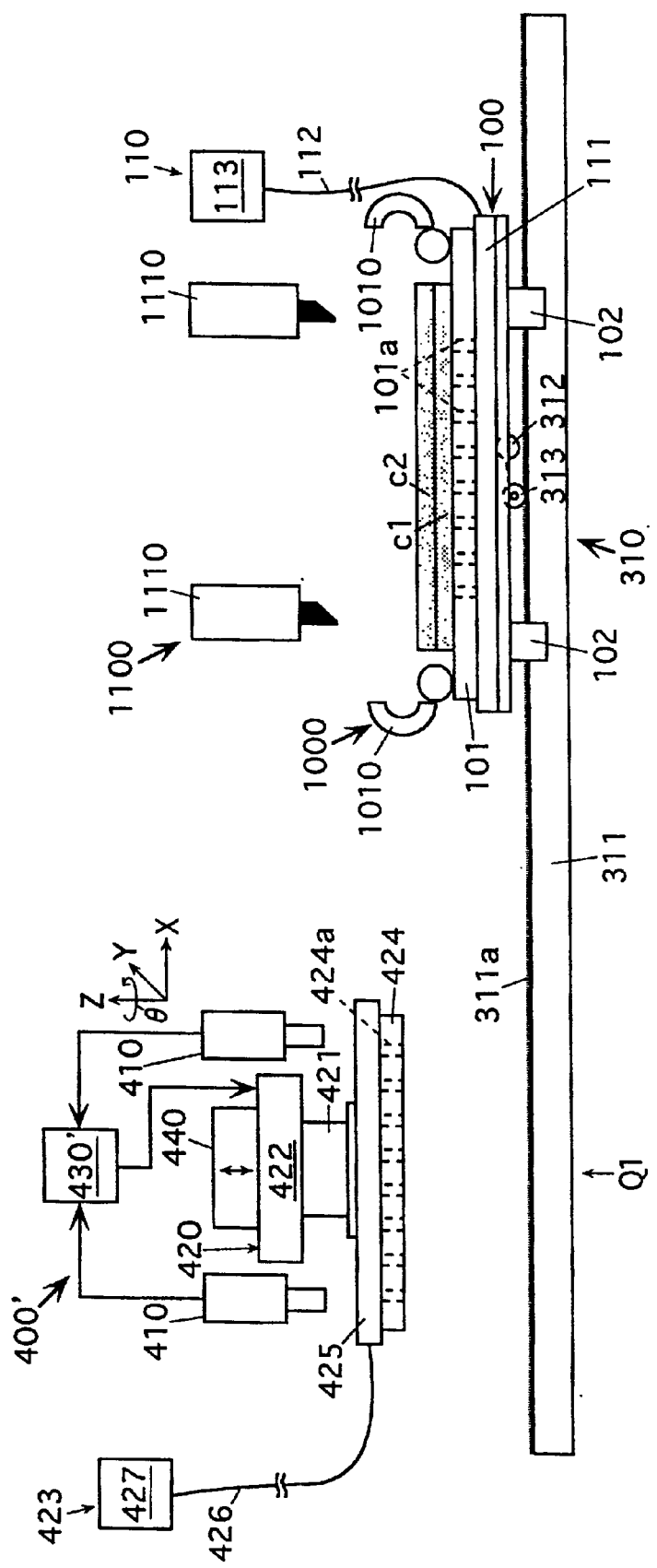
FIG. 5 schematically shows a structure of an additional example of an apparatus for producing the liquid crystal display panel shown in FIG. 1.

The apparatus of FIG. 5 for producing a display panel comprises: a stage 100 for holding a first panel element c1; a positioning device 400' for positioning a second panel element c2 relative to the first panel element c1 and superimposing the second panel element c2 over the first panel element c1 held by the first stage 100; a device for temporarily fixing the overlaid and positioned first and second panel elements c1, c2 to the stage 100 to maintain a mutual positional relationship between the first and second panel elements c1, c2; and a perforation-forming device 1100 for providing a perforation in the first and second panel elements c1, c2 temporarily fixed to the stage 100 for determining the position to determine a mutual positional relationship between the first and second panel elements c1, c2.

Among the apparatuses of FIGS. 2 to 5 for producing a display panel, description will be given successively from the apparatus of FIG. 2. Among constituent components used in the apparatuses FIGS. 2 to 5, the elucidation on those having the same structure and function is omitted with respect to the apparatuses of FIGS. 3 to 5. Like parts are indicated with like reference numerals or the like.

The apparatus of FIG. 2 for producing a display panel is provided with the first stage 100, the positioning device 400, the second stage 200, the positioning device 500, the first driving device 300 consisting of the stage-driving device 320 and the stage-driving device 310 and the pressing member 610 as described above.

The first stage 100 is identical with the first stage 100 used in the apparatus of FIG. 3 for producing a display panel and with the stage 100 used in the apparatuses of FIG. 4 and 5 for producing a display panel.

The first stage 100 includes a first suction table 101 and a panel element-holding device 110.

The first suction table 101 has a plurality of inlet perforations or holes 101a for suction of air formed at a specific spacing for suction and draw of panel element c1 in a region for holding the panel element c1.

The panel element-holding device 110 includes not only such inlet perforations 101a but also an exhaust chamber 111 in the stage 100, a flexible tube 112 and an exhausting device 113. The exhausting device 113 is connected to one end of a tube 112. The exhaust chamber 111 is connected to the other end of the tube 112. The exhaust chamber 111 is communicated with the perforations 101a of the suction table 201. Thus the air is sucked at the perforations 101a via the exhaust chamber 111 and the tube 112 by the operation of the exhausting device 113.

The second stage 200 as mentioned above includes a second suction table 201 and a panel element-holding device 210 for holding the panel element.

The second suction table 201 has a plurality of perforations or holes for suction of air 201a formed at a specific spacing for suction and draw of panel element in the region for holding a panel element c1.

The panel-holding device 210 has not only such perforations 201a but also an exhaust chamber 211 in the stage 200, a flexible tube 212 and an exhausting device 213. The exhausting device 213 is connected to one end of a tube 212. An exhaust chamber 211 is connected to the other end of the tube 212. The exhaust chamber 211 is communicated with perforations 201a of the suction table 201. Thus the air is sucked at the perforations 201a via the exhaust chamber 211 and the tube 212 by the operation of the exhausting device 213.

The drive device 310 for driving the stage 100 is also provided in the display panel-producing apparatuses shown in FIGS. 3 to 5. The drive device 310, although not limited thereto, includes a pinion gear 313 provided on the first stage 100, which is engaged with a rack gear 311a arranged along a guide rail 311 and is reciprocatingly rotated by a motor 312 mounted on the first stage 100. The first stage 100 is moved along the guide rail 311 by the drive device 310, and is disposed in a location Q1 for positioning the panel element or a location Q2 where the panel elements are initially adhered. In this movement, a slider 102 provided on the first stage 100 slides along the guide rail 311.

The drive device 320 for driving the stage 200 includes a second stage-holding arm 321 and a rotational drive member 322 for driving the arm.

The second stage-holding arm 321 is supported at its one end by an axle 322a of the rotational drive member 322, and is connected at the other end to the second stage 200. The rotational drive member 322 is disposed in the specified place and is capable of rotating the axle 322a in the specified direction (a direction A in the drawing) at a specified timing or in a direction opposite to the specified direction (a direction B in the drawing). In this way, the holding arm 321 and the second stage 200 are turned in the direction A or B at the specified timing by the rotation of the axle 322a by driving the rotational drive member 322.

The pressing member 610 is moved upward and downward by a device for driving the mechanism for upward and downward movement (not shown). In this way, the pressing member 610 is moved at the specified timing by the device for driving the pressing member for upward and downward movement to a pressing location P1 where the pressing member 610 presses the first and second panel elements c1, c2 in the position Q2 against the first stage 100 at the specified timing for initiating the adhering of elements or to a retraction location P2 for upward movement.

The pressing member 610 is a pressing roller having a circular section with a panel-pressing peripheral surface 610a.

The positioning devices 400, 500 are provided each with two cameras 410, 510 (CCD cameras). The devices are also provided with X-Y-θ drive devices D1, D2 and controllers 430, 530.

Figure 6:
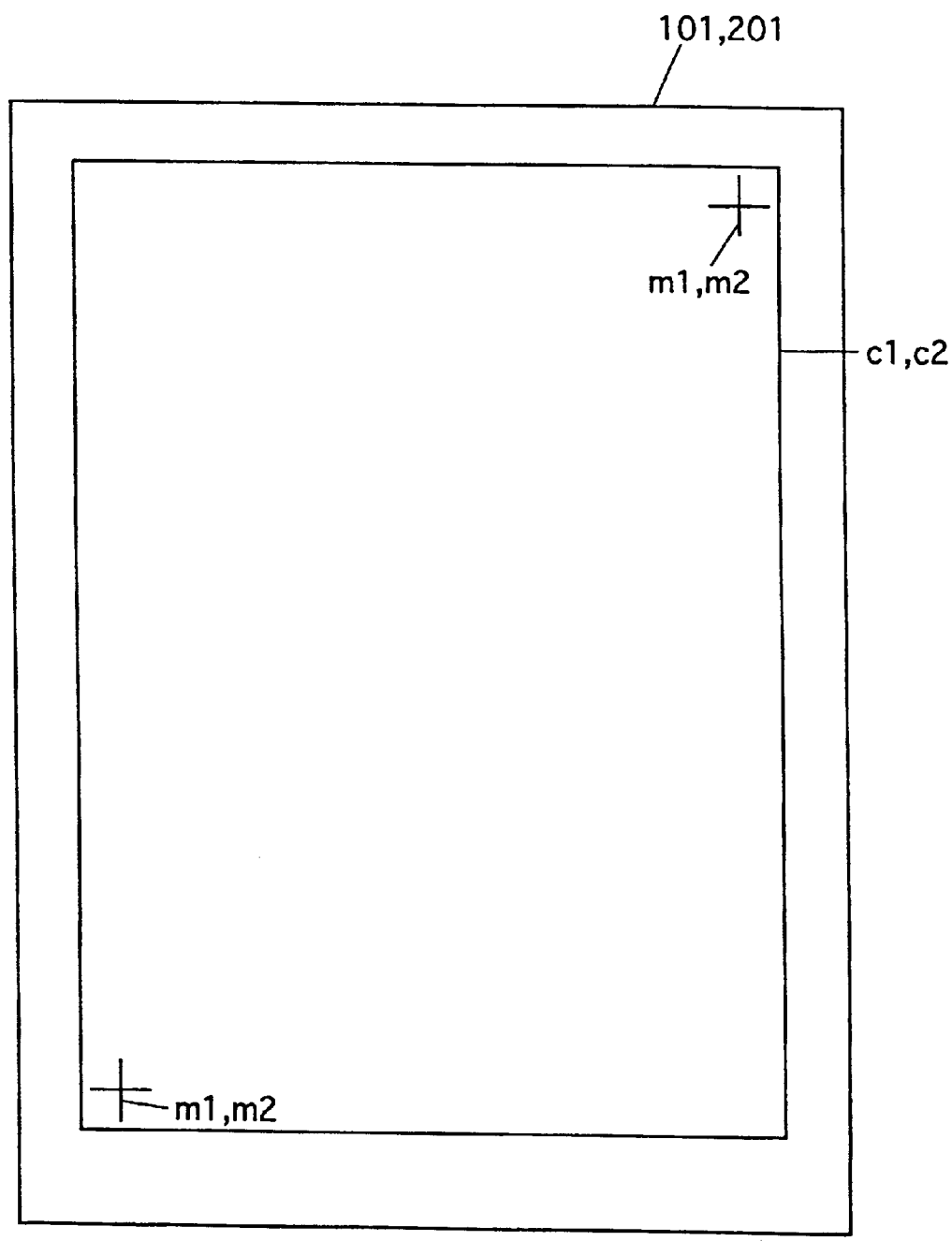
FIG. 6 is a view of first and second panel elements, when viewed from above, held by absorption tables of the first and second stages.

FIG. 6 is a view showing the first and second panel elements c1, c2 held by the suction tables 101, 201 of the first and second stages 100, 200 when viewed from above. The positioning devices 400, 500 are omitted from the view.

On stage bases 120, 220 of the first and second stages 100, 200 are placed X-Y-θ drive devices D1, D2, exhaust chambers 111, 211 and suction tables 101, 201, respectively.

Register marks (in other word, alignment marks) m1, m2 are formed outside the display region on the first and second panel elements c1, c2, respectively. A crisscross pattern is formed as the register marks at the two end regions of the panel element in a diagonal direction to which, however, the marks are not limited. Any pattern can be used as the register marks insofar as they can relatively position panel elements to each other. The register marks can be indicated in any location if it is outside the display region. The register marks can be formed by printing, or optionally electrodes for markers may be formed as the register marks outside the display region of the panel element in the production of an electrode for driving the display panel. The electrodes for markers will emit a light by application of a voltage to the electrodes for markers. In the illustrated embodiment, the register marks m1, m2 are printed.

Each of the CCD cameras 410 shown in FIG. 2 is connected to the controller 430, and is adapted to inspect the register mark m1 formed on the panel element c1 held by the suction table 101 for transmission of the obtained mark information to the controller 430. Each of the CCD cameras 510 is connected to the controller 530, and is adapted to inspect the register mark m2 formed on the panel element c2 held by the suction table 201 for transmission of the obtained mark information to the controller 530.

The X-Y-θ drive devices D1, D2 are each connected to the controllers 430, 530, respectively, which control the operation of the X-Y-θ drive devices D1, D2 in such a manner that the devices D1, D2 drive the suction tables 101, 201 to position the panel elements c1, c2 at the specified location based on the mark information from the cameras. The controllers 430, 530 include means for utilizing the image processing method for positioning substrates or panels.

The first and second panel elements c1, c2 held as sucked by the suction tables 101, 201 are positioned in a way so that the superimposed ends of the elements are held and the two panel elements are adhered in a state of being precisely positioned at a step to be conducted later.

The positioning device 500 is supported by the device for driving the mechanism for upward and downward movement (not shown). Thus when the device 500 is not used for positioning operation, it is retracted to an upper position where the second stage 200 will not collide with the device 500 by turn of the stage 200.

The display panel-producing apparatus shown in FIG. 3 is provided, as mentioned above, with the first stage 100, the positioning device 400', the second stage 200' and the stage driving device 300'.

The positioning device 400' is similar to that provided in the display panel producing apparatuses shown in FIGS. 4 and 5.

The positioning device 400' is set above a location Q1 for positioning the panel elements and is provided with two cameras 410 (CCD cameras in this embodiment), X-Y-θ drive device 420, controller 430' and the driving device 440 for upward and downward movement.

Figure 7:
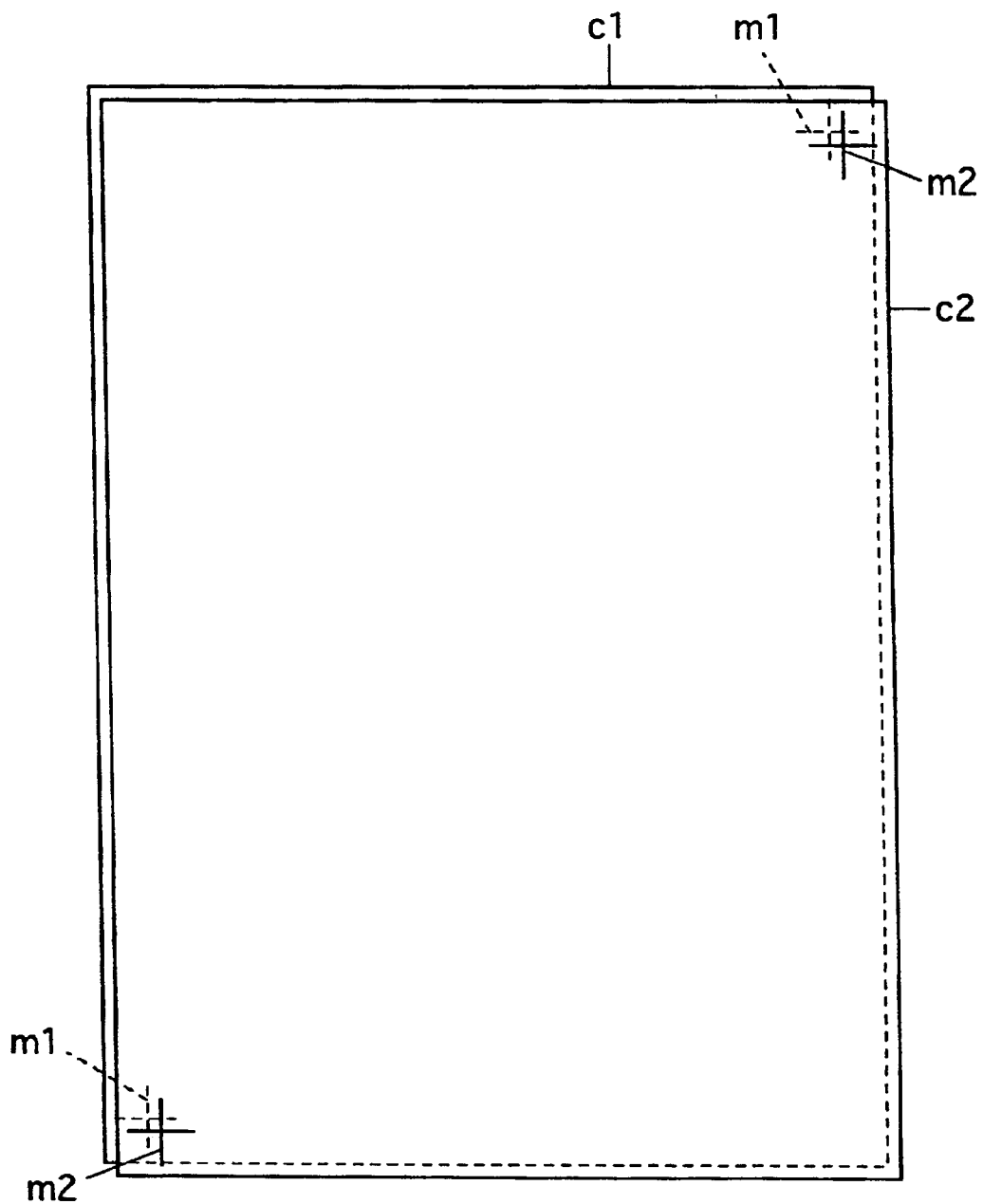
FIG. 7 is a view of respective panel elements being relatively positioned when viewed from above.

FIG. 7 shows the state of the panel elements c1, c2 being relatively positioned on the first stage 100 when viewed from above. The first stage 100, positioning device 400' and the like are omitted from the view.

As described above, register marks m1, m2 are formed on the outside of the display region of the panel elements c1, c2.

Each of the CCD camera 410 shown in FIG. 3 is connected to the controller 430, and is adapted to inspect the register marks m1, m2 formed on the panel elements c1, c2 for transmission of the obtained mark information to the controller 430.

The X-Y-θ drive device 420 includes a panel element-holding arm 421, X-Y-θ drive portion 422 and panel element-holding device 423. The panel element-holding arm 421 is connected at its one end to a X-Y-θ-direction movable portion of the X-Y-θ drive member 422, and is adapted, at the other end, to support the suction table 424 of the panel element-holding device 423.

The panel element-holding device 423 includes the suction table 424, exhaust chamber 425, flexible tube 426, exhausting device 427, and can suck and hold the panel element c2 by the suction table 424.

The suction table 424 has a plurality of perforations 424a for suction of air as spaced away from each other at a specific spacing for suction and draw of the panel element c2 in the region for holding the panel element c2.

The exhausting device 427 is connected to one end of the tube 426 and the exhaust chamber 425 is connected to the other end thereof. The exhaust chamber 425 is communicated with the inlet perforations 424a. Thus the air is discharged at the inlet perforations 424a via the exhaust chamber 425 and the tube 426 by the operation of the exhauster 427.

The X-Y-θ drive portion 422 is connected to the controller 430' and can move the suction table 424 and the panel element c2 held by the table 424 along the surface of the panel element c1 sucked and held by the first stage 100 in a specified direction (x direction in the drawing) or a direction vertical to that direction (y direction in the drawing) and can rotate them around an axis vertical to the X-Y plane (Z direction in the drawing). Thereby the panel element c2 can be moved above the panel element c1 held by the first stage 100 under the directions from the controller 430'.

The controller 430' is connected to the CCD cameras 410 and the X-Y-θ drive device 420. The information on the register marks m1, m2 sent from the cameras 410 is processed and the operation of the X-Y-θ drive device 420 is controlled to move the suction table 424 and the panel element c2 for positioning the panel elements c1, c2 by matching the elements with the register marks m1, m2 based on the position information. The controller 430' includes means for using the positioning method by image processing for alignment of substrates, panels and the like. The exhaust chamber 425 and suction table 424 have a transparent hole or window for detecting the register marks m1, m2 of the panel elements.

The device 440 for driving the mechanism for upward and downward movement is disposed above the X-Y-θ drive device 420, and can move upward and downward the drive device 420 at the specified timing. In this manner, the X-Y-θ drive device 420 and the suction table 424 associated therewith can be moved downward by the driving device 440. The suction table 424 is moved close to the panel element c2 placed on the panel element c1 held by the first stage 100 set at a location Q1 for positioning the panel elements, thereby sucking and holding the panel element c2. In this state, the panel element c2 can be driven by the X-Y-θ drive device to position the panel elements c1, c2. After positioning, the panel element c2 is superimposed on the panel element c1 in the positioned state.

The second stage 200' has a panel element-holding surface 200a' showing a ¼ circular arc sector profile when viewed from the side, and includes a panel element-holding device 210'.

The panel element-holding device 210' includes an suction table 201' in the stage 200', exhaust chamber 211', flexible tube 212' and exhausting device 213'. The panel element c2 can be sucked and held by the suction table 201'.

The suction table 201' has a plurality of perforations 210a' for suction of air as spaced away from each other at a specific spacing for suction and draw of the panel element c2 in the region for holding the panel element c2.

The exhausting device 213' is connected to one end of the tube 212' and the exhaust chamber 211' is connected to the other end thereof. The exhaust chamber 211' is communicated with the perforations 201a' of table 201'. Thus the air is sucked at the perforations 201a' via the exhaust chamber 211' and the tube 212' by the operation of the exhausting device 213'.

The second stage 200' is supported by a stage supporting spindle 310' which is a constituent member of the stage-driving device 300'.

The stage-driving device 300' includes as a constituent member the drive device 310 for the stage 100, and further includes a rotary drive portion 320' for driving the stage supporting spindle 310'.

The rotary drive portion 320' can rotate the stage supporting spindle 310' at a specified timing in a specified direction (A direction in the drawing) or a direction opposite to that direction (B direction in the drawing), whereby the second stage 200' can be rotated at the specified timing in the direction A or B.

The second stage 200', stage-supporting spindle 310' and rotary drive portion 320' can be moved upward and downward by a driving mechanism for upward and downward movement (not shown). The second stage 200' can be moved downward to a lower position P3 or moved upward to a retraction position P4 at the specified timing.

The display panel-producing apparatus shown in FIG. 4 is provided, as mentioned above, with the stage 100, the positioning device 400', the holding clip 800 on the stage 100, the gap-forming device 900 and the pressing roller 600'.

The pressing roller 600' is disposed in a specified place. It has an elastic surface layer and a panel-pressing peripheral surface 600a' and is circular in section.

The holding clip 800 is set at one end of the first stage 100 and can hold the superimposed ends of the first and second panel elements c1, c2 positioned and overlaid on the first stage 100.

The gap-forming device 900 includes a supporting member 910 removably linked to the other end of the second panel element c2, a clip 920 for grasping the member 910, a pulley 930 for guiding a wire 950 which pulley is disposed in a specified place, a winch 940 capable of winding the wire and paying out the same, and the wire 950 connected at its one end to the clip 920 and at the other end to the winch 940.

The gap-forming device 900 can form a gap between the panel elements c1, c2 by paying out the wire 950 from the winch 940, grasping the supporting member 910 supporting the panel element c2 by the clip 920, and winding the wire 950. With the progress of adhering the first and second panel elements c1, c2 by the pressing roller 600', the wire 950 is gradually paid out from the winch 940 and the lifted end of the panel element c2 can be lowered.

The display panel-producing apparatus shown in FIG. 5 is provided, as mentioned above, with the stage 100, the positioning device 400', the temporarily fixing device 1000, and the perforation-forming device 1100.

The temporarily fixing device 1000 includes 2 clips 1010 provided at opposite ends of the first stage 100 and can temporarily fix, as mentioned above, the first and second panel elements c1, c2 to the first stage 100 to maintain the mutual positional relationship between the first and second panel elements overlaid and positioned on the first stage 100.

The perforation-forming device 1100 includes two press devices 1110, and can form a position-determining perforation in the first and second panel elements c1, c2 temporarily,fixed to the first stage 100, as mentioned above, for determining the mutual positional relationship between the first and second panel elements c1, c2.

Description is given to an example of the steps for the production of liquid crystal display panels of the reflection type shown in FIG. 1 by the display panel-producing apparatuses shown in FIGS. 2 to 5, with reference to the steps shown in FIGS. 8 to 13.

First, each of R, G, B panel elements for red, green and blue displays is produced before the production of the liquid crystal display panel A shown in FIG. 1 by the display panel-producing apparatuses shown in FIGS. 2 to 5 (one element for each kind).

Any one of R, G, B panels (R panel element in this example) is taken as the first panel element c1 and a panel element (G panel in this example) to be adhered to the element c1 is taken as the second panel element c2. These two panel elements are adhered to each other in the steps in the display panel-producing apparatus to be described below.

First of all, the production of a liquid crystal display panel element by the panel element-producing apparatus shown in FIG. 2 is described.

Figure 8:
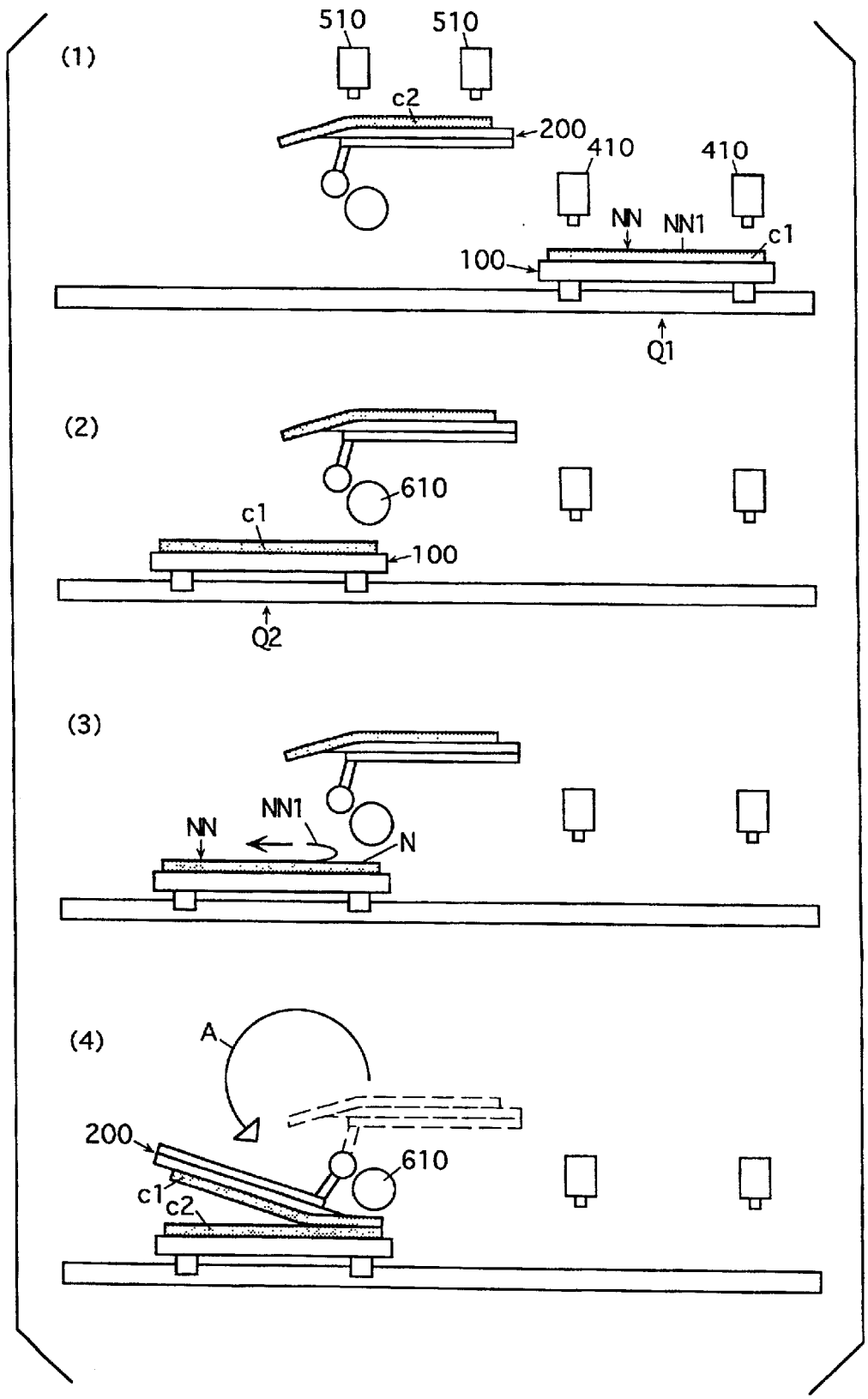
FIG. 8 is a view for describing the steps (1) to (4) in an example of steps for producing a liquid crystal display panel by the apparatus for producing the liquid crystal display panel shown in FIG. 2.

FIG. 8 is a view showing steps (1) to (4) in an example of the steps for production of a liquid crystal display panel by the display panel-producing apparatus of FIG. 2. FIG. 9 shows steps (5) to (8) subsequent to the step (4) in FIG. 8. FIGS. 8 and 9 omit the indication of some parts for simplification.

(1) Pressure sensitive adhesive double-coated tape NN (or adhesive sheet) having one side covered with a protective releasable sheet NN1 is adhered to at least one of surfaces to be adhered of the first and second panel elements c1, c2, i.e. to a side other than the side having the light absorbing layer BK of the first panel element c1 (R panel element in this example).

The first panel element c1 with a surface to be adhered facing up is set onto the first stage 100, and is held to the suction table 101 of the stage 100 by the panel element-holding device 110. The panel element c1 is positioned at the specified location by driving the suction table 101 with the X-Y-θ drive device of the positioning device 400 while inspecting the register marks m1 of first panel element c1 by the CCD camera 410.

Similarly the second panel element c2 (G panel element) with a surface to be adhered facing up is set onto the second stage 200 with one end of the second panel element c2 projected from the second stage 200, and is held to the suction table 201. The panel element c2 is positioned at the specified location by driving the suction table 201 with the X-Y-θ drive device of the positioning device 500 while inspecting the register marks m2 of second panel element c2 by the CCD camera 510.

(2) After completion of positioning of the first and second panel elements c1, c2, the first stage 100 holding the first panel element c1 is moved by the stage driving device 310 to a location where the specified end of panel element c1 is below the pressing member 610, i.e. a location Q2 at which adhesion between the panel elements is initiated.

(3) The protective releasable sheet NN1 is removed from the pressure sensitive adhesive double-coated tape NN adhered to the first panel element c1 on the first stage 100 to expose the adhesive material N.

(4) The second stage 201 holding the second panel element c2 is turned in the direction A by the drive portion 322 of the stage driving device 320 and the end of the panel element c2 is moved to a location where the ends thereof are situated below the pressing member 610 so that the panel elements c1, c2 are brought to an opposed position and the specified ends of the two elements are superimposed. At this time, the positioning device 500 is retracted upward by the driving device for upward and downward movement (not shown).

(5) The pressing member 610 is descended to a location for pressing operation P1 by the driving device for upward and downward movement of the member 610(not shown) and presses the superimposed ends of panel elements c1, c2 against the first stage 100 by part of the panel element-pressing surface of the pressing member 610.

(6) Thereafter the first stage 100 is moved by the stage-driving device 310, relative to the second stage 200 and the pressing member 610. While maintaining the state of the panel elements being pressed by the pressing member 610 and drawing the panel element c2 from the second stage 200, the panel elements c1, c2 are adhered as pressed by the pressing member 610 on the first stage 100, progressively via the adhesive material N.

(7) The pressing member 610 is moved to the terminal ends of the panel elements c1, c2 and ascended by the driving device for upward and downward movement (not shown).

(8) After completion of adhering the panel elements c1, c2, the suction operation of the second stage 200 by the panel element-holding device 210 is made inoperative, and the stage 200 is turned in the B direction for return to its original location.

After completion of adhering the panel elements, the first stage 100 holding the panel element is returned to its initial location Q1.

Then, the same process is repeated to adhere the B panel element to the combination of two elements, by taking the combination of the R and G panel elements as the first panel element and taking the B panel element to be adhered next as the second panel element. In this way, a display panel A having a layered structure of R, G and B panel elements is obtained.

Description is given to an example of the steps for the production of liquid crystal display panels by the display panel-producing apparatus shown in FIG. 3.

Figure 10:
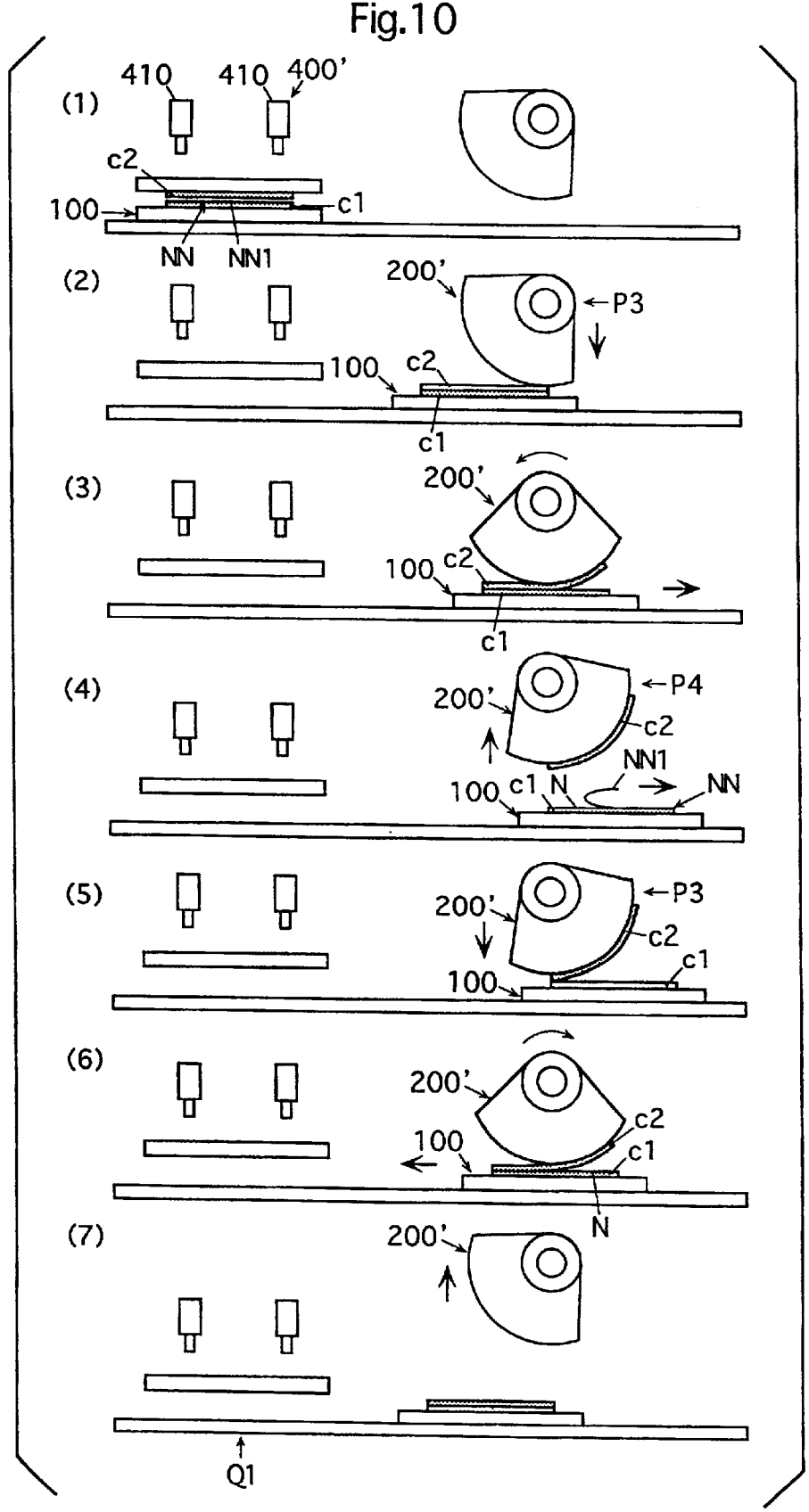
FIG. 10 is a view for describing the steps (1) to (7) in an example of steps for producing a liquid crystal display panel by the apparatus for producing the liquid crystal display panel shown in FIG. 3.

FIG. 10 is a view showing steps (1) to (7) in an example of the steps for production of a liquid crystal display panel by the display panel-producing apparatus shown in FIG. 3. FIG. 10 omits the indication of some parts for simplification.

(1) Pressure sensitive adhesive double-coated tape NN (or adhesive sheet) having one side covered with a protective releasable sheet NN1 is adhered to at least one of surfaces to be adhered of the first and second panel elements c1, c2, i.e. to a side other than the side having the light absorbing layer BK of the first panel element c1 (R panel element in this example).

The first panel element c1 with a surface to be adhered facing up is set onto the first stage 100, and is sucked to and held by the suction table 101.

The second panel element c2 (G panel element in this example) is overlaid over the first panel element c1 and is relatively positioned.

The positioning is carried out as follows. The panel element c2 disposed on the panel element c1 is sucked to and held by the suction table 424 of the panel element-holding device 423 of the positioning device 400', and thereafter the suction table 424 holding the second panel element c2 is moved by the X-Y-θ drive device 420 to achieve matching of register marks m1, m2 of two panel elements c1, c2 while inspecting the register marks m1, m2 of two panel elements c1, c2 in such a sate by the CCD cameras 410. The positioning operation is conducted under the directions from the controller 430' based on the mark information obtained by inspection of marks with the cameras 410. After positioning operation is completed, the panel element c2 is again laid on the panel element c1 in the positioned state.

(2) The first stage 100 holding the positioned and overlaid panel elements c1, c2 is moved by the stage driving device 310 to a location below the second stage 200'. At this time, the second stage 200' is moved downward to the specified lower position P3 in such manner that a gap between the first stage 100 and second stage 200' is substantially equal in distance to the thickness of two panel elements.

(3) The first stage 100 is continuously moved while the second stage 200' is moved synchronously with the first stage 100 by the rotary drive portion 320' until it is brought into a rolling contact with the second panel element c2. In this way, the second panel element c2 is sucked to and held by the second stage 200' by the panel element-holding device 210'. The second panel element c2 is held by the second stage 200' by bringing the panel element-holding surface 200a' of the stage 200' into relative rolled contact with the panel element c2.

(4) The second stage 200' holding the second panel element c2 is moved upward by the deriving device for upward and downward movement of the stage (not shown) to a retraction location P4 and the protective releasable sheet NN1 is removed from the adhesive double-coated tape NN to expose the adhesive material N.

(5) The second stage 220' holding the second panel element c2 is moved downward to a location P3 and one end of the second panel element c2 is pressed against one end of the first panel element c1.

(6) The first stage 100 is returned to the location Q1 while the second stage 200' holding the second panel element c2 is reversely rotated synchronously with the first stage 100 to roll over the first panel element c1 under pressure against the first stage 100 via the second panel element c2 to thereby adhere the second panel element c2, from its one end to its other end, progressively all over the surface of the first panel element c1 via the adhesive material.

(7) The suction operation of the second stage 200' by the panel element-holding device 210' is made inoperative and the second stage 200' is moved upward.

After completion of the adhering of two panel elements, the first stage 100 holding the adhered panel elements is returned to the initial location Q1.

Then, the same process is repeated to adhere the B panel element to the combination of two elements, by taking the combination of the R and G panel elements as the first panel element and taking the B panel element to be adhered next as the second panel element. In this way, a display panel A having a layered structure of R, G and B panel elements is obtained.

Description is given to an example of the steps for the production of liquid crystal display panels by the display panel producing apparatus shown in FIG. 4.

Figure 11:
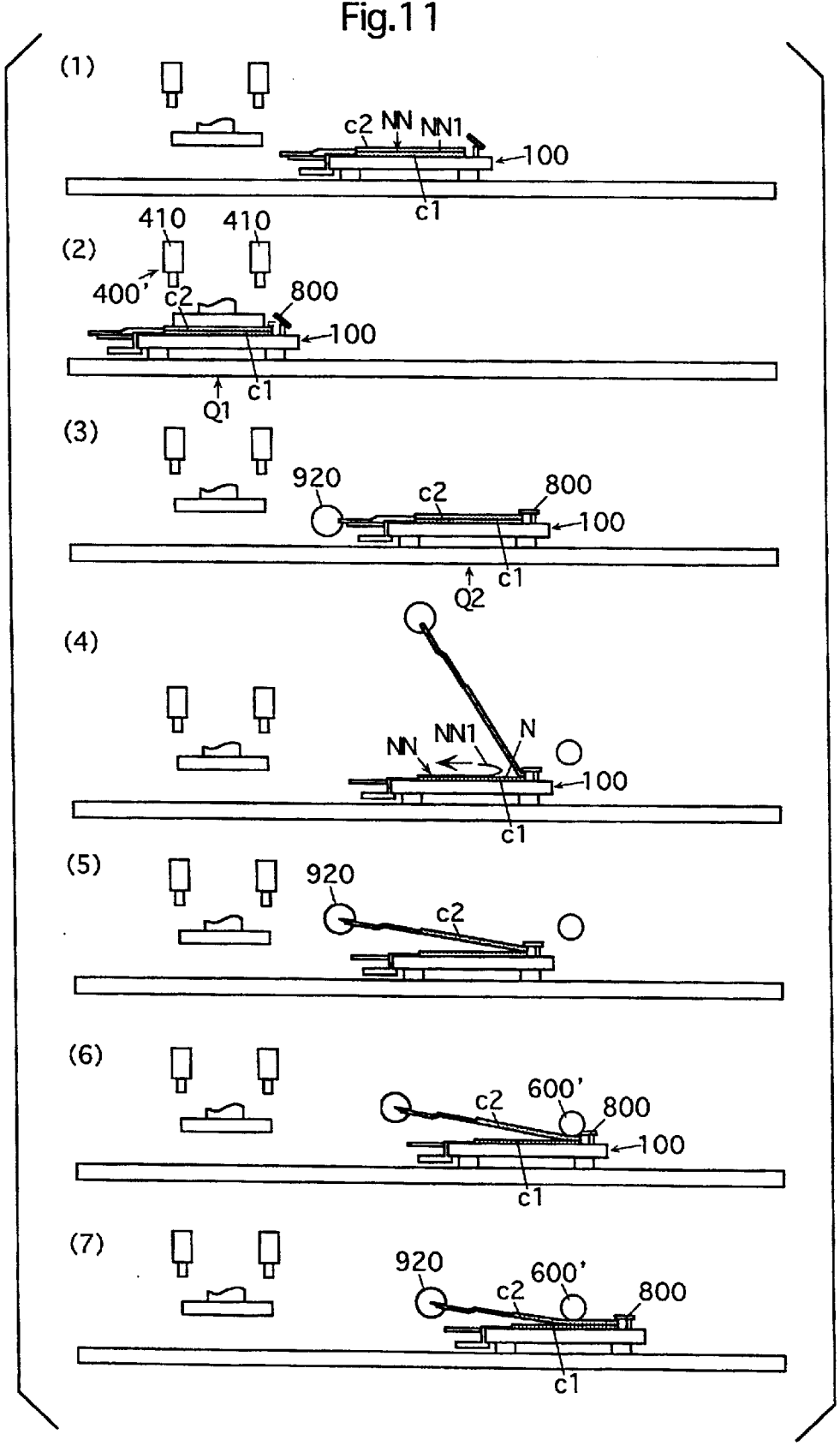
FIG. 11 is a view for describing the steps (1) to (7) in an example of steps for producing a liquid crystal display panel by the apparatus for producing the liquid crystal display panel shown in FIG. 4.

FIG. 11 is a view showing steps (1) to (7) in an example of the steps for production of a liquid crystal display panel by the display panel-producing apparatus shown in FIG. 4. FIG. 11 omits the indication of some parts for simplification.

(1) Pressure sensitive adhesive double-coated tape NN (or adhesive sheet) having one side covered with a protective releasable sheet NN1 is adhered to at least one of surfaces to be adhered of the first and second panel elements c1, c2, i.e. to a side other than the side having the light absorbing layer BK of the first panel element c1 (R panel element in this example).

The first panel element c1 with a surface to be adhered facing up is set onto the first stage 100 by rough positioning and is sucked to and held by the suction table 101 of the stage 100 by the panel element-holding device 110. The panel element c2 (G panel element in this example) is overlaid on the first panel element c1 by rough positioning.

(2) The first stage 100 having the first and second panel elements c1, c2 mounted thereon is moved by the stage-driving device 310 to a location below the positioning device 400', i.e. the panel element-positioning location Q1. The panel element c2 is positioned relative to the panel element c1 using the device 400'. This positioning operation is similar to the step (1) in FIG. 10 so that elucidation is omitted. After completion of positioning of panel elements c1, c2, ends (right side of panel element in the drawing) of the first and second panel elements c1, c2 thus positioned are held by the holding clip 800 as superimposed on the stage 100.

(3) The first stage 100 having the first and second panel elements c1, c2 mounted thereon is moved by the stage-driving device 310 to the panel element-initially adhering location Q2. The panel element c2 is held at the other end (left side portion in the drawing) by the supporting member 910 which is grasped by the clip 920.

(4) A gap is formed by the gap-forming device 900 between the first and second panel elements c1, c2, except the ends of these elements held by the clip 800. By winding the wire 950 by the winch 940, the end of the second panel element c2 supported by the clip 920 via the supporting member 910 is pivoted and lifted around the ends of the two panel elements c1, c2 held by the clip 800.

The protective sheet NN1 is removed from the pressure sensitive adhesive double-coated tape NN adhered to the first panel element c1 on the first stage 100 to expose the adhesive material N.

(5) The clip 920 is lowered to a specified position by holding the second panel element c2 by the wire 950 without slackening the same.

(6) While paying out the wire 950, the first stage 100 is further moved by the stage driving device 310, and the pressing roller 600' begins to press the upper surface of the second panel element c2 when the ends of the panel elements c1, c2 held by the clip 800 are moved to a location below the pressing roller 600'. The pressing roller 600" is adapted to go over the clip 800 by deformation due to the elastic surface layer of the roller. While gradually lowering the clip 920 with the progress of adhering the first and second panel elements c1, c2, the elements c1, c2 are adhered by pressing with the pressing roller from the side of ends of elements held by the holding clip 800 toward the entire area.

Then, the same process is repeated to adhere the B panel element to the combination of two elements, by taking the combination of the R and G panel elements as the first panel and taking the B panel element to be adhered next as the second panel element. In this way, a display panel A having a layered structure of R, G and B panel elements is obtained.

Description is given to an example of the Ad steps for the production of liquid crystal display panels by the display panel-producing apparatus shown in FIG. 5.

Figure 12:
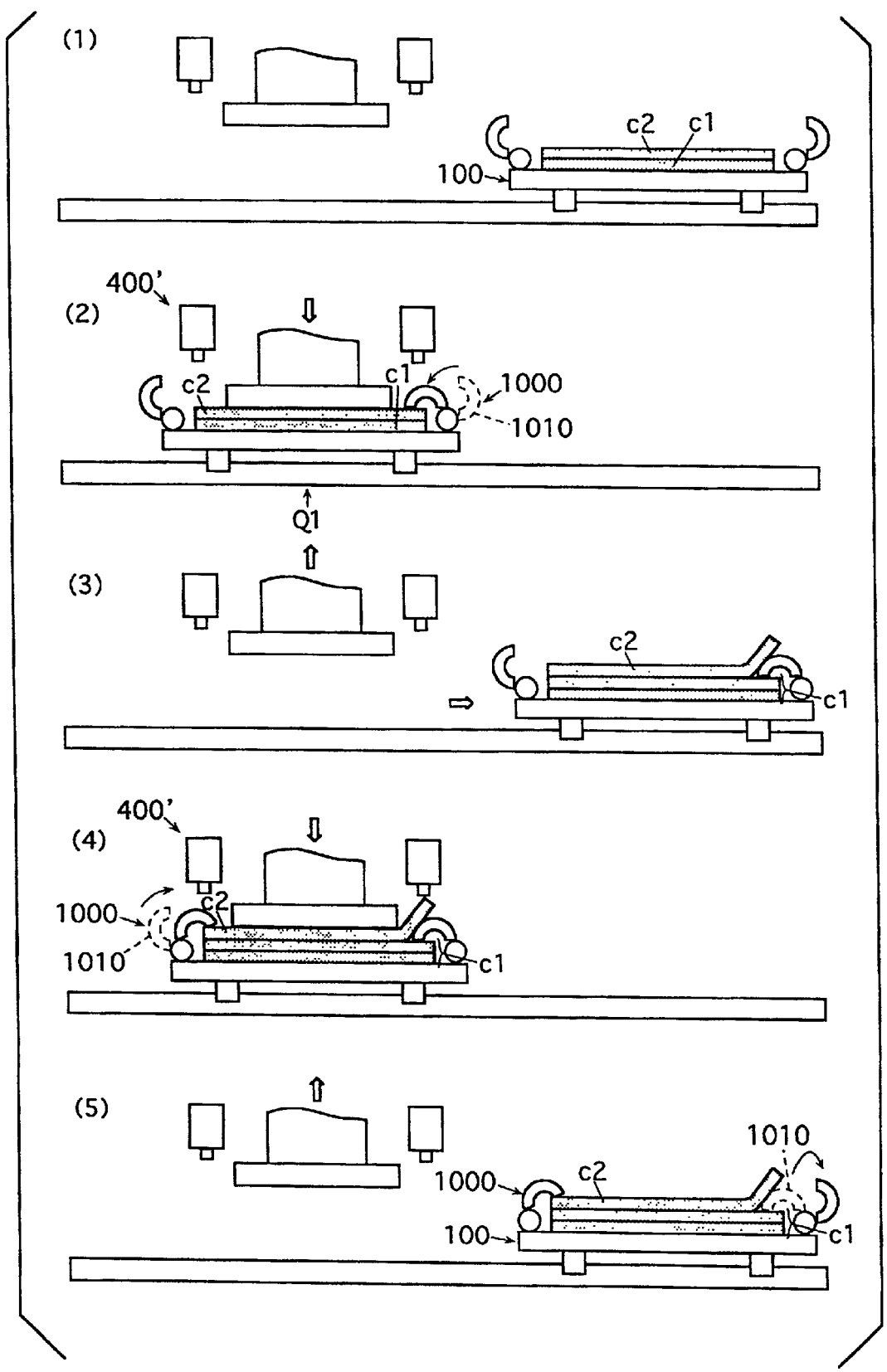
FIG. 12 is a view for describing the steps (1) to (5) in an example of steps for producing a liquid crystal display panel by the apparatus for producing the liquid crystal display panel shown in FIG. 5.
Figure 13:
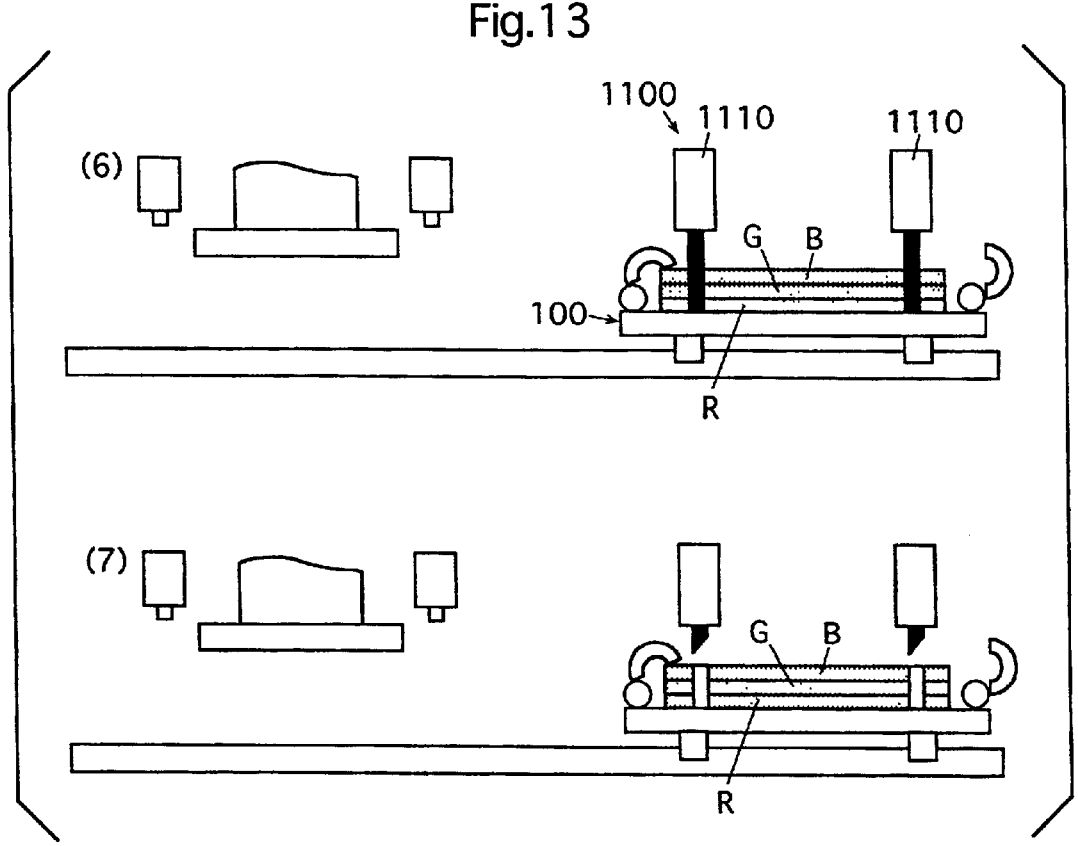
FIG. 13 is a view for describing the steps (6) and (7) subsequent to the steps shown in FIG. 12.
Figure 14A:
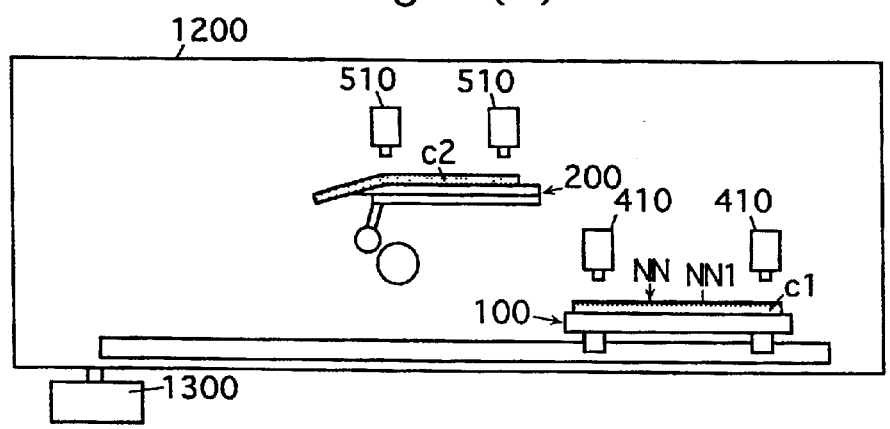
FIG. 14(A) schematically shows a structure of the apparatus for producing a display panel shown in FIG. 2, FIG. 14(B) schematically shows a structure of the apparatus for producing a display panel shown in FIG. 3, FIG. 14(C) schematically shows a structure of the apparatus for producing a display panel shown in FIG. 4, and FIG. 14(D) schematically shows a structure of the apparatus for producing a display panel shown in FIG. 5, in all of which a vacuum chamber and an exhauster for discharging the air and reducing the pressure in a chamber are provided.
Figure 14B:
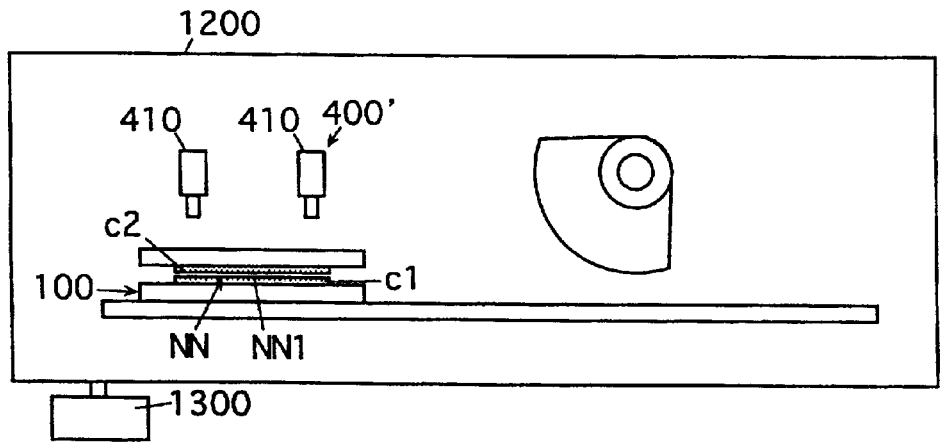
Figure 14C:
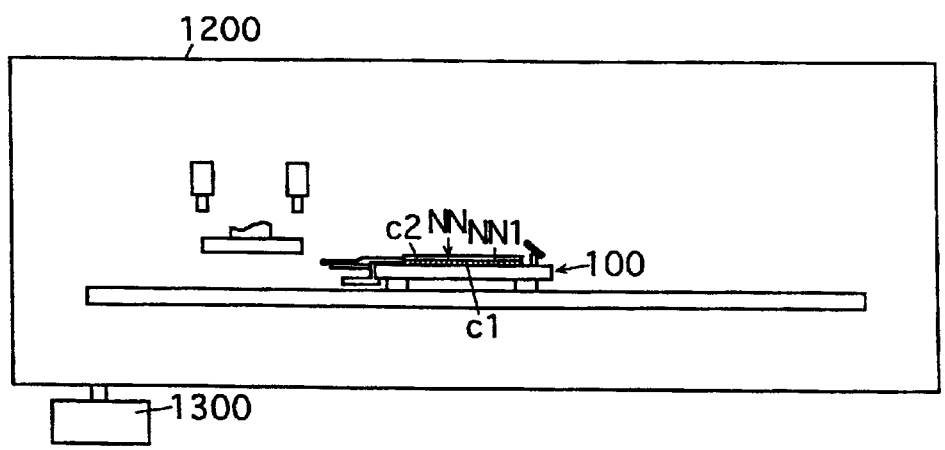
Figure 14D:
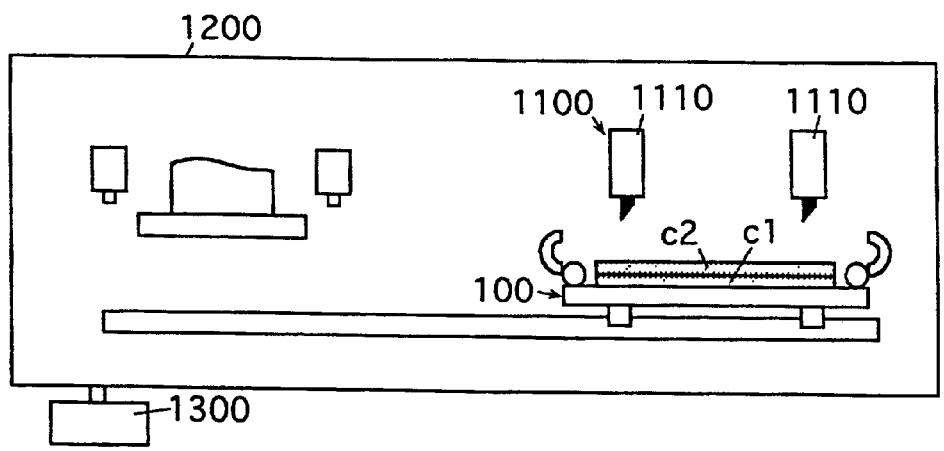

FIG. 12 is a view showing steps (1) to (5) in an example of the steps for the production of a liquid crystal display panel by the display panel-producing apparatus shown in FIG. 5. FIG. 13 shows steps (6) and (7) subsequent to the step shown in FIG. 12. FIGS. 12 and 13 omit the indication of some parts for simplification.

(1) The first panel element c1 (R panel element in this example) with a surface to be adhered facing up is set onto the first stage 100 by rough positioning and is sucked to and held by the suction table 101 of the stage 100 by the panel element-holding device 110. The panel element c2 (G panel element in this example) is overlaid on the first panel element c1 by rough positioning.

(2) The first stage 100 having the first and second panel elements c1, c2 mounted thereon is moved by the stage-driving device 310 to a location below the positioning device 400', i.e. the panel element-positioning location Q1. The panel element c2 is positioned relative to the panel element c1 using the device 400' and is overlaid on the same. This positioning operation is similar to the step (1) in FIG. 10 so that elucidation is omitted. After completion of positioning of panel elements c1, c2, ends (right side of panel element in the drawing) of the first and second panel elements c1, c2 thus positioned are temporarily fixed to the stage 100 by the one of the clips 1010 of the temporarily fixing device 1100.

(3)-(4) The first stage 100 having the first and second panel elements c1, c2 mounted thereon is moved by the stage-driving device 310 to the original location. Then, the steps (1) and (2) are repeated, while taking the panel element comprising the temporarily fixed R and G panel elements as the first panel c1 and taking the B panel element to be adhered next as the second panel element c2. After completion of positioning the panel elements c1, c2, the other ends (left side portion in the drawing) of the panel elements c1, c2 thus positioned are temporarily fixed to the stage 100 by the other clip 1010 of the temporarily fixing device 1000. The B panel element is temporarily fixed to the temporarily fixed R and G panel elements by the other clip 1010 of the temporarily fixing device 1000.

(5) The first stage 100 is returned to the original location together with the temporarily fixed panel elements by the first stage driving device 310. Then, one of the clips 1010 temporarily fixing the R and G panel elements is disengaged. In this way, The R, G, B panel elements as positioned are overlaid over each other in three layers.

(6) The first stage 100 mounting the R, G, B panel elements temporarily fixed by the other clip 1010 of the temporarily fixing device 1000 is moved to a location below the press devices 1110 of the perforation-forming device 1100. Position-determining perforations are formed each in the R, G, B panel elements at the same time.

(7) Then, the R, G panel elements are adhered by conducting substantially the steps shown in FIG. 11 except that one ends of the R, G panel elements are held on the first stage 100 using the position-determining perforations instead of the step 2 of the steps shown in FIG. 11 and then the B panel element is adhered to the R, G panel elements already adhered and the same steps are repeated, whereby the B panel element is adhered to the R, G panel elements, giving the desired display panel A.

In any of the methods and apparatuses for producing a display panel as shown in FIGS. 2 to 5, adjacent panel elements are adhered together in a state of being precisely positioned and accordingly a display panel is provided which can perform display of better images.

In any of the methods and apparatuses for producing a display panel as shown in FIGS. 2 to 4, neighboring panel elements are adhered together progressively from the ends of the elements so that the air is released from between the panel elements, thereby bringing them in a close contact and they can be adhered without creating any wrinkle, whereby a display panel capable of performing display of better images can be obtained.

In the method and apparatus for producing a display panel as shown in FIG. 5, neighboring panel elements can be adhered together progressively from the ends of the elements so that the air is released from between the panel elements, thereby bringing them in a close contact and they can be adhered without creating any wrinkle.

In any of the apparatuses for producing a display panel as shown in FIGS. 2 to 5, a vacuum chamber may be provided for adjusting the atmosphere surrounding the two panel elements to be adhered to a reduced pressure in adhering the neighboring panel elements.

FIG. 14(A) to FIG. 14(D) schematically show structures of apparatuses for producing a display panel shown in FIGS. 2 to 5, in all of which a vacuum chamber 1200 and an exhausting device 1300 for discharging air from the chamber and reducing the pressure in the chamber are provided.

The vacuum chamber 1200 is airtight and can surround the stage(s) 100, 200, 200'. The exhausting devices 113, 213, 213', 427, and the like are provided outside the vacuum chamber 1200. The exhausting device 1300 includes a rotary pump, and can exhaust the air and reduce the pressure in the vacuum chamber 1200. The vacuum chamber 1200 has an airtight door (not shown) for ingress and egress of the panel element.

When the vacuum chamber 1200 is used, the pressure in the vacuum chamber is reduced to a specified level at least in adhering the two panel elements in any of the apparatuses for producing a display element as shown in FIGS. 2 to 5. The specified level of pressure in the vacuum chamber 1200 may be in the range of about 13 Pa to about 40 Pa (about 0.1 Torr to about 0.3 Torr), although not limited thereto.

[B] Method and Apparatus for Producing a Display Panel Relating to FIGS. 15 to 20

The method and apparatus for producing a display panel relating to FIGS. 15 to 12 are based on the following methods and apparatuses for producing a display panel.

(Apparatus for Producing a Display Panel)

The method is to produce a display panel by layering panel elements for forming a display panel for display of images, and includes the steps of supplying an adhesive material to at least one of surfaces to be adhered of the first and second panel elements; relatively positioning the first and second panel elements and bringing the surfaces of the elements to be adhered to opposed positions; splicing the positioned first and second panel elements via the adhesive material under a pressure, the pressure-splicing of the first and second panel elements in the splicing step being conducted in such a manner that the first and second panel elements are adhered initially partially and a pressure-spliced area between the two panel elements is extended from an initial limited pressure-spliced area to a broader pressure-spliced area until the first and second panel elements are adhered all over the entire area.

A typical example of the method for producing a display element is as follows.

The method is to produce a display panel by layering panel elements for forming a display panel for display of images, and includes the steps of allowing a first stage to hold a first panel element; allowing a second stage to hold a second panel element; bringing the first and second panel elements held by the first and second stages to a position wherein the surfaces to be adhered are opposed to each other; positioning the first and second panel elements relatively; supplying an adhesive material to at least one of surfaces to be adhered of the first and second panel elements; and splicing under a pressure the first and second panel elements as positioned and held by the first and second stages and as interposed therebetween via the adhesive material, wherein at least one of the first and second stages has an elastic pad with a panel element-holding surface which is a convex curved face having a specified curvature.

The first and second panel elements are initially partially spliced under the pressure by the convex curved surface of the elastic pad when making the first and second stages closer to each other, and a pressure-spliced area between the two panel elements is extended from an initial small region to a broader region until the two panel elements are spliced all over the entire region when further bringing the stages closer to each other while allowing the pad to elastically deform.

In any of the producing methods, the step of applying the adhesive material onto at least one of the surfaces to be adhered of the first and second panel elements may be the step of removing a protective sheet from a pressure sensitive adhesive double-coated tape or an adhesive sheet (or tape) adhered in advance to the surface of panel element to expose the adhesive surface, or the step of applying an adhesive material to the panel element surface by hands or by an applicator for applying the adhesive material, or the like. The adhesive material may be applied or supplied by optional methods which are not problematic.

The step of applying or supplying the adhesive material can be carried out prior to the splicing step at any stage which is not problematic.

The splicing step is conducted after supplying the adhesive material, positioning the two panel elements and bringing the two panel elements to a position wherein the surfaces to be adhered are opposed.

In any of the producing methods, the first and second panel elements can be relatively positioned by various methods, for example, by per se known methods of positioning a substrate or a panel.

Examples of positioning methods are as follows.
(1) A register mark is formed on respective panel elements. After one of the first and second panel elements is fixed to a specified position, the other panel element is set on or above the former panel element, and the register marks of the two panel elements are visually inspected or observed through a camera so that the other panel element is manually moved to achieve matching of register marks.

When this positioning method is employed in a manner to set the respective panel elements on the first and second stages, e.g. one of the panel elements is set on the corresponding stage and the other panel element is overlaid on the former panel element. Then the register marks of the two panel elements are visually inspected or observed through a camera so that the other panel element is moved manually to match the register marks of the two panel elements. Thereafter the other panel element can be set on the other stage.
(2) A register mark is formed on respective panel elements. After one of the first and second panel elements is fixed to a specified position, the other panel element is set on or above the former panel element, and the register marks of the two panel elements are observed through a camera so that the other panel, element is moved by a X-Y-$\theta$ drive device to match the register marks of the two panel elements.

When this positioning method is employed in a manner to set the respective panel elements on the first and second stages, e.g. one of the panel elements is set on the corresponding stage and the other panel element is overlaid on the former panel element. Then the register marks of the two panel elements are observed through a camera while moving the other panel element by the X-Y-$\theta$ drive device to match the register marks of the two panel elements.

The stage for holding the other panel element may include a X-Y-$\theta$ drive device. In this case, the device may be operated to position the other panel element after the other panel element is set on the stage. When the stage for holding the other panel element does not include a X-Y-$\theta$ drive device, after overlaying the other panel element positioned in advance on the former panel element, the other panel element thus positioned is set to the stage for the other panel elements.

The alignment with use of X-Y-$\theta$ drive device may be conducted by manually operating the X-Y-$\theta$ drive device. Optionally the operation of X-Y-$\theta$ drive device may be controlled so as to position the panel elements according to the mark data (e.g. information on the position) obtained by inspection with a camera. In the latter case, an image processing method for alignment of substrates, panels and the like can be employed.

The X-Y-$\theta$ drive device is, needless to say, capable of moving an object in a direction X and in a vertical direction Y and rotating the object about an axis vertically of X-Y planar surface.

The register mark may be, for example, a liquid crystal mark, electro-luminescence mark and the like, which emit light rays on application of electric power.

In any of the foregoing producing methods, a display panel comprising layered panel elements is produced by splicing the first and second panel elements via the adhesive material in the pressure-splicing step.

When adhering the first and second panel elements as held by the first and second stages, they are spliced as interposed between stages.

When three or more panel elements are layered, the panel elements adhered by the above-mentioned splicing step are taken as the first panel element, and one panel element to be adhered next is taken as the second panel element. More panel elements to be adhered next are adhered, one by one, to the panel elements already adhered by substantially repeating the respective steps described above.

When the first and second panel elements are held by the first and second stages, for example, the panel elements may be held by the stages, respectively, by sucking air through perforations provided in the stage for suction of air to draw and hold the panel element onto the stage, although not limited thereto. Such perforations are formed at least in the pad if the stage has the pad.

Such elastic pad may have fine perforations for retaining the panel element on the convex curved surface by vacuum suction, and typically the fine perforations are closed in the pressure-splicing step due to elastic deformation of the pad. The elastic pad can release the portion spliced to another panel element of the panel element held by the pad when the two panel elements are pressure-spliced in the splicing step, whereby the two panel elements are more smoothly adhered together. The first and second panel elements are initially partially spliced, extending the initial narrow spliced area gradually to a larger spliced area until the two panel elements are spliced all over the entire region. By such splicing procedure, the two panel elements start to become spliced while they are kept from displacement and from creation of wrinkles, releasing the air. In the splicing step, the first and second panel elements are spliced for example, initially in their center, broadening the small spliced area gradually to a larger spliced area (e.g. to the surrounding or to both ends of the two panel elements) until the two panel elements are spliced all over the entire region. Or e.g., the two panel elements are spliced initially in any of the ends thereof, developing the spliced area from the initially spliced area (e.g. toward the ends on the opposite side), extending the spliced area until they are spliced all over the entire region.

When the two panel elements are adhered together as held by the first and second stages having at least any one of which is provided with said elastic pad, the two panel elements are spliced initially partially at the convex curved surface of the pad by bringing the stages into closer positions, and when further bringing the stages closer to each other while allowing the pad to elastically deform, the spliced area is extended until the two panel elements are spliced all over the whole region.

Stated more specifically, for example, when the elastic pad has an convex curved surface, e.g. having a spherical, semi-spherical, or truncated cylinder-like peripheral shape, the first and second panel elements are spliced in the splicing step, initially in the center thereof, broadening the spliced area (e.g. toward the surrounding area or the ends thereof) from the initial area until they are spliced all over the whole region.

Optionally the pad has a convex curved surface which is high in one end and is gradually declined from the end toward the other end, and the two panel elements are spliced initially at one end and the pressure-spliced area is broadened toward the other end.

To adhere the first and second panel elements without damage to the two panel elements and keeping the two panel elements from displacement and from formation of wrinkles and discharging the air from the two panel elements, it is recommendable to use the elastic pad formed of an elastic body having an elastic coefficient of 60 kgf/cm$^2$ to 200 kgf/cm$^2$. The convex curved surface may be a smoothly curved face having a spherical, semi-spherical, or truncated cylinder-like peripheral shape, or a convex curved surface which is high in one end and is gradually declined from the end toward the other end. In this case, the convex curved surface has preferably a radius of curvature in the range of about 2000 mm to about 5000 mm. The splicing step may be conducted under a pressure in an atmosphere surrounding the two panel elements which is reduced to a specified level to assure the discharge of air from between the two panel elements.

The reduced pressure is e.g. in the range of about 13 Pa to about 40 Pa (about 0.1 Torr to about 0.3 Torr).

When the two panel elements are adhered together as held by the first and second stages, the first and second panel elements may be surrounded with an elastically deformable ring member in the splicing step, so that an airtight chamber may be formed so as to surround the two panel elements with the ring member interposed between the first and second stages in which case the reduced atmospheric pressure may be given by exhausting the air from the airtight chamber.

(Apparatus for Producing a Display Panel)

The apparatus for producing a display panel comprises: a first stage for holding a panel element; a second stage for holding another panel element; a stage-driving device for driving the first and second stages to move the first and second stages closer to each other or away from each other with the panel element-holding surfaces of the stages as opposed, wherein at least one of the first and second stages has an elastic pad having a panel element-holding surface, and the panel element-holding surface is a convex face having a specified curvature.

The first and second stages have a device for holding the panel element. An example of the holding device includes, for example, perforations for suction of air to draw and hold the panel element onto the stage by vacuum suction. Such perforations are formed at least in the elastic pad when the stage has the elastic pad.

Such elastic pad may have fine perforations for holding the panel element on the convex curved surface by vacuum suction. Typically the perforations are closed in the pressure-splicing step due to elastic deformation of the elastic pad. The elastic pad can release the portion spliced to another panel element of the panel element held by the pad when the two panel elements are pressure-spliced in the splicing step, whereby the two panel elements can be more smoothly adhered together.

According to the above-mentioned apparatus for producing a display panel, one of the panel elements to be adhered is held by the first stage and the other is held by the second stage.

Thereafter the first and second stages are moved closer to each other by the stage-driving device with their panel element-holding surfaces as opposed. In other words, the surfaces to be adhered of the panel elements held by the stages are in opposed positions, and are relatively moved closer to each other, whereby the two panel elements are adhered as interposed by the stages.

The two panel elements are adhered with an adhesive material. The adhesive material is supplied to at least one of the surfaces to be adhered of the two panel elements in the same manner as described concerning the method for producing a display before the splicing (adhering) operation. The producing apparatus may have an applicator for applying the adhesive material.

The two panel elements are relatively positioned before adhering the two panel elements. The positioning operation is conducted in the same manner as described concerning the above-mentioned method for producing a display panel.

The producing apparatus may be provided with a device for relatively positioning the two panel elements, such as a device for relatively positioning the two panel elements on the first and second stages. Following devices may be employed.

(1) A positioning device including a camera for observing register marks formed on the two panel elements and a X-Y-θ drive device for moving a panel element on or above the other panel element held by any one of the first and second stages to position them by matching the register marks of the two panel elements.

(2) A positioning device including a camera for observing register marks formed on the two panel elements, a X-Y-θ drive device for moving a panel element on or above the other panel element held by any one of the first and second stages, and a controller for control of operation of the X-Y-θ drive device for moving the panel element on or above the other panel element held by any one of the first and second stages to position the element by matching the register marks of the two panel elements based on the mark information (such as positional information) from a camera. Such controllers include, for example, those employing a positioning method by image processing for alignment of substrates, panels and the like.

According to the producing apparatus as described above, the two panel elements are adhered together as follows. The two panel elements are initially partially pressure-spliced using the convex curved surface of the elastic pad, extending the pressure-spliced area from the initial pressure-spliced area until they are pressure-spliced all over the entire region. In this way, without damage to the two panel elements and keeping the two panel elements from displacement and from formation of wrinkles and discharging the air from the two panel elements, the pressure-spliced area is extended and the two panel elements are adhered.

When three or more panel elements are adhered, the two panel elements already adhered by the final adhering operation are taken as one of the two panel elements to be adhered.

Employable as the convex curved surface of the elastic pad are convex curved surfaces which are high in its center such as those having a spherical, semi-spherical, or truncated cylinder-like peripheral shape, or the like. When such convex curved surface is used, the two panel elements are pressure-spliced initially in the center thereof, broadening the pressure-spliced area (e.g. toward the surrounding area or the ends thereof) from the initial area.

Optionally, for example, the pad has a convex curved surface which is high in one end and is gradually declined from the end toward the other end. In this case, the two panel elements are pressure-spliced initially in one end, broadening the pressure-spliced area to the other end from the initial area.

To adhere the first and second panel elements without damage to the two panel elements and keeping the two panel elements from displacement and from formation of wrinkles and discharging the air from the two panel elements, it is recommendable to use the elastic pad formed of an elastic body having an elastic coefficient of 60 kgf/cm$^2$ to 200 kgf/cm$^2$. The convex curved surface may be a smoothly curved face having a spherical, semi-spherical, or truncated cylinder-like peripheral shape, or a convex curved surface which is high in one end and is gradually declined from the end toward the other end. In this case, the convex curved surface has preferably a radius of curvature in the range of about 2000 mm to about 5000 mm.

In adhering the two panel elements, an exhausting device capable of discharging the air and reducing the pressure from between the two panel elements may be provided for assuring the exhaust of air from between the two panel elements.

A simplified mode of the exhausting device may be a device including an elastically deformable ring member for forming an airtight chamber in which the air pressure is reduced by the discharge of air, the ring member being adapted to surround the two panel elements together with the first and second stages when interposed between the stages coming closer to each other.

The above-mentioned [B] type method and apparatus can be applied to the production of display panels. Specific examples of the method and apparatus for producing a liquid crystal display panel are described below with reference to FIGS. 15 to 20.

FIG. 15 schematically shows a structure of an example of an apparatus for producing the liquid crystal display panel A shown in FIG. 1.

The foregoing apparatus for producing a display panel comprises: a first stage 100 for holding a panel element c1; a second stage 200 for holding another panel element c2; and a stage-driving device 300 for driving the first and second stages 100, 200 to move the first and second stages 100, 200 closer to or away from each other with panel element-holding surfaces of the stages as opposed.

In this producing apparatus, the second stage 200 has an elastic pad 220 having a panel element-holding surface 220a, and the panel element-holding surface 220a is a convex curved face having a specified curvature. As described later with reference to FIGS. 16 and 17, when the stage-driving device 300 brings the first and second stages 100, 200 to a face-to-face position to move them closer to each other, whereby the two panel elements c1, c2 are partially pressure-spliced by the convex curved surface of the elastic pad 220. Subsequently when the first and second stages 100, 200 are moved further closer to each other, the two panel elements c1, c2 are pressure-spliced as pressed by the convex curved surface of the elastic pad 220 which elastically deforms, extending the pressure-spliced area from the initial pressure-spliced area until they are pressure-spliced all over the entire region. Thus a display panel comprising layered display panel elements c1, c2 are produced.

The first and second stages 100, 200 include first and second suction tables 101, 201 and panel element-holding devices 110, 210 for holding a panel element, respectively.

The first and second suction tables 101, 201 are made of a rigid material and have a plurality of perforations 101a, 201a spaced away from each other at a specified distance.

The panel element-holding devices 110, 210 have not only such perforations 101a 201a, but exhaust chambers 111, 211, flexible tubes 112, 212, and exhausting devices 113, 213. The exhausting devices 113, 213 are connected to one end of the tubes 112, 212, and exhaust chambers 111, 211 are connected to the other end of the tubes 112, 212. The exhaust chambers 111, 211 are communicated with the perforations 101a, 201a of the tables 101, 201. In this way, the air is sucked from the perforations 101a, 201a through the exhaust chambers 111, 211 and tubes 112, 212 by the operation of the exhausting devices 113, 213.

The second stage 200 has the elastic pad 220 having the panel element-holding surface 220a as mentioned above. The elastic pad 220 is provided on other side than the side on which the exhausting device 211 for the second suction table 201 is provided.

The elastic pad 220 is formed of an open-cell elastic rubber foamed body, and has fine perforations 220b for keeping the panel element c2 at the convex curved surface 220a by suction of air. The perforations 220b are closed due to elastic compression deformation of the elastic pad 220. Although, the elastic pad 220 is formed of an open-cell elastic rubber foamed body having a plurality of perforations, the elastic pad 220 may be formed of an elastic body with perforations formed therein.

The panel element-holding surface 220a is high in one end 220c surface and is gradually declined from the end toward the other end, and can hold the panel element on the convex curved surface (having a radius of curvature of about 4000 mm~about 5000 mm here). The two panel elements are pressure-spliced initially at one end thereof and gradually broadening the pressure-spliced area from the initial small area toward the other end.

The elastic pad 220 can release the portion spliced to another panel element of the panel element held by the pad because the perforations are closed due to compression of the pad when the two panel elements c1, c2 are pressure-spliced in the pressure-splicing step, whereby the two panel elements c1, c2 are more smoothly adhered together.

To adhere the two panel elements c1, c2 without damage to the two panel elements and keeping the two panel elements from displacement and from formation of wrinkles and discharging the air from the two panel elements, it is recommendable to use the elastic pad formed of an elastic body having an elastic coefficient of 70 kgf/cm$^2$ to 120 kgf/cm$^2$.

The first stage-driving member 300 is provided for driving the stage 100, 200 and includes a first stage-driving portion 310 and a second stage-driving portion 320 although not limited thereto. The first stage-driving portion 310 is such that a pinion gear 313 provided in the first stage 100 is engaged with a rack gear 311a arranged along a guide rail 311 and is reciprocatingly rotated by a motor 312 mounted on the first stage 100. The first stage 100 is moved along the guide rail 311 by the driving portion 310, and is disposed in a location Q1 for holding the panel element or a location Q2 where the panel elements are adhered. In this movement, a slider 102 provided on the first stage 100 slides along the guide rail 311.

The drive device 320 includes a piston cylinder device 321 and a pneumatic circuit 322 for driving the same although not limited thereto. The piston cylinder device 321 is of double acting type and a cylinder member 321a thereof is disposed in a specified place while a piston rod 321b is connected to the second stage 200. The pneumatic circuit 322 can supply compressed air of specified pressure to the piston cylinder device 321.

In the illustrated state, the compressed air is supplied to the side of the piston rod of the piston cylinder device 321 from the pneumatic circuit 322, and the piston rod 321b is retracted to a cylinder member 321a, whereby the second stage 200 is ascended.

When the compressed air is supplied from the cylinder head cover side of the piston cylinder device 321, the piston rod 321b is projected and the second stage 200 are descended. Thereafter when the compressed air is supplied to the piston rod cover side of the piston cylinder device 321, the piston rod 321b and the second stage 200 are ascended again. The illustrated state is brought back.

The producing apparatus shown in FIG. 15 has a positioning device 400 for relatively positioning the two panel elements c1, c2 before adhering them.

The positioning device 400 is provided with two cameras (CCD camera), X-Y-θ drive device 420 and controller 430.

The two panel elements c1, c2 as relatively positioned when viewed from above are as shown in FIG. 7. The first stage 100, positioning device 400 and the like are not shown in FIG. 7.

As shown in FIG. 7, the two panel elements c1, c2 have register marks m1, m2 formed for positioning purposes outside the display region. A crisscross pattern is formed in the region of two ends on diagonal line, although not limited thereto. Any register pattern will do if it is useful in positioning the two panel elements relatively. The pattern may be formed in any location if outside the display region. The register marks may be formed by printing. In forming electrodes for panel elements, electrodes for markers (register marks) may be formed outside the display region and may emit a light by application of a voltage to the electrodes for markers. In this example, register marks m1, m2 are printed on the two panel elements c1, c2.

The CCD cameras 410 shown in FIG. 15 are connected to a controller 430 and are adapted to observe the register marks m1, m2 formed on the two panel elements c1, c2 for transmission of mark information to the controller 430.

The X-Y-θ drive device 420 includes a panel element-holding arm 421, and X-Y-θ drive portion 422. The panel element-holding arm 421 is connected to a X-Y-θ-direction movable member of the drive portion 422, and at one end 421a, can suck and hold the panel element c2. The X-Y-θ drive portion 422 is connected to the controller 430 and can move the panel element-holding arm 421 and the panel element c2 held thereby along the surface of the panel element c1 sucked and held by the first stage 100 in a specified direction (x direction in the drawing) or a direction vertical to that direction (y direction in the drawing) and can rotate the element c2 around an axis vertical to the X-Y plane (θ direction in the drawing). Thereby the panel element c2 can be moved on the panel element c1 held by the first stage 100 under the directions from the controller 430.

The controller 430 is connected, as mentioned above, to the CCD cameras 410 and the X-Y-θ drive device 420. The information on the register marks m1, m2 sent from the cameras 410 is processed and the operation of the X-Y-θ drive device 420 is controlled to move the panel element c2 for positioning purpose by matching the register marks m1, m2. The controller 430 includes means for using the positioning method by image processing for alignment of substrates, panels and the like.

The foregoing producing apparatus may include an airtight chamber 600 as shown by 2-dot chain line in FIG. 15. The chamber 600 may enclose the first and second stages 100, 200 and other devices, but said apparatus is not provided with the chamber 600. The chamber 600 is described later.

An example of production of the liquid crystal display panel of reflection type shown in FIG. 1 by said apparatus is described with reference to FIGS. 16 and 17.

Figure 16:
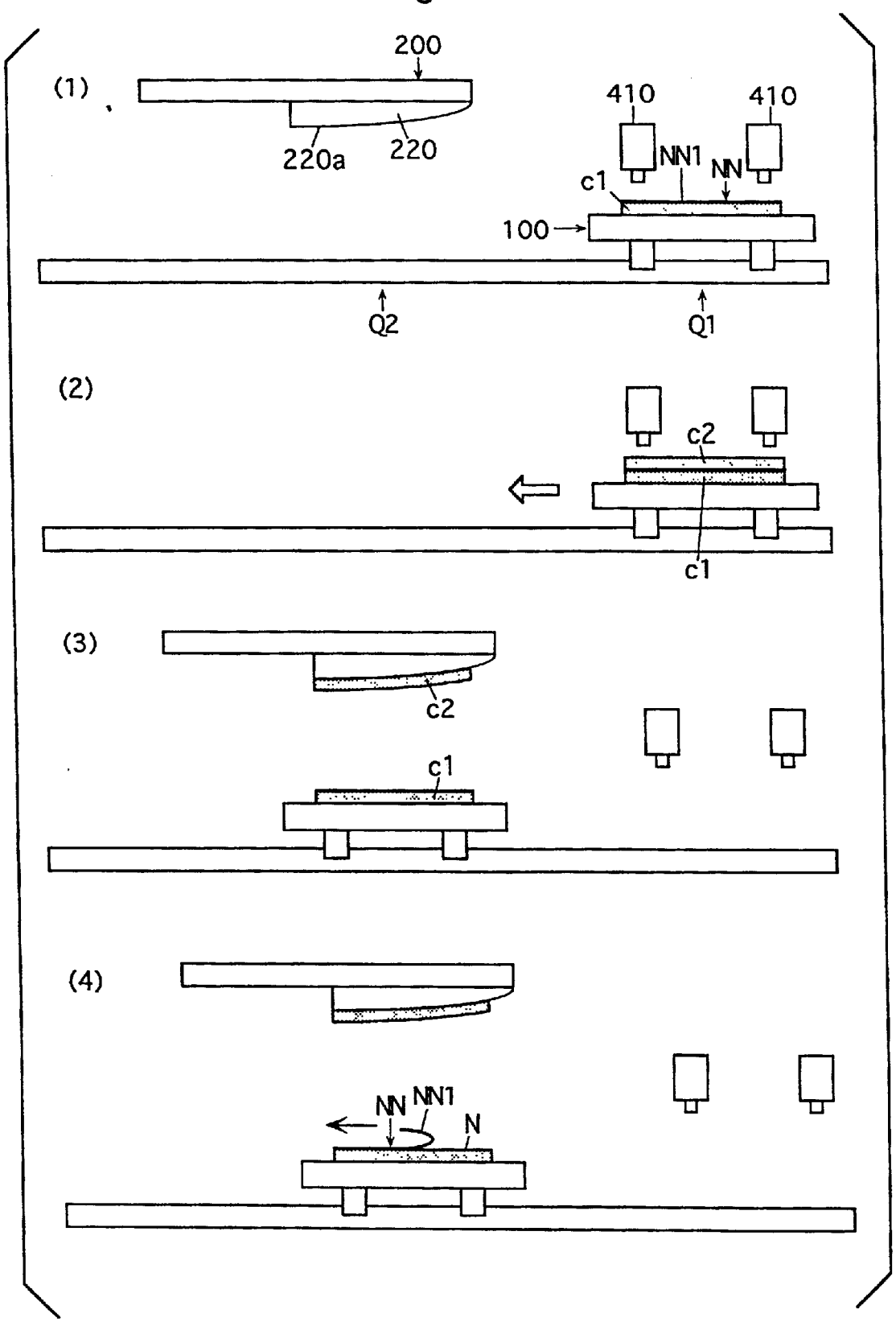
FIG. 16 is a view for describing the steps (1) to (4) in an example of steps for producing a liquid crystal display panel by the apparatus for producing the liquid crystal display panel shown in FIG. 15.
Figure 17:
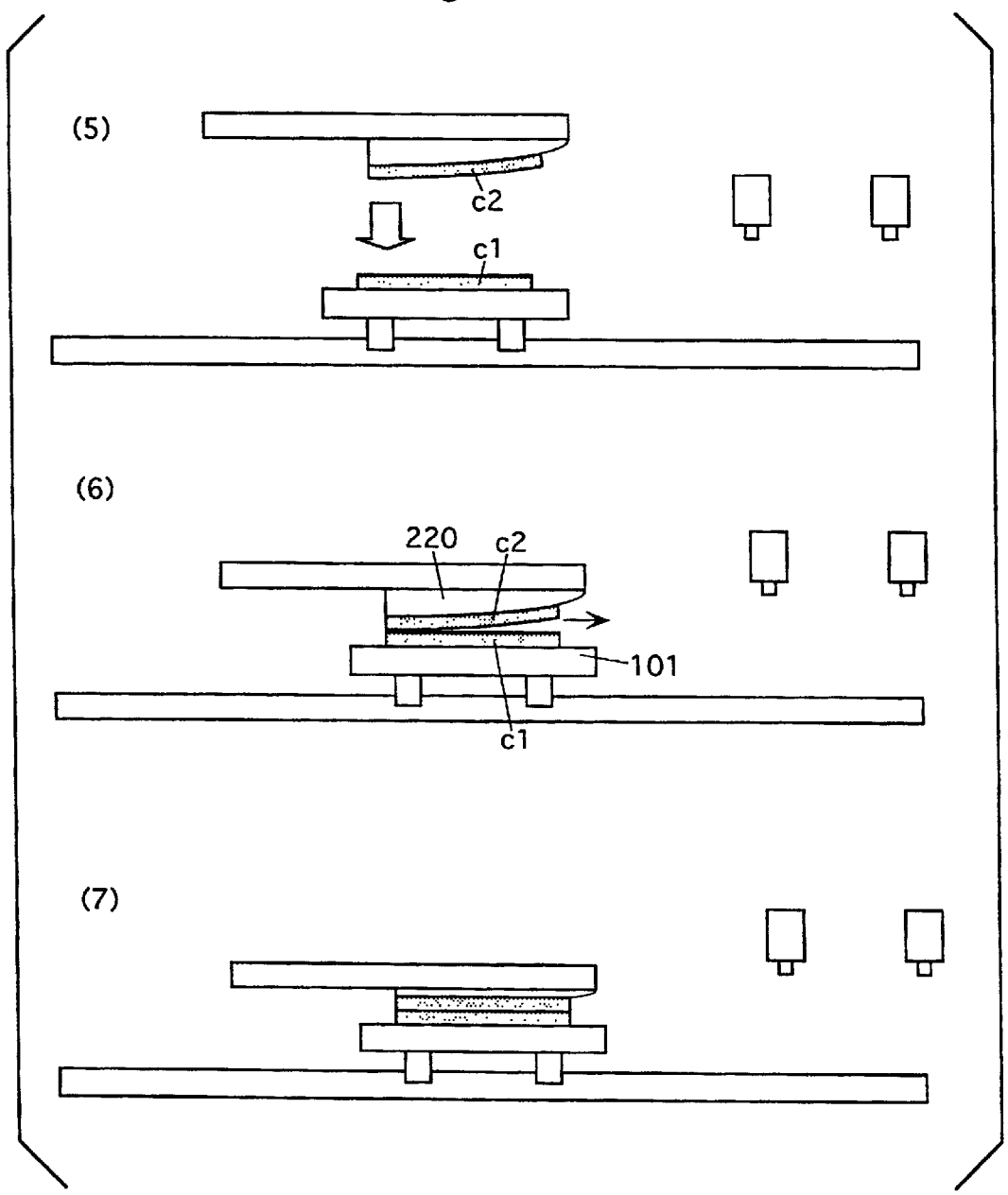
FIG. 17 is a view for describing the steps (5) to (7) subsequent to the steps shown in FIG. 16.

FIG. 16 is a view for describing the steps (1) to (4) in an example of steps for producing a liquid crystal display panel by the apparatus for producing the liquid crystal display panel shown in FIG. 15. FIG. 17 is a view for describing the steps (5) to (7) subsequent to the steps shown in FIG. 16. The indication of some parts is omitted in FIGS. 16 and 17.

First, each of R, G, B panel elements for red, green and blue displays is beforehand produced in the production of a liquid crystal display panel A shown in FIG. 1.

Any one of R, G. B panel elements (R panel element in this example) is taken as a panel element (a first panel element) c1 and a panel element (G panel element in this example) to be adhered to the element c1 is taken as a panel element (second panel element) c2. These two panel elements are adhered to each other in the steps (1) to (4) shown in FIG. 16 and the steps (5) to (7) shown in FIG. 17.

(1) Pressure sensitive adhesive double-coated tape NN (or adhesive sheet) having one side covered with a protective releasable sheet NN1 is adhered to at least one of surfaces to be adhered of first and second panel elements c1, c2, i.e. to a side other than the side having the light absorbing layer BK of the first panel element c1 (R panel element in this example). In this example, the adhesive double-coated tape is used although not limited thereto. In any case, an adhesive material may be applied or supplied to the panel element surface by hands or by an applicator for applying the adhesive material. The adhesive material may be applied or supplied by optional methods which are not problematic. The step of applying or supplying the adhesive material is carried out prior to pressure-splicing step at any stage which is not problematic.

The first panel element c1 having the light absorbing layer BK facing down and the adhesive double-coated tape on the other side is set onto the first stage 100, and is sucked to and held by the suction table 101 of the stage 100 by the panel element-holding device 110.

(2) The second panel element c2 is set on the first panel element c1 to relatively position the first and second panel elements c1, c2.

This positioning operation is conducted as follows. The panel element c2 disposed on the panel element c1 is set on the end 421a of the positioning device 400. In this state, while the register marks m1, m2 formed on the two panel elements c1, c2 are observed by CCD cameras 410, the second panel element c2 is moved by the X-Y-θ drive device 420 to match the register marks m1, m2 of the two panel elements c1, c2. This positioning operation is carried out by automatic control of the X-Y-θ drive device 420 based on the positional information obtained by image processing of information detected by the cameras 410. The panel element c2 is set again on the panel element c1 after positioning operation.

The alignment with use of the X-Y-θ drive device 420 may be conducted by manually operating the X-Y-θ drive device 420. Optionally the second stage 200 for holding the second panel element c2 may include the X-Y-θ drive device 420. At that time, the second panel element c2 may be driven by X-Y-θ drive to position the second panel element c2 after setting the panel element c2 to the stage 200. The register marks m1, m2 of the two panel elements c1, c2 may be matched by manually moving the second panel c2 without use of X-Y-θ drive device 420 while visually inspecting and observing the marks m1, m2 of the two panel elements c1, c2.

(3) After positioning the first and second panel elements c1, c2, the panel element c2 is disengaged from the panel element-holding arm 421 of the X-Y-θ drive device 420 holding the panel element c2 as mentioned above and is overlaid on the panel element c1, and the first stage 100 is moved to a location below the second stage 200 (location Q2 in FIG. 15) by the first stage-driving portion 310 of the stage-driving device 300 so that the panel element-holding surfaces of the first and second stages are opposed.

The second stage 200 is descended by the second stage-driving portion 320 of the stage-driving device 300. When the elastic pad 220 of the stage 200 comes into contact with the second panel element c2, the second panel element c2 is sucked to and held by the convex curved surface 220a by vacuum suction of air with the panel element-holding device 210. The second stage 200 holding the second panel element 2 is ascended by the second stage driving portion 320 for standby.

(4) The protective releasable sheet NN1 is removed from the adhesive double-coated tape NN adhered to the first panel element c1 held by the first stage 100 to expose the adhesive material N.

(5) The second stage 200 is descended by the second stage driving portion 320 of the stage driving device 300, the first and second stages are relatively moved closer to each other with their panel element holding surfaces opposed, or with the surfaces to be adhered of the panel elements c1, c2 held by the stages 100 and 200 in opposed positions.

(6) The first and second panel elements c1, c2 are pressure-spliced under a specified pressure by the second stage-driving portion 310 of the stage-driving device 300 and starts to be spliced initially partially (at ends of thereof in this example) by the convex curved surface 220a of the elastic pad 220 gradually extending the spliced area in the state of being interposed between the elastic pad 220 and a rigid body 101 of the first stage 100. In the meantime, the fine perforations are progressively closed in the pressure-splicing step by elastic deformation of the elastic pad 220 so that the second panel element c2 is gradually disengaged from the second stage pad 220, whereby the first and second panel elements c1, c2 are smoothly adhered.

(7) Extending the pressure-spliced area in this way, the first and second panel elements are adhered keeping the two panel elements from displacement and from formation of wrinkles and discharging the air from the two panel elements, whereby the R and G panel elements are adhered.

After completion of adhering them, the vacuum suction is ceased by the panel element-holding device 210, the second stage 200 is returned to its original location and the first stage 100 is returned to the original location Q1 with the adhered elements held.

The spliced panel elements thus obtained by adhering the R and G panel elements is taken as a first panel element and the B panel element to be adhered next is taken as a second panel element. The B panel element is adhered to the adhered panel elements by substantially repeating the steps (1) to (7). It is needless to say that if the first stage 100 holding the adhered panel elements is returned to the location Q1, this means that the step (1) is partially carried out. In this way, a display panel A comprising layered R, G, B panel elements is produced.

Figure 18:
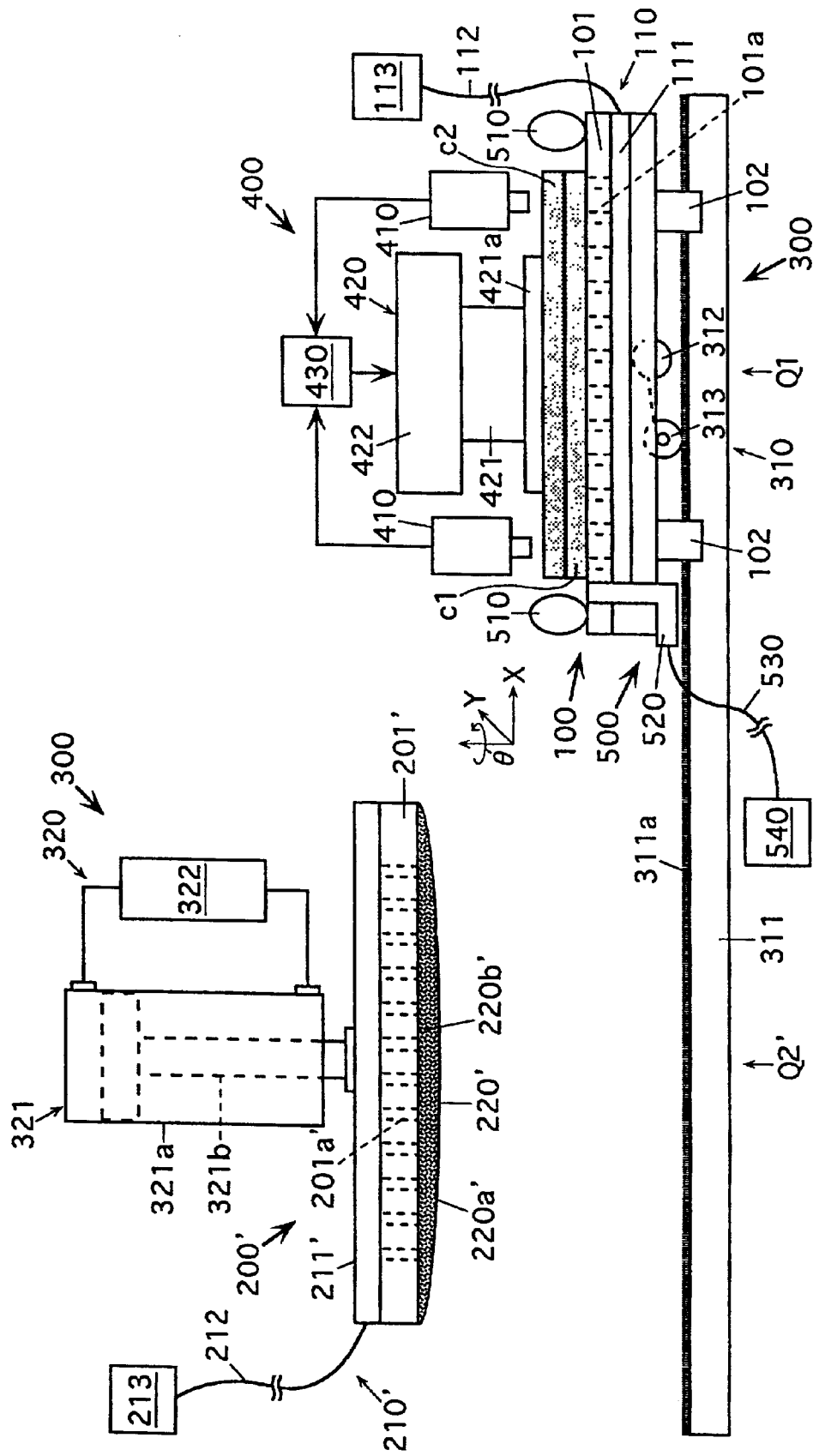
FIG. 18 shows a further example of the apparatus for producing the liquid crystal display panel shown in FIG. 1.

FIG. 18 shows a further example of the apparatus for producing the liquid crystal display panel shown in FIG. 1.

The producing apparatus shown in FIG. 18 is equivalent to the apparatus of FIG. 15 except that an exhausting device 500 is provided relative to the first stage 100 and a second stage 200' in stead of the second stage 200 is arranged. In other respects, it is similar to that of FIG. 15. Like parts having like structure and like function are given like reference numerals or the like.

Description is given below to the producing apparatus shown in FIG. 18 mainly about differences from the apparatus of FIG. 15.

The apparatus of FIG. 18 for producing a display panel comprises: a first stage 100 for holding a first panel element c1; a second stage 200' for holding a second panel element c2; and a stage driving device 300 for relatively moving the first stage 100 and the second stage 200' in a manner to bring to an opposed position the panel element-holding surfaces of the stages 100, 200'.

In the above-mentioned apparatus, the second stage 200' has an elastic pad 220' having a panel element-holding surface 220a'. The panel element-holding surface 220a' is a convex curved face of specified curvature. As stated later with reference to FIGS. 19 and 20, the stage-driving device 300 brings the first and second stages 100, 200' to an opposed position and relatively moves them closer to or away from each other, whereby the first and second panel elements c1, c2 start to be spliced partially by the convex curved surface 220a' of the elastic pad 220'. When the stages 100, 200' are moved closer, the first and second panel elements c1, c2 are progressively pressure-spliced while the elastic pad becomes compression-deformed. Namely, when the stages 100, 200' are moved closer to each other, the first and second panel elements c1, c2 are partially pressure-spliced extending the pressure-placed area until they are pressure-spliced all over the entire region, giving a display panel comprising layered the two panel elements c1, c2.

The second stage 200' includes second suction table 201' and a panel element-holding device 210'.

The second suction table 201' is formed of a rigid material and includes a plurality of perforations 201a' for suction of panel element formed as spaced away from each other in the panel element c2-holding region.

The panel element-holding device 210' includes such perforations 201a' but also an exhaust chamber 211, a flexible tube 212 and an exhausting device 213. The exhausting device 213 is connected to one end of the tube 212 and the exhaust chamber 211' is connected to the other end of the tube 212. The exhaust chamber 211' is communicated with perforations 201a' of the suction table 201'. Thus, the air is sucked from the perforations 201a' via the exhaust chamber 211' and the tube 212 by the operation of the exhausting device 213.

The second stage 200' is provided, as mentioned above, with the elastic pad 220' having the panel element-holding surface 220a'. The elastic pad 220' is disposed on the other side than the side where the exhaust chamber 211' of the second suction table 201' is provided.

The elastic pad 220' is formed of an open-cell elastic rubber foamed body which is the same material as used as the elastic pad 220 in the apparatus of FIG. 15 and has fine perforations 220b' for keeping the panel element c2 at the convex curved surface 220a' by suction of air. The perforations 220b' are closed due to elastic compression deformation of the elastic pad 220'.

The panel element-holding surface 220a' is a convex curved surface which is higher in the center and has a specified curvature (convex curved surface with a radius of curvature in the range of about 4000 mm to about 5000 mm). The second panel element can be retained along the curved surface. The convex curved surface, e.g. may have a spherical, semi-spherical, or truncated cylinder-like peripheral shape, and is spherical in this example. With use of such convex curved surface, the two panel elements c1, c2 are pressure-spliced initially in the center thereof, gradually broadening the pressure-spliced area from the initial small area toward the surrounding area.

The elastic pad 220' can release the portion, spliced to another panel element, of the panel element held by the pad because the perforations are closed due to compression of the pad when the two panel elements c1, c2 are pressure-spliced in the pressure-splicing step, whereby the two panel elements c1, c2 are more smoothly adhered together.

To adhere the two panel elements c1, c2 without damage to the two panel elements and keeping the two panel elements from displacement and from formation of wrinkles and discharging the air from the two panel elements, the elastic pad may be formed of an elastic body having an elastic coefficient of 70 kgf/cm² to 120 kgf/cm².

The exhausting device 500 is provided to assure the discharge of the air in adhering the two panel elements c1, c2 and includes a ring member 510, a pipe 520 for suction of air, a flexible tube 530, and a vacuum pump 540.

The ring member 510 is an elastically deformable material for forming an airtight chamber in which the reduction of pressure is done by the discharge of air, the ring member being adapted to surround the two panel elements together with the first and second stages 100, 200', as interposed between the stages coming closer to each other. The ring member 510 is made of rubber and is arranged on the suction table 101 of the first stage 100.

The pipe 520 for suction of air is engaged in through-holes formed between the ring member 510 and the panel element c1-holding region on the first stage 100 and is connected to one end of the tube 530 which is connected in the other end to the vacuum pump 540, whereby the air pressure is reduced by the discharge of air in the airtight chamber formed of the stages 100, 200' and ring member 510.

The foregoing producing apparatus may be provided with the airtight chamber as shown in 2-dot chain line in FIG. 15 as in the apparatus of FIG. 15, but is not provided therewith herein.

Figure 19:
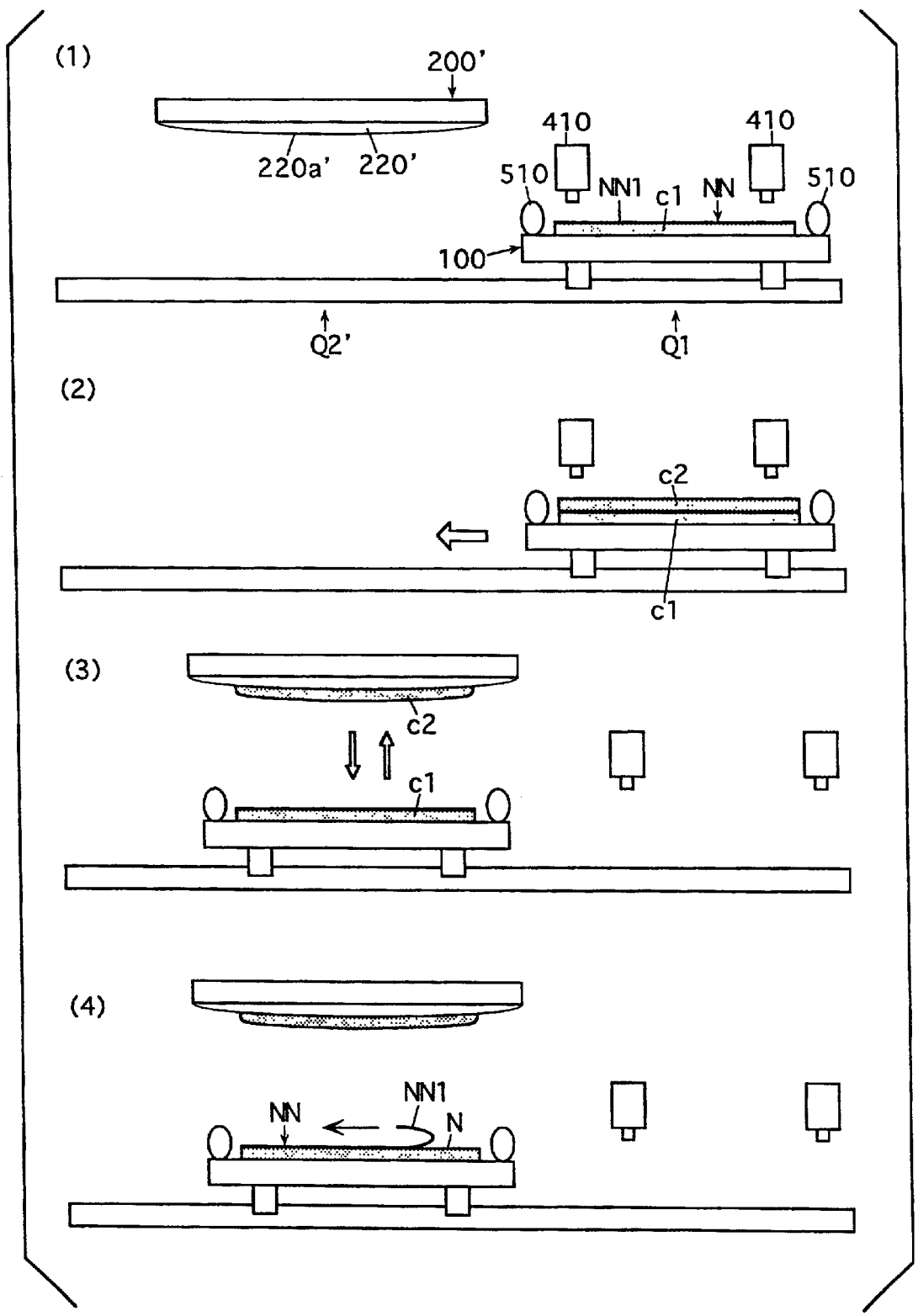
FIG. 19 is a view for describing the steps (1) to (4) in an example of steps for producing a liquid crystal display panel by the apparatus for producing the liquid crystal display panel shown in FIG. 18.
Figure 20:
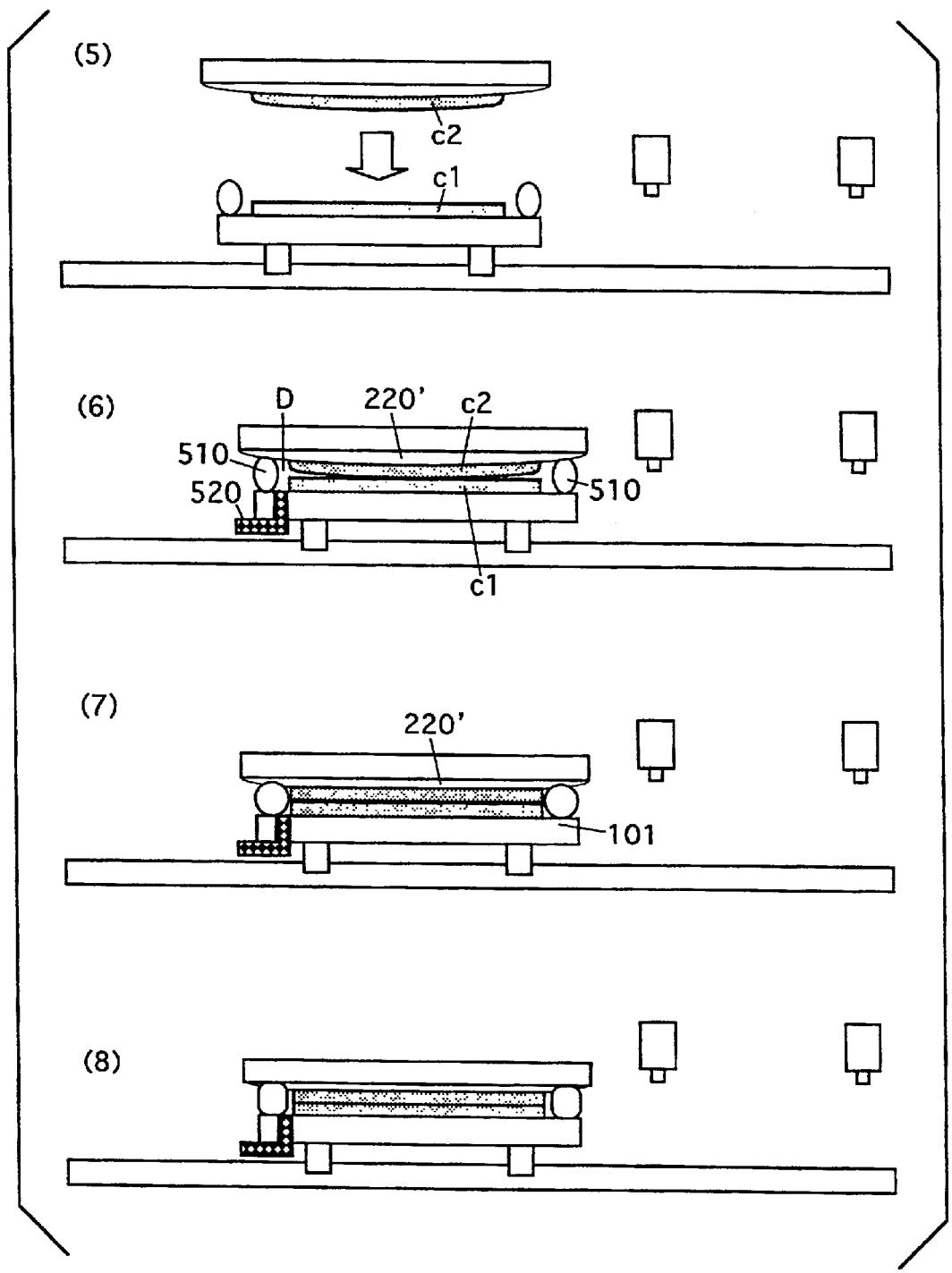
FIG. 20 is a view for describing the steps (5) to (8) subsequent to the steps shown in FIG. 19.

FIG. 19 is a view for describing the steps (1) to (4) in an example of steps for producing a liquid crystal display panel by the apparatus for producing a liquid crystal display panel shown in FIG. 18. FIG. 20 is a view for describing the steps (5) to (8) subsequent to the steps shown in FIG. 19. FIGS. 19 and 20 omit the indication of some parts for simplification.

First, each of R, G, B panel elements for red, green and blue displays is produced beforehand in the production of reflection type liquid crystal display panel A shown in FIG. 1.

Any one of R, G, B panels (R panel element in this example) is taken as a first panel element (hereinafter referred to as "first panel element") c1 and a panel element (G panel element in this example) to be adhered to the element c1 is taken as another panel element (hereinafter referred to as "second panel element") c2. These two panel elements are adhered to each other in the steps (1) to (4) shown in FIG. 19 and the steps (5) to (8) shown in FIG. 20.

(1) Pressure sensitive adhesive double-coated tape NN (or adhesive sheet) having one side covered with a protective releasable sheet NN1 is adhered to at least one of surfaces to be adhered of the first and second panel elements c1, c2, i.e. to a side other than the side having the light absorbing layer BK of the first panel element c1 (R panel element in this example).

The first panel element c1 having adhesive double-coated tape NN on one side is set onto the first stage 100 with the light absorbing layer Bk faced down, and is sucked to and held by the suction table 101 of the stage 100 by the panel element-holding device 110.

(2) The second panel element c2 (G panel element) is set on the first panel element c1 to relatively position the first and second panel elements c1, c2. The positioning operation is in the same manner as done in the step (2) of FIG. 16 by the apparatus FIG. 15. Thus, the description is omitted in this regard.

(3) After positioning the first and second panel elements c1, c2, the panel element c2 is disengaged from the panel element-holding arm 421 of the X-Y-θ drive device 420 holding the panel element c2 and is overlaid on the panel element c1. Then the first stage 100 is moved to a location below the second stage 200' (location Q2' in FIG. 18) by the first stage-driving portion 310 of the stage-driving device 300 so that the panel element-holding surfaces of the first and second stages and the two panel elements c1, c2 are opposed.

The second stage 200' is descended by the second stage-driving portion 320 of the stage-driving device 300. When the elastic pad 220' of the stage 200' comes into contact with the second panel element c2, the second panel element c2 is sucked to and held at the convex curved surface 220a' by vacuum suction of air with the panel element-holding device 210'. The second stage 200' holding the second panel element 2 is ascended by the second stage driving portion 320 for standby.

(4) The protective releasable sheet NN1 is removed from the adhesive double-coated tape NN adhered to the first panel element c1 on the first stage to expose the adhesive material N.

(5) The second stage 200' is descended by the second stage driving portion 320 of the stage driving device 300, the first and second stages are relatively moved closer to each other with their panel element-holding surfaces opposed, or with the surfaces to be adhered of the panel elements c1, c2 held by the stages 100 and 200' in opposed positions.

(6) The first and second panel elements c1, c2 are pressure-spliced under a specified pressure by the second stage-driving portion 320 of the stage-driving device 300 and starts to be spliced initially partially (in the center in this example) using the convex curved surface 220a' of the elastic pad 220'. In this pressure-splicing step, when the second stage is contacted with the ring member 510 made of rubber, an airtight chamber D is formed in which the pressure is reduced by the discharge of air. At that time, the air is evacuated from the chamber D by the pump 540 to adjust the pressure therein to a specified level (20 Pa to 30 Pa) lower than the atmospheric pressure.

(7) Even after the start of operation in the step (6), the second stage 200' is continuously descended, and the pressure-spliced area is extended with the two panel elements interposed between the elastic pad 220' having a spherical surface elastically deforming under compression and the rigid body 101 of the first stage 100. In the meantime, the perforations of the pad 220' are progressively closed due to elastic deformation of the elastic pad 220' so that the second panel element c2 is gradually disengaged from the second stage pad 220', whereby the first and second panel elements c1, c2 are smoothly adhered.

(8) In this way, keeping the two panel elements from displacement and from formation of wrinkles and discharging the air from the two panel elements, the pressure-spliced area is extended and the two panel elements are adhered. Thus, the R and G panel elements are adhered.

After completion of adhering them, the vacuum suction is ceased by the panel element holding device 210', the second stage 200' is returned to its original location and the first stage 100 is returned to the original location Q1 with the adhered elements held.

The spliced panel elements thus obtained by adhering the R and G panel elements is taken as a first panel element and the B panel element to be adhered next is taken as a second panel element. The B panel element is adhered to the adhered panel elements by substantially repeating the steps (1) to (8). In this way, a display panel A comprising layered R, G, B panel elements is produced.

In the producing apparatus shown in FIGS. 15 and 18, a pneumatic drive is employed as a stage drive in the second stage-driving portion, but hydraulic and like drive means can be used. An eccentric cam or like means can be used as the second stage-driving mechanism.

In the producing apparatus shown in FIG. 15, an airtight chamber may be formed using the exhausting device 500 in the apparatus shown in FIG. 18 to assure the discharge of air from between the two panel elements in adhering them, so that the air pressure is reduced by the discharge of air in the chamber. In any of the producing apparatus shown in FIGS. 15 and 18, the airtight chamber 600 (FIG. 15) and an exhausting device connected to the chamber 600 for exhausting the air or reducing the pressure may be provided instead of or in combination with the exhausting device 500 to reduce the air and discharge the air in the chamber.

When the airtight chamber 600 is provided in any of the producing apparatus shown in FIGS. 15 and 18, any means and devices may be provided outside the chamber 600 if their provision therein is improper although the provision of exhausting devices 113, 213 and pneumatic circuit 322 is shown in FIG. 15. When the exhausting device 500 is used, a vacuum pump 540 is disposed outside the chamber 600.

[C] Method and Apparatus for Producing a Display Panel Relating to FIGS. 21 to 24

The methods and apparatuses for producing a display panel relating to FIGS. 21 to 24 are based on the following method and apparatus for producing a display panel.

(Method for Producing a Display Panel)

The method is to produce a display panel by layering panel elements for forming a display panel for display of images, and includes the steps of: setting a first panel element to a first stage; setting a second panel element to a second stage; bringing the first and second panel elements held by the first and second stages to a position wherein the surfaces to be adhered of the panel elements are opposed to each other; positioning the first and second panel elements relatively; supplying an adhesive material to at least one of surfaces to be adhered of the first and second panel elements; and adhering the first and second panel elements so positioned and held by the first and second stages as to bring the surfaces to be adhered to opposed position, via the adhesive material (adhering step), wherein the second stage has central perforations for sucking and holding the central region of the panel element and outer perforations for sucking and holding the outer region (region outside the central region) of the panel element in order to suck and hold the panel element by suction of air through the perforations, wherein the adhering step includes the steps of making the stages closer to each other to move to a specified vicinity the first and second panel elements so positioned and held by the first and second stages with the element surfaces to be adhered to opposed position (moving-closer step); after the moving-closer step, causing the central region of the panel element on the second stage is to contact, via the adhesive material, with the first panel element on the first stage due to a difference in the air pressure between both side surfaces of the central region of the second panel element on the second stage which difference is caused by setting the air pressure between the second stage and the central region of the second panel element held by the second stage to a higher level than the air pressure between the first and second panel elements (central region-contacting step); and splicing the two panel elements under a specified pressure all over the entire region of the panel elements via the adhesive material by moving the two stages further closer to each other after the central region-contacting step.

In said producing method, the step of supplying the adhesive material to at least one of surfaces to be adhered of the first and second panel elements may be, for example, the step of removing a protective releasable sheet from a pressure sensitive adhesive double-coated tape or adhesive sheet (or tape) adhered to the surface of panel element to expose the adhesive surface, or the step of applying an adhesive material to the panel element surface by hands or by an applicator for applying the adhesive material, or the like. The adhesive material may be applied or supplied by optional methods which are not problematic.

The step of applying or supplying the adhesive material is carried out prior to the panel-element adhering step at any stage, which is not problematic.

The adhering step is conducted after supplying the adhesive material, positioning the two panel elements and bringing the two panel elements to a position wherein the surfaces to be adhered are opposed.

The first and second panel elements can be relatively positioned by various methods, for example, by per se known methods of positioning a substrate or a panel.

Examples of positioning methods are as follows.

(1) Register marks are formed on respective panel elements. After one of the first and second panel elements is held by one of the stages, the other panel element is set on or above the former panel element, and the register marks of the two panel elements are visually inspected or observed through a camera so that the other panel element is manually moved to achieve matching of register marks. Thereafter the other panel element is held by the other stage.

(2) Register marks are formed on respective panel elements. After one of the first and second panel elements is held by one of the stages, the other panel element is set on or above the former panel element, and the register marks of the two panel elements are observed through a camera so that the other panel element is moved by a X-Y-$\theta$ drive device to match the register marks of the two panel elements.

In this case, the stage for holding the other panel element may include a X-Y-$\theta$ drive device. At that time, the device may be operated to position the other panel element after the other panel element is set on the stage. When the stage for holding the other panel element does not include a X-Y-$\theta$ drive device, the other panel element positioned in advance is held by the stage after once overlaying the other panel element on the former panel element.

The register marks may be, for example, liquid crystal marks, electroluminescence marks and the like which emit light rays on application of electric power thereto.

The alignment of panel elements with use of the X-Y-$\theta$ drive device may be conducted by manually operating the X-Y-$\theta$ drive device. Optionally the operation of the X-Y-$\theta$ drive device may be controlled so as to position the panel elements according to the mark data (e.g. information on the position) obtained by inspection with a camera. In the latter case, an image processing method for alignment of substrates, panels and the like can be employed.

The X-Y-$\theta$ drive device is, needless to say, capable of moving an object in a direction X and in a direction Y vertical to that direction and rotating the object about an axis vertically of X-Y planar surface.

The first stage is caused to hold the panel element, typically, although not limited thereto, by perforations formed in the first stage for suction of air to thereby suck and hold the panel element.

The second stage is caused to hold the panel element by the central and outer perforations formed in the second stage for suction of air.

In the adhering step, the step of moving the two panel elements closer is conducted, followed by moving the stages relatively closer to bring the panel elements to a vicinity of a specified distance.

Then the central-contacting step is performed. In this step, the air pressure between the second stage and the central region of the second panel element held by the second stage is set to a relatively higher level than the air pressure between the first and second panel elements, whereby a difference in the air pressure is caused between the both side surfaces of the central region of the panel element on the second stage. Such air pressure difference can be created by various methods.

For example, the air pressure between the first and second panel elements is set to a specified level lower than the atmospheric pressure, and the air pressure between the second stage and the central region of the second panel element held by the second stage is set to a relatively higher level than between the first and second panel elements while stopping the discharge of air from the central perforations of the second stage and introducing the outside air into the central perforations thereof. Thereby an air pressure difference can be produced.

In any case, the panel element on the second stage is loosened in the central region and is thereby contacted, via the adhesive material, with the first panel element on the first stage due to the difference in the air pressure between the both side surfaces of the central region of the panel element on the second stage. The weight of the panel element may contribute to the loosening of the element. Namely the panel element may be loosened because of the air pressure difference and the weight of the element in the region including the central region.

Then the pressure-splicing step is conducted to adhere the two panel elements all over the entire region.

In the adhering step, the two panel elements are initially contacted in such manner with each other in the central region before they are adhered all over the entire region. Thereby the two panel elements can initiate a slowly adhering procedure without a strong impact to be abruptly exerted on the two panel elements when adhered and can be adhered free of displacement thereof.

Then the two panel elements are adhered all over the entire region. After contact in the central region, the two panel elements are adhered progressively from the central region to the surrounding region by extending the contacted area, whereby the air is discharged from between the two panel elements, and the two panel elements are adhered as precisely positioned in closely contacted state without formation of wrinkles.

When three or more panel elements are adhered, the panel elements adhered by the above-mentioned adhering step are taken as the first panel element, and one panel element to be adhered next is taken as the second panel element. More panel elements to be adhered next are adhered, one by one, to the panel elements already adhered by substantially repeating the respective steps described above.

In the pressure-splicing step after the central-contacting step, the panel element held by the second stage can be entirely disengaged from the second stage for smoothly adhering the two panel elements all over the entire region, by stopping the suction of air through the outer perforations in the second stage and by introducing the outside air into the outer perforations. In this case, this procedure can be achieved by stopping the suction of the element by suction of air through the outer perforations in the second stage from the start of the pressure-splicing operation and by introducing the outside air into the outer perforations. Optionally, for assuring the discharge of air from the two panel elements, the pressure-splicing operation can be done by adhering the two panel elements all over the entire region while stopping the suction of the element by the outer perforations in the second stage and introducing the outside air into the outer perforations after contact of the two panel elements via the adhesive material all or substantially all over the entire region.

In the pressure-splicing step after the central contacting step, the air pressure surrounding the two panel elements may be returned to the surrounding outside air pressure But the adjustment of surrounding air pressure to the outside air pressure may be delayed until the two panel elements are contacted via the adhesive material with each other all or substantially all over the entire region, because this assures the discharge of air from between the two panel elements. The air pressure surrounding the two panel elements may be retained at the specified low air pressure until the completion of pressure-splicing step.

In any case, when the air pressure between two panel elements is set to a specified level lower than the atmospheric pressure in the central contacting step, the surrounding air pressure in the entire area including the first and second stages holding the first and second panel elements may be at a level lower than the atmospheric pressure. A simplified method is the use of an elastically deformable ring member for airtight seal which is employed to surround the first and second panel elements and to form an airtight chamber surrounding the two panel elements in the form as interposed between the first and second stages so that the air pressure between the two panel elements may be lowered by discharge of air from the airtight chamber.

The following determining factors may be set to proper levels in order to smoothly obtain the central contacting state of the two panel elements in the central contacting step; a close vicinity distance between the two panel elements in the moving-closer step, and the degree of difference in the air pressure between the two surfaces of the panel element in the central region (such as the degree of pressure reduction between the two panel elements in the central contacting step and/or the amount of the outside air (leak amount) to be introduced into the central perforations in the second stage, which causes the difference in air pressure) in view of the size of the panel element to be held by the second stage and elasticity and the like of the element.

Specific examples of the levels, although not limited thereto, are a close vicinity distance in the moving-closer step in the range of about 1 mm to about 2 mm, and a difference in air pressure between both sides of panel element on the second stage in the range of about 10 Pa to about 30 Pa (about 0.08 Torr to about 0.23 Torr).

The levels also may include a reduced air pressure between the two panel elements in the central contacting step in the range of about 20 Pa to about 30 Pa (about 0.15 Torr to about 0.23 Torr), and the difference in air pressure on both sides of panel element on the second stage in the range of about 10 Pa to about 30 Pa (about 0.08 Torr to about 0.23 Torr) which determines the amount of outside air to be introduced in the central perforations in the second stage.

(Apparatus for Producing a Display Panel)

The apparatus for producing a display panel by layering panel elements for forming a display panel for display of images comprises: a first stage for holding a panel element; a second stage for holding another panel element; and a stage-driving device for driving the first and second stages to move the first and second stages closer to or away from each other with panel element-holding surfaces of the stages as opposed; and an interstage exhausting device capable of reducing pressure and exhausting air between the first and second stages; wherein the second stage has central perforations for sucking and holding the panel element in the central region and outer perforations for sucking and holding the panel element in an area from the central region to the outer region, the stage being capable of sucking and holding the panel element by suction of air through the perforations, an exhausting device for the central perforations being connected to the central perforations, and an exhausting device for the outer perforations being connected to the outer perforations, each of the exhausting device including a device for introducing the outside air into the perforations.

According to the foregoing apparatus, one of the two panel elements to be adhered together is held by the first stage and the other by the second stage.

The first and second stages have a device for holding the panel element. Examples of the holding device in the first stage include, for example, perforations formed in the stage for sucking and holding the panel element, which are connected to an exhausting device, although not limited thereto.

The second stage can hold the panel element by suction of air through the central and outer perforations formed in the second stage with exhausting devices connected thereto to suck and hold the panel element.

The first and second panel elements are set on the first and second stages, and then the first and second stages are moved closer to or away from each other by the stage-driving device with their panel element-holding surfaces as opposed. In other words, the surfaces to be adhered of the panel elements held by the stages are in opposed positions, and are relatively moved so closer to each other that the first and second panel elements are brought to a vicinity of specified distance.

At latest, on completion of the above operation, the interstage exhausting device starts the discharge of air for pressure reduction to adjust the air pressure to a specified level in an area between the first and second stages (i.e. an area between the two panel elements). The air pressure between the second stage and the central region of the second panel element held by the second stage is adjusted to a relatively higher level than the air pressure between the first and second panel elements by stopping the discharge of air by the exhausting device connected to the central perforations in the second stage and by introducing the outside air into the central perforations by an outside air-introducing device in the exhausting device. In this way, this operation causes a difference in the air pressure between the two surfaces (both sides) of the central region of the panel element on the second stage, and due to this difference, the central region of the panel element on the second stage is contacted, via the adhesive material, with the first panel element on the first stage.

Thereafter, the two stages are relatively moved further closer to each other, whereby the first and second panel elements are adhered by pressure-splicing operation via the adhesive material all over the entire region.

The two panel elements are adhered with the adhesive material as described above. The adhesive material is supplied to at least one of the surfaces to be adhered of the two panel elements in the same manner as described concerning the method for producing a display panel before the adhering operation.

The producing apparatus may have an applicator for applying the adhesive material.

The two panel elements are relatively positioned before adhering the two panel elements. The positioning operation is conducted in the same manner as described concerning the above-mentioned method for producing a display panel.

The producing apparatus may be provided with a device for relatively positioning the two panel elements, such as a device for relatively positioning the two panel elements on the first and second stages. For example, the following devices can be used.

(1) A positioning device including a camera for observing register marks formed on the two panel elements and a X-Y-θ drive device for moving a panel element on or above the other panel element held by any one of the first and second stages to position them by matching the register marks of the two panel elements.

(2) A positioning device including a camera for observing register marks formed on the two panel elements, a X-Y-θ drive device for moving a panel element on or above the other panel element held by any one of the first and second stages, and a controller for control of operation of the X-Y-θ drive device for moving a panel element on or above the other panel element held by any one of the first and second stages to position the element by matching the register marks of the two panel elements based on the mark information (such as positional information) from a camera. Such controller may include, for example, devices employing a positioning method by image processing for alignment of substrates, panels and the like.

The interstage exhausting device may be one capable of adjusting the air pressure of the surrounding area including the area of first and second stages holding the two panel elements to a level lower than the atmospheric pressure. A simplified mode of the exhausting device is a device including an elastically deformable ring member for forming an airtight chamber in which the reduction of pressure is conducted by the discharge of air, the ring member being adapted to surround the two panel elements together with the first and second stages when interposed between the stages coming closer to each other.

According to the producing apparatus as described above, the two panel elements are adhered together as follows. The two panel elements are initially contacted in the central region with each other before being adhered all over the entire region, whereby the two panel elements can initiate a slowly adhering procedure without a strong impact to be abruptly exerted on the two panel elements when adhered and can be adhered free of displacement of the elements.

Then the two panel elements are adhered all over the entire region. After said contact in the central region, the two panel elements are adhered progressively from the central region to the surrounding region by extending the contacted area, whereby the air is discharged from between the two panel elements, and the two panel elements are adhered as precisely positioned in closely contacted state without formation of wrinkles.

When three or more panel elements are adhered, the panel elements adhered by the above-mentioned adhering step are taken as the first panel element, and one panel element to be adhered next is taken as the second panel element.

More panel elements to be adhered next are adhered, one by one, to the panel elements already adhered by substantially repeating the respective steps described above.

In the pressure-splicing step after the central-contacting step, the panel element held by the second stage can be entirely disengaged from the second stage for smoothly adhering the two panel elements all over the entire region, by stopping the discharge of air by the exhausting device connected to the outer perforations in the second stage and by introducing the outside air into the outer perforations by the outside air-introducing device in the exhausting device. In this case, this procedure can be achieved by stopping the suction of element by suction of air through the outer perforations in the second stage immediately after central-region contact and by introducing the outside air into the outer perforations. Optionally, for assuring the discharge of air from the two panel elements, a procedure can be done by adhering the two panel elements by pressure-splicing operation all over the entire region and by stopping the suction of element by the outside perforations in the second stage and introducing the outside air into the outer perforations after contact of the two panel elements via the adhesive material all or substantially all over the entire region.

Further optionally an operation for reducing the pressure by the interstage exhausting device may be stopped immediately after contact of central region of the two panel elements to return the air pressure between the two panel elements to the outside air pressure, or the return to said level may be made after contact of the two panel elements via the adhesive material all or substantially all over the entire region in order to assure the discharge of air from between the two panel elements Until the completion of adhering the two panel elements, of course, the air pressure surrounding the two panel elements may be retained at a specified low level.

The following factors described concerning the method for producing a display panel are determinable as in said case: a close vicinity distance between the two panel elements in moving the two panel elements closer to each other before contact in the central region, and the degree of difference in the air pressure between the two surfaces (both sides) of the panel element in the central region (such as the degree of pressure reduction between the two panel elements in the central contacting step and/or the amount of the outside air (leak amount) to be introduced into the central perforations in the second stage, which causes the difference in air pressure).

The following apparatus for producing a display panel is also employable which further comprises: an once controller for controlling the operation of the stage-driving device to once stop the relative movement of the two stages with the panel element-holding surfaces of the stages as opposed when the two panel elements held by the stages are moved by the stage-driving device closer to each other to a specified closer vicinity distance; a sensor for detecting a difference in air pressure between the two surfaces of (both sides) central region of the panel element held by the second stage among the first and second stages which relative movement is once stopped by the once stopping controller; and an once-stopping control removing device for controlling the operation of the stage-driving device in such a manner to move the first and second stages closer to each other when a specified difference in air pressure is reached by the level detected by the detecting sensor.

The difference in the air pressure to be detected by the detecting sensor between the both side surfaces of central region of the panel element held by the second stage is equal to the difference between the air pressure between the second stage and the central region of the second panel element held by the second stage, and the air pressure between the first and second stages (namely between the two panel elements held by them).

The specified difference in air pressure to be detected by the detecting sensor is equal to the level at which the central region of panel element on the second stage is contacted, via the adhesive material, with the panel element held by the first stage. In other words, the detection of the specified difference in air pressure shows that the central region of panel element on the second stage has been contacted via the adhesive material with the panel element held by the first stage.

The sensor for detecting a pressure difference may be, for example, one which directly detects a difference in air pressure; one which detects the air pressure between the second stage and the central region of panel element held by the second stage which causes the specified difference in air pressure when the air pressure between the first and second stages (i.e. the air pressure in the area between the two panel elements held by them) is known; and one which detects the air pressure between the second stage and the central region of panel element held by the second stage which causes the specified difference in air pressure by measuring the time lapse involved in introducing the outside air into the central perforations in the second stage.

The [C] type method and apparatus for producing a display panel as described above are applicable to the production of various display panels. Description is given below to specific examples of the method and apparatus for producing a liquid display panel with reference to FIGS. 21 to 24.

Figure 21:
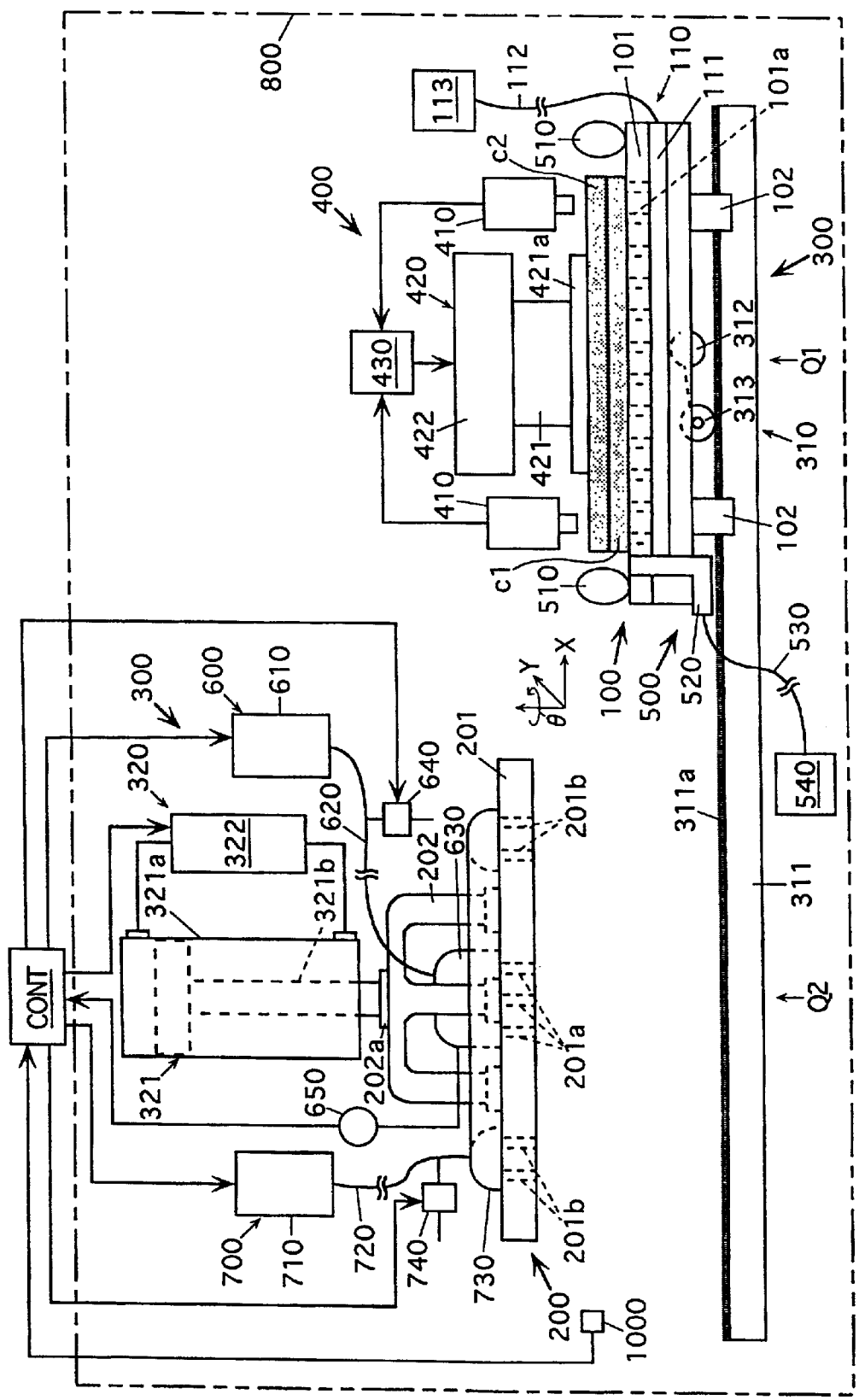
FIG. 21 schematically shows a structure of another example of an apparatus for producing the liquid crystal display panel shown in FIG. 1.

FIG. 21 schematically shows a structure of an example of an apparatus for producing the liquid crystal display panel shown in FIG. 1.

The apparatus for producing a display panel comprises: a first stage 100 for holding a panel element c1; a second stage 200 for holding another panel element c2; and a stage-driving device 300 for driving the first and second stages 100, 200 to move the first and second stages 100, 200 closer to or away from each other with the panel element-holding surfaces of the stages as opposed; and an interstage exhausting device 500 capable of reducing the pressure and exhausting the air from between the first and second stages 100, 200.

The second stage 200 has central perforations 201a for sucking the panel element c2 in the central region thereof and outside perforations 201b for sucking the panel element c2 in an area from the central region to the outside region thereof, the stage 200 being capable of sucking and holding the panel element c2 by suction of air through the perforations 201a, 201b, an exhausting device 600 for the central perforations 201a being connected to the central perforations 201a, and an exhausting device 700 for the outside perforations 201b being connected to the outside perforations 201b, the exhausting devices 600, 700 including open-close electromagnetic valves 640, 740 as an example of a device for introducing the outside air into the perforations 201a, 201b.

The stage-driving device 300 is provided for driving the first stage 100 and the second stage 200, and includes a first stage-driving portion 310 for driving the first stage 100 and a second stage-driving portion 320 for driving the second stage 200.

The first stage-driving portion 310 is such that, although not limited thereto, a pinion gear 313 provided on the first stage 100 is engaged with a rack gear 311a arranged along a guide rail 311 and is reciprocatingly rotated by a motor 312 mounted on the first stage 100. The first stage 100 is moved along the guide rail 311 by the first stage-driving portion 310, and is disposed in a location Q1 where the panel element is held or a location Q2 where the panel elements are adhered. In this movement, a slider 102 provided on the first stage 100 slides along the guide rail 311.

The second stage-driving portion 320 includes a piston cylinder device 321 and a pneumatic circuit 322 for driving the same although not limited thereto. The piston cylinder device 321 is of double acting type and a cylinder member 321a is disposed in a specified place while a piston rod 321b is connected to the second stage 200. The pneumatic circuit 322 can supply compressed air of specified pressure to the piston cylinder device 321.

In the illustrated state, the compressed air is supplied to the side of the piston rod of piston cylinder device 321 from the pneumatic circuit 322, and the piston rod 321b is retracted into the cylinder member 321a, whereby the second stage 200 is ascended.

When the compressed air is supplied from the cylinder head cover side of the piston cylinder device 321, the piston rod 321b is projected and the second stage 200 are descended. Thereafter when the compressed air is supplied to the piston rod cover side of the piston cylinder device 321, the piston rod 321b and the second stage 200 are ascended again. The illustrated state is brought back.

The pneumatic circuit 322 can stop the piston rod 321b at the desired projection amount.

The second stage 200 includes a second suction table 201 and a link 202 for the piston rod, the link being fixed to the upper surface of the table 201.

Figure 22:
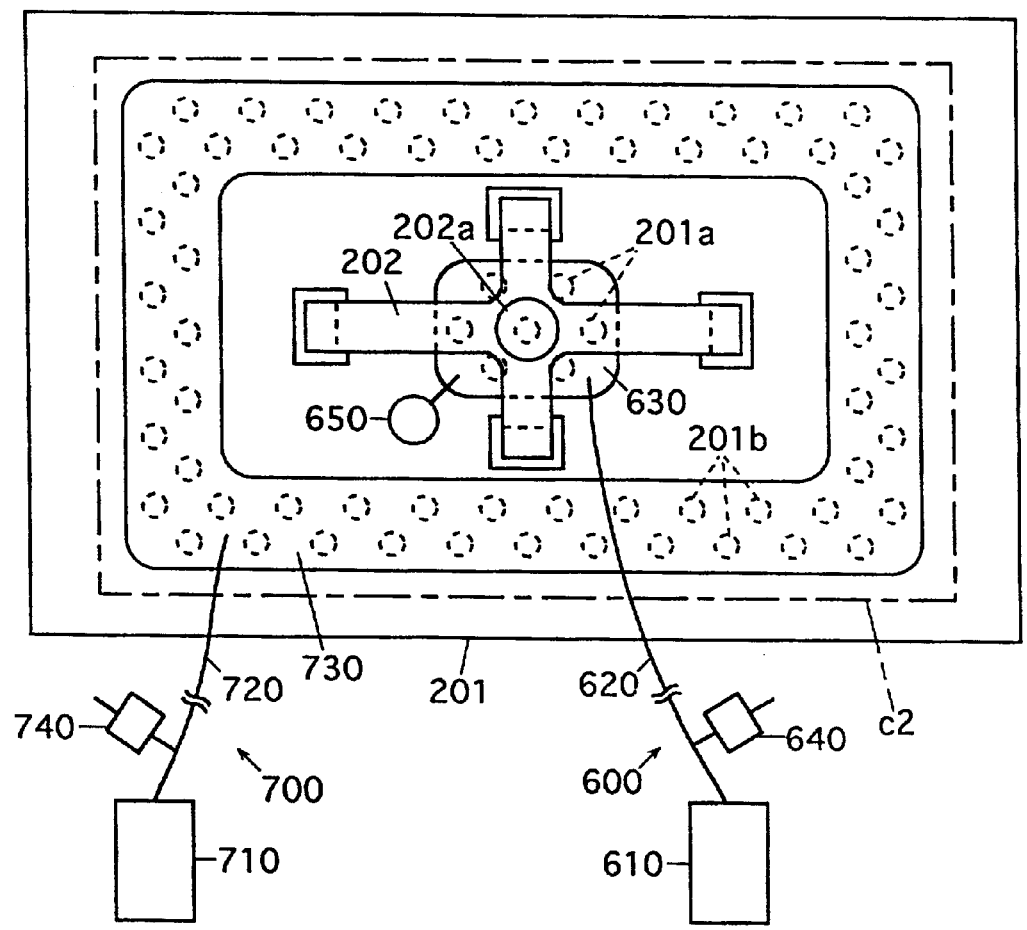
FIG. 22 is a view of the second stage, when viewed from above on which another panel element is held by adsorption.

FIG. 22 is a view of the second stage 200, when viewed from above on which the panel element c2 (shown in a chain line) is held by suction of air. The second stage-driving portion 320 and the like are not shown in FIG. 22.

As shown in FIG. 22, the second suction table 201 has a plurality of central perforations 201a formed in an area for sucking and holding the central region of the panel element c2 and a plurality of outside perforations 201b formed in an area for sucking and holding the region outside of the central region of the panel element c2, each being formed as spaced away from each other at a specified distance.

The link 202 assumes a crisscross form in a plan view and extends in four directions from a central part 202a, bending downward in an intermediate part and being connected in its lower end to an area between the area of the table 201 where the central perforations 201a are formed and the area where the outside perforations 201b are formed. The central part 202a is linked to the piston rod 321b of the second stage-driving portion 320.

The exhausting device 600 for the central perforations is communicated with the central perforations 201a, as mentioned above, and includes the above-mentioned open-close electromagnetic valve 640, an exhaust portion 610 including a vacuum pump, flexible tube 620, exhaust chamber 630 for the central perforations and a pressure sensor (air pressure sensor) 650.

The tube 620 is connected in one end to the exhaust portion 610 and in the other end to the exhaust chamber 630 which is in communication with the central perforations 201a of the suction table 201. The open-close valve 640 is connected to the tube 620. When the valve 640 is in a closed state, the air introduced from the central perforations 201a by the exhaust portion 610 is discharged through the exhaust chamber 630 and the tube 620 and the central region of the panel element c2 can be sucked and held onto the suction table 201.

The outside air can be introduced into the central perforations 201a when the exhaust portion 610 is in an inoperative state and the valve 640 is open. The pressure sensor 650 is connected to the exhaust chamber 630 and can detect the air pressure in the exhaust chamber 630.

The exhausting device 700 for the outside perforations is communicated with the outside perforations 201b as stated above and includes the above-mentioned open-close electromagnetic valve 740, exhaust portion 710 including a vacuum pump, flexible tube 720 and the exhaust chamber 730 for the outside perforations.

The tube 720 is connected to one end to the exhaust portion 710 and in the other end to the exhaust chamber 730 which is in communication with the outside perforations 201b of the suction table 201. The open-close valve 740 is connected to the tube 720. When the valve 740 is in a closed state, the air introduced through the outside perforations 201b by the exhaust portion 710 is discharged through the exhaust chamber 730 and the tube 720 and the outside region of the panel element c2 can be sucked and held onto the suction table 201.

The outside air can be introduced into the perforations 201b when the exhaust portion 710 is in an inoperative state and the valve 740 is open.

The first stage 100 includes a first suction table 101 and a panel element-holding device 110 as shown in FIG. 21.

The first suction table 101 has a plurality of perforations 101a formed at a specific spacing for suction of panel element c1 in a region for holding the panel element c1.

The panel element-holding device 110 includes not only such perforations 101a but also an exhaust chamber 111, a flexible tube 112 and an exhausting device 113. The exhausting device 113 is connected to one end of the tube 112 and an exhaust chamber 111 is connected to the other end of the tube 112. The exhaust chamber 111 is communicated with perforations 101a of the table 101. The air introduced through the perforations 101a by the exhausting device 113 is discharged through the exhaust chamber 111 and the tube 112 and the panel element c1 can be sucked and held onto the suction table 101.

An interstage exhausting device 500 includes a ring member 510, a pipe for suction of air 520, a flexible tube 530, and a vacuum pump 540.

The ring member 510 is formed of an elastically deformable material for forming an airtight chamber in which the reduction of pressure is done by the discharge of air, the ring member being adapted to surround the two panel elements together with the first and second stages 100, 200, as interposed between the stages coming closer to each other. The ring member 510 is made of rubber and is arranged on the suction table 101 of the first stage 100.

The pipe 520 for suction of air is engaged in throughholes formed between the ring member 510 and the panel element c1-holding region on the first stage 100 and is connected to one end of the tube 530 which is connected in the other end to the vacuum pump 540, whereby the reduction of pressure is done by the discharge of air to adjust the air pressure to about 20 Pa (about 0.15 Torr) in the airtight chamber formed of the stages 100, 200 and ring member 510.

A stage-detecting sensor 1000 is provided near a path for descent and ascent of the second stage 200 to detect and once stop the stage 200 at a specific location of the path during its descent.

The pneumatic circuit 322, exhaust portions 610, 710 and open-close electromagnetic valves 640, 740 are operated according to the directions from a controller CONT. The controller CONT receives information on the air pressure of exhaust chamber 630 detected by the sensor 650, i.e. the air pressure in the central perforations 201a of the second stage 200, and also the information obtained by the stage detecting sensor 1000 on the position of the second stage 200.

The producing apparatus has a positioning device 400 for relatively positioning the two panel elements c1, c2 before adhering them.

The positioning device 400 is provided with two cameras (CCD camera), X-Y-θ drive device 420 and controller 430.

The two panel elements c1, c2 as relatively positioned when viewed from above are as shown in FIG. 7. The first stage 100, positioning device 400 and the like are not shown in FIG. 7.

As shown in FIG. 7, the two panel elements c1, c2 have register marks m1, m2 formed for positioning purposes outside the display region. A crisscross pattern is formed in the region of two ends on diagonal line, although not limited thereto. Any register pattern will do if it is useful in positioning the two panel elements relatively. The pattern may be formed in any location if outside the display region. The register marks may be formed by printing. In forming electrodes for panel elements, electrodes for markers (register marks) may be formed outside the display region and may emit a light by application of a voltage to the electrodes for markers. In this example, register marks m1, m2 are printed on the two panel elements c1, c2.

The CCD cameras 410 shown in FIG. 21 are connected to a controller 430 and are adapted to observe the register marks m1, m2 formed on the two panel elements c1, c2 for transmission of mark information to the controller 430.

The X-Y-θ drive device 420 includes a panel elementholding arm 421 and X-Y-θ drive portion 422. The panel element-holding arm 421 is connected to a X-Y-θ-direction movable member of the drive portion 422, and at one end 421a, can suck and hold the panel element c2. The X-Y-θ drive portion 422 is connected to the controller 430 and can move the panel element-holding arm 421 and the panel element c2 held thereby along the surface of the panel element c1 sucked and held by the first stage 100 in a specified direction (x direction in the drawing) or a direction vertical to that direction (y direction in the drawing) and can rotate the element c2 around an axis vertical to the X-Y plane (θ direction in the drawing). Thereby the panel element c2 can be moved on the panel element c1 held by the first stage 100 under the directions from the controller 430.

The controller 430 is connected, as mentioned above, to the CCD cameras 410 and the X-Y-θ drive device 420. The information on the register marks m1, m2 sent from the cameras 410 is processed and the operation of the X-Y-θ drive device 420 is controlled to move the panel element c2 for positioning purpose by matching the register marks m1, m2. The controller 430 includes means using the positioning method by image processing for alignment of substrates, panels and the like.

The foregoing producing apparatus may include an airtight chamber 800 as shown by 2-dot chain line in FIG. 21. The chamber 800 may enclose the first and second stages 100, 200 and other devices, but said apparatus is not provided with the chamber 800. The chamber 800 is described later.

An example of production of the liquid crystal display panel of reflection type shown in FIG. 1 by said apparatus is described with reference to FIGS. 23 and 24.

Figure 23:
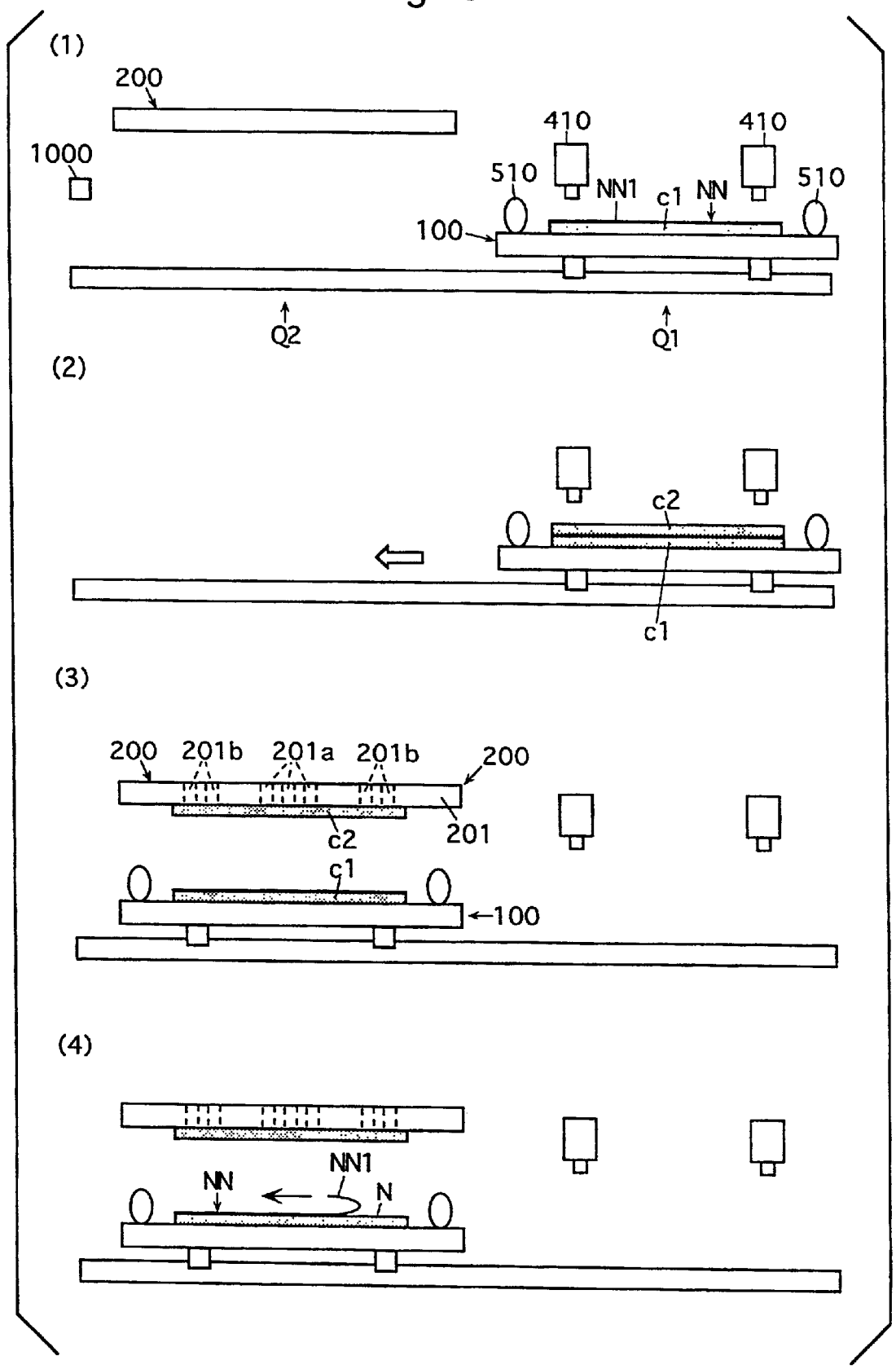
FIG. 23 is a view for describing the steps (1) to (4) in an example of steps for producing a liquid crystal display panel by the apparatus for producing the liquid crystal display panel shown in FIG. 21.
Figure 24:
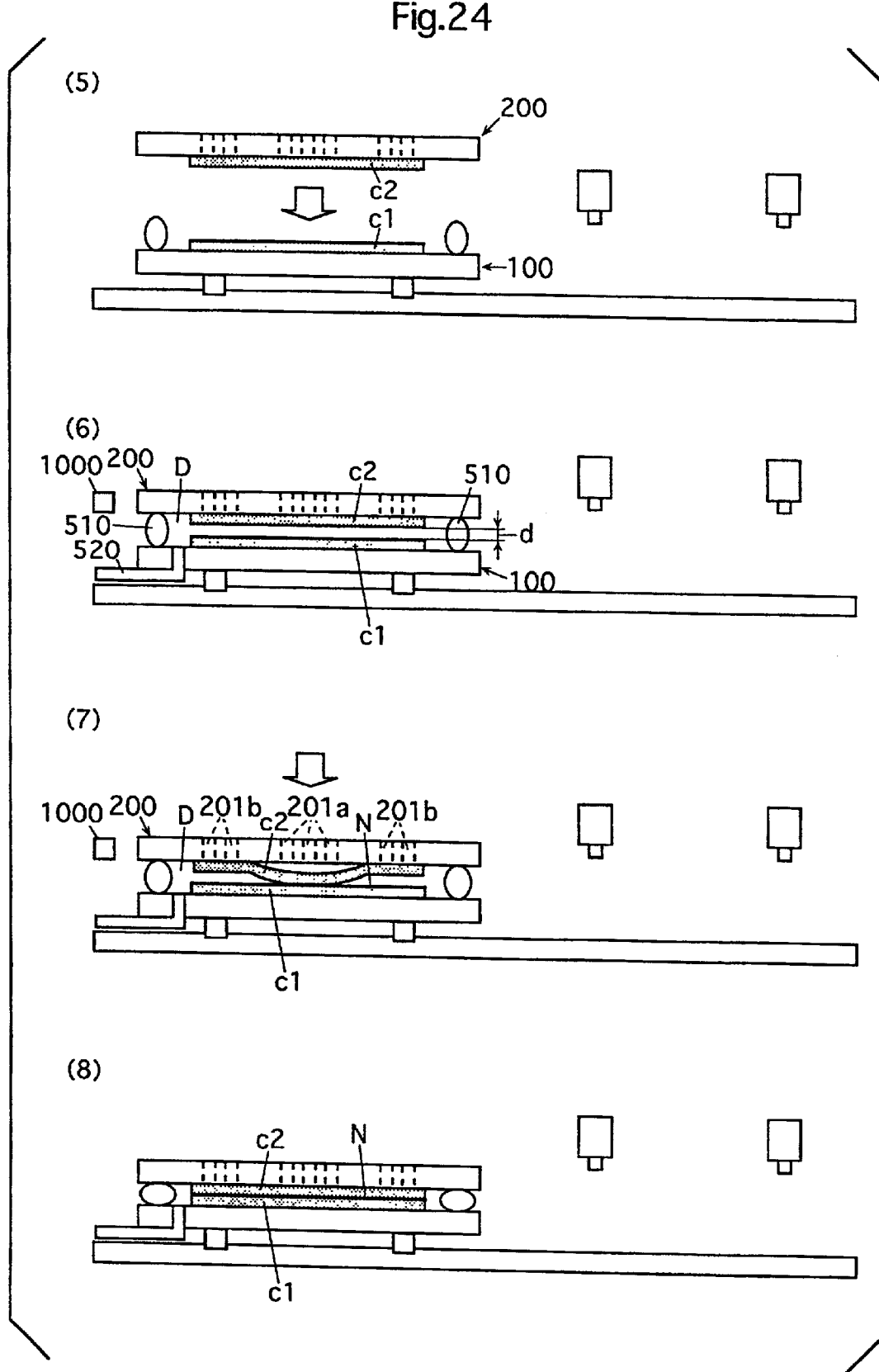
FIG. 24 is a view for describing the steps (5) to (8) subsequent to the steps shown in FIG. 23.

FIG. 23 is a view for describing the steps (1) to (4) in an example of steps for producing a liquid crystal display panel by the apparatus for producing the liquid crystal display panel shown in FIG. 21. FIG. 24 is a view for describing the steps (5) to (8) subsequent to the steps shown in FIG. 23. The indication of some parts is omitted in FIGS. 23 and 24 for simplification.

For the production of the liquid crystal display panel A shown in FIG. 1, each of R, G, B panel elements for red, green and blue displays is produced in advance(one element for each kind).

Any one of R, G, B panels (R panel element in this example) is taken as a first panel element (hereinafter referred to as "first panel element") c1 and a panel element (G panel element in this example) to be adhered to the element c1 is taken as another panel element (hereinafter referred to as "second panel element") c2. These two panel elements are adhered to each other in the steps (1) to (4) shown in FIG. 23 and the steps (5) to (8) shown in FIG. 24.

(1) Pressure sensitive adhesive double-coated tape NN (or adhesive sheet) having one side covered with a protective releasable sheet NN1 is adhered to at least one of surfaces to be adhered of the first and second panel elements c1, c2, i.e. to a side other than the side having the light absorbing layer BK of the first panel element c1 (R panel element in this example).

In this example, the adhesive double-coated tape is used although not limited thereto. In any case, an adhesive material may be applied or supplied to the panel element surface by hands or by an applicator for applying the adhesive material. The adhesive material may be applied or supplied by optional methods which are not problematic. The step of applying or supplying the adhesive material is carried out prior to the adhering step at any stage which is not problematic.

The first panel element c1 having the light absorbing layer BK facing down and the adhesive double-coated tape on the other side is set onto the first stage 100, and is sucked to the suction table 101 of the stage 100 by a panel element-holding device 110.

(2) The second panel element c2 (G panel element) is set on the first panel element c1 to relatively position the first and second panel elements c1, c2.

The positioning operation is performed as follows. The panel element c2 disposed on the panel element c1 is once held on the lower end 421*a* of the positioning device 400. In that state, while the register marks m1, m2 formed on the two panel elements c1, c2 are observed by CCD cameras 410, the second panel element c2 is moved by the X-Y-θ drive device 420 to match the register marks m1, m2 of the two panel elements c1, c2. This positioning operation is carried out by automatic control of the X-Y-θ drive device 420 based on the positional information obtained by image processing of information detected by the cameras 410. The panel element c2 is set again on the panel element c1 after positioning operation.

The alignment with use of the X-Y-θ drive 420 may be conducted by manually operating the X-Y-θ drive device 420. Optionally the second stage 200 for holding the second panel element c2 may include the X-Y-θ drive device. At that time, the second panel element c2 may be driven by the X-Y-θ drive to position the second panel element c2 after setting the panel element c2 to the stage 200. The register marks m1, m2 of the two panel elements c1, c2 may be also matched by manually moving the second panel c2 without use of X-Y-θ drive device while visually inspecting and observing the marks m1, m2 of the two panel elements c1, c2.

(3) After positioning the first and second panel elements c1, c2, the panel element c2 is disengaged from the panel element-holding arm 421 of the X-Y-θ drive device 420 and is overlaid on the panel element c1. Then the first stage 100 is moved under directions from the controller CONT to a location below the second stage 200 (location Q2 in FIG. 21) by the first stage-driving portion 310 of the stage-driving device 300 so that the panel element-holding surfaces of the two stages are opposed.

The second stage 200 is descended by the second stage-driving portion 320 of the stage-driving device 300. When the stage 200 comes into contact with the second panel element c2, the second panel element c2 is sucked and held by the suction table 201 by suction of air through the central perforations 201*a* and the outside perforations 201*b* using the exhausting devices 600, 700 each for respective perforations. The second stage 200 holding the second panel element c2 is ascended by the second stage driving portion 320 for standby.

(4) The protective releasable sheet NN1 is removed from the adhesive double-coated tape NN adhered to the first panel element c1 on the first stage to expose the adhesive material N.

(5) The second stage 200 is descended by the second stage-driving portion 320 of the stage-driving device 300 under the directions from the controller CONT.

(6) The first and second stages 100, 200 are relatively moved closer to each other due to the descent of the second stage by the second stage-driving portion 320 so as to bring their panel element-holding surfaces to a face-to-face position. In other words, the surfaces to be adhered of the panel elements c1, c2 held by the stages 100, 200 are in opposed positions, and the panel elements c1, c2 are relatively moved closer to each other. Then, when the detecting sensor 1000 detects the stage 200 and the stage 200 is contacted with the ring member 510, whereby the two panel elements c1, c2 are moved closer to each other to a close vicinity of specified distance (distance d as shown in FIG. 24). When the close vicinity distance of 2 mm is reached in this example, the descent of the second stage 200 by the driving portion 320 is stopped under the directions from the controller CONT.

Thus, an airtight chamber D is formed of the first and second stages 100, 200 so that the air is discharged for reduction of pressure to a specified level (20 Pa in this embodiment) by the interstage exhausting device 500 from the area between the first and second stages (i.e., the region between the two panel elements c1, c2).

(7) The discharge of air by the exhausting device 600 connected to the central perforations 201*a* in the second stage is stopped and the outside air is introduced into the central perforations by opening the electromagnetic valve 640 in the exhausting device 600 under the directions from the controller CONT, whereby the air pressure between the second stage and the central region of panel element c2 held by the second stage 200 is brought to a relatively higher level than the air pressure between the two panel elements c1, c2, thereby causing a specified difference in air pressure between the both side surfaces of central region of the panel element c2 on the second stage 200, whereby the central region of panel element c2 on the second stage is contacted, via the adhesive material, with the panel element c1 held by the first stage 100 due to the difference in the air pressure. The difference between the both sides of the panel element c2 on the second stage 200 is in the range of about 20 Pa to about 30 Pa (about 0.15 Torr to about 0.23 Torr). This difference of air pressure is indirectly detected when the pressure sensor 650 detects that the air pressure in the exhaust chamber 620 has reached the specified air pressure (air pressure which causes the specified difference of air pressure).

(8) When the pressure sensor 650 detects the specified air pressure, the second stage 200 is descended again by the second stage-driving portion 320 under the directions from the controller CONT. Thereby the stages 100, 200 are moved further closer to each other so that the two panel elements are pressure-spliced via the adhesive material all over the entire region.

The timing of descent of the second stage by the second stage-driving portion 320 may be in accord with the timing of detection of the specified air pressure by the pressure sensor 650 as stated above or with a specified lapse of time (e.g. 5 seconds) after start of intake of the outside air into the central perforations 201*a* of the second stage 200. Optionally the timing of descent of the second stage 200 may be determined by an electrical or optical sensor detecting the timing of contact of the central region of panel element c2 on the second stage 200 with the panel element c1 held by the first stage 100.

In the production of a display panel by this apparatus, the two panel elements c1, c2 are initially contacted with each other in the central region before adhering them all over the entire region. Accordingly, the adhering operation for the two panel elements starts in a mild way without a noticeable impact to be usually exerted on the two panel elements, so that the displacement of the two panel elements c1, c2 can be averted.

Then the first and second panel elements c1, c2 are pressure-spliced all over the entire region. In this operation, the two panel elements, which have already contacted with each other in the central region, are spliced extending their contacted area by degrees from the central region to the surrounding peripheral region, whereby the first and second panel elements c1, c2 are adhered together as precisely positioned while discharging the air without tendency to become wrinkled. Thus the R and G panel elements are adhered. At that time, the pressure in the central exhaust chamber 630 presumably has reached the atmospheric pressure.

After the first and second panel elements c1, c2 are pressure-spliced with each other all or substantially all over the entire surface region via the adhesive material N, the discharge of air by the exhaust portion 700 connected to the outside perforations 201b is stopped under directions from the controller CONT and the valve 740 in the exhausting device 700 is opened to introduce the outside air into the outside perforations 201b, releasing the panel element c2 from holding by the second stage 200 and stopping pressure-splicing of the first and second panel elements c1, c2 by the second stage-driving portion 320. Optionally the suction of air by the outside perforations 201b in the second stage 200 may be stopped on contact of the first and second panel elements c1, c2 in the central region and the outside air may be introduced into the outside perforations 201b.

After contact of the first and second panel elements c1, c2 via the adhesive material N all or substantially all over the whole surface, the reduction of air pressure by the interstage exhausting device 500 is stopped to return the pressure of air surrounding the first and second panel elements c1, c2 to the pressure of outside air. Although this assures the discharge of air from between the first and second panel elements c1, c2, the pressure of surrounding air may be returned to the pressure of outside air on contact of the first and second panel elements c1, c2 in the central region. The pressure of air surrounding the first and second panel elements c1, c2 may be kept, of course, at a specified low level until completion of adhering the first and second panel elements c1, c2.

The spliced panel elements thus obtained by adhering the R and G panel elements is taken as a first panel element c1 and the B panel element to be adhered next is taken as a second panel element c2. The B panel element is adhered to the adhered panel elements by substantially repeating the steps (1) to (8). In this way, a display panel A comprising layered R, G, B panel elements is produced.

In this example, the air is discharged for reduction of pressure in the airtight chamber D formed of the first and second stages 100, 200 and the ring member 510 using the interstage exhausting device 500 including the ring member 510, pipe 520 for suction of air, flexible tube 530 and vacuum pump 540. The air pressure, however, may be reduced by the discharge of air in the airtight chamber 800 using an exhausting device connected thereto. This system using the chamber 800 may be used to adjust the air pressure in the region surrounding the first and second stages 100, 200 holding the first and second panel elements c1, c2 to a level lower than the atmospheric pressure. FIG. 21 shows the provision of the following within the airtight chamber 800: the exhaust portions 610, 710, exhausting device 113, pneumatic circuit 322, electromagnetic valves 640, 740, vacuum pump 540 and the like. But actually they are provided outside the airtight chamber 800 when the chamber 800 is employed.

[D] Method and Apparatus for Producing a Display Panel Relating to FIGS. 25 to 29

The method and apparatus for producing a display panel relating to FIGS. 25 to 29 are based on the following method and apparatus for producing a display panel.

(Method for Producing a Display Panel)

The method is to produce a display panel by layering panel elements for forming a display panel for display of images, and includes the steps of: causing a first stage to hold a first panel element; causing a second stage to hold a second panel element; supplying an uncured adhesive material to at least one of the first panel element held on the first stage and the second panel element held on the second stage, moving at least one of the first and second stages holding the first and second panel elements to a position wherein the surfaces to be adhered are opposed to each other, superimposing specified ends of the first and second panel elements on each other; holding the ends of the first and second panel elements as superimposed on each other; temporarily adhering the panel elements progressively from the ends thereof held as superimposed toward the entire region via the adhesive material by gradually exerting a pressing force on both sides of the two panel elements; relatively positioning the temporarily adhered first and second panel elements; and permanently adhering the first and second panel elements by curing the adhesive material between the first and second panel elements.

In this method, it is not always necessary to contact the two panel elements via the adhesive material in the step of superimposing the ends of the two panel elements. In this case, a slight gap may exist between the two panel elements.

In the temporarily adhering step according to the above-mentioned method, the two panel elements are temporarily adhered with said adhesive material all over the entire region by gradually exerting a pressing force on both sides of the two panel elements from the ends superimposed toward the entire region so that the two panel elements are temporarily adhered while the air is discharged between the two panel elements. Accordingly the two panel elements are adhered in such an intimate contact without creation of wrinkles.

While the adhesive material remains uncured, namely while the two panel elements can be displaced relatively, the positioning operation is conducted and thereafter the adhesive material between the two panel elements is cured to permanently adhere the two panel elements. Consequently the two panel elements are finally adhered as precisely positioned.

When three or more panel elements are layered, the panel elements adhered by the above-mentioned permanently adhering step are taken as the first panel element, and one panel element to be adhered next is taken as the second panel element. More panel elements to be adhered next are adhered, one by one, to the panel elements already adhered by substantially repeating the respective steps described above.

Each of the first and second panel elements can be held by the corresponding stage, typically by a device for causing the stage to hold the panel element by sucking the panel element by air through perforations formed in the stage, although not limited thereto.

An uncured adhesive material is supplied in the step of supplying the adhesive material. Typical examples of such uncured adhesive materials include those exhibiting fluidity under increased pressure. These examples include those exhibiting slight fluidity immediately by itself immediately after the supply, and thereafter showing a normal level of fluidity under increased pressure. In the step of supplying the adhesive material, the adhesive material may be applied to a specified end of the first panel element held on the first stage, and in the step of temporarily adhering the two panel elements, the two panel elements may be temporarily adhered in a manner to spread the uncured adhesive material between the two panel elements by gradually exerting a pressing force on both sides of the two panel elements with the ends thereof superimposed on each other and from the superimposed ends as held toward the entire region. The outside air would be unlikely to penetrate into the two panel elements when the adhesive material is spread into between the two panel elements in this way.

The adhesive material may be applied partly or entirely to one of surfaces to be adhered of the first and second panel elements instead of being spreadably supplied only to the end of the panel element.

In the step of setting the second panel element to the second stage, it is possible to project the end of the second panel element from the second stage in setting the second panel element to the second stage, in order to facilitate the step (later step) of holding the ends of the first and second panel elements with the ends as superimposed.

In any case, for temporarily adhering the two panel elements, for example, a pressing member may be used for the first stage. The pressing member is one for pressing the two panel elements against the first stage and the pressing member may be moved relative to the first stage while retaining the two panel elements as pressed by the pressing member.

In this case, the above-mentioned pressing member may be used as means for retaining the ends of the two panel elements as pressed against the first stage. Of course, such means may be provided independently of the pressing member.

In any case, the pressing member to be used herein may be one having a convex curved panel element-pressing surface having a specified curvature. The panel element-pressing surface may be rolled or rollingly moved relative to the panel element in the temporarily adhering step. Thereby the two panel elements can be smoothly adhered together.

Typical examples of the pressing member having the convex curved panel element-pressing surface are pressing rollers having a circular section. It is also possible to use a pressing member having a panel element-pressing surface showing an arc or a sector shape when viewed from the side surface.

When a pressing roller having a circular section is used, the so-called inverted-crown shaped press roller having a central portion smaller in diameter than end portions may be used to avoid creation of wrinkles in the panel element by compression with the pressing member.

In the case where the pressing member is employed, for example, in the step of holding the ends of the first and second panel elements as superimposed, the ends of the panel elements may be held as superimposed by the pressing member which presses the superimposed ends of the panel elements against the first stage, and in the step of temporarily adhering the two panel elements, the first stage against which the panel elements are pressed by the pressing member may be moved relative to the pressing member and the second stage to progressively temporarily adhere the two panel elements on the first stage while drawing the second panel element from the second stage.

Likewise in this case, useful pressing members may be those having a convex curved panel element-pressing surface with a specified curvature. In the step of holding the ends of the two panel elements as superimposed, the superimposed ends of the two panel elements may be held as pressed against the first stage by a part of a panel element-pressing surface of the pressing member. In the temporarily adhering step, the panel element-pressing surface of the pressing member may be rolled relative to the first stage with the two panel elements held therebetween to temporarily adhere the two panel elements on the first stage.

Useful adhesive materials include, for example, those which are cured after temporarily adhering the two panel elements by irradiation with light, heating and others within a range which is not problematic. It is recommendable to use photo-curing materials such as UV-curing materials which are easily available in the market and which are unlikely to adversely affect the panel elements.

When the photo-curing adhesive material is used, the adhesive material is irradiated with light for curing the material in the step of permanently adhering the first and second panel elements.

In any case, at least the temporarily adhering step may be carried out under a surrounding air pressure reduced to a specified level to sufficiently discharge the air from between the adjacent panel elements.

The first and second panel elements can be relatively positioned prior to the permanently adhering step by various methods, for example, by per se known methods of positioning a substrate or a panel.

Examples of positioning methods are as follows.

(1) Register marks are formed on respective panel elements. While the register marks of the two panel elements are visually inspected or observed through a camera, the register marks are matched by manually moving the second panel on the first panel element.

(2) Register marks are formed on respective panel elements. While the register marks of the two panel elements are observed through a camera, the second panel element is moved on the first panel element by a X-Y-θ drive device to match the register marks of the two panel elements.

The alignment of panel elements with use of the X-Y-θ drive device may be conducted by manually operating the X-Y-θ drive device. Optionally the operation of X-Y-θ drive device may be controlled so as to position the panel elements according to the mark data (e.g. information on the position) obtained by inspection with a camera. In the latter case, an image processing method for alignment of substrates, panels and the like can be employed.

The register marks may be, for example, liquid crystal marks, electroluminescence marks or the like, which emit light rays on application of electric power thereto.

(Apparatus for Producing a Display Panel)

An apparatus for producing a display panel comprising layered panel elements for forming a display panel for display of images is provided, the apparatus comprising: a first stage for holding a first panel element; a second stage for holding a second panel element; a device for supplying an uncured adhesive material to the first panel element held by the first stage; a first drive device for relatively moving the first and second stages to bring, to an opposed position, the first and second panel elements held by the first and second stages, respectively and to superimpose the specified ends of the first and second panel elements; a pressing member for holding the specified ends of the first and second panel elements as pressed against the first stage; and a second drive device for moving, relatively to the pressing member and the second stage, the first stage against which the ends of the two panel elements are pressed by the pressing member, while maintaining the state of the panel elements as pressed by the pressing member and while drawing off the second panel element from the second stage in a manner such that the two panel elements are progressively temporarily adhered on the first stage via the uncured adhesive material in a state of being pressed by the pressing member; a device for positioning the temporarily adhered first and second panel elements relatively; and a device for permanently adhering the two panel elements by curing the adhesive material between the two panel elements after positioning the two panel elements by the positioning device.

The first and second stages include a device for holding the panel element. Useful holding devices include, for example, perforations for suction of air to draw and hold the panel element, which are formed in the stage and connected to an exhausting device, although not limited thereto.

According to the foregoing apparatus, the first and second panel elements are set to the first and second stages, respectively. Thereafter, the uncured adhesive material is supplied in the specified amount to the first panel element held by the first stage using the device for supplying the uncured adhesive material to the first panel element. Thereafter the first drive device is operated for relatively moving the first and second stages to bring the first and second panel elements to an opposed position and to superimpose the specified ends of the first and second panel elements.

The superimposed ends are held as pressed against the first stage by the pressing member.

Thereafter the first stage is moved by the second drive device, relatively to the pressing member and the second stage, while maintaining the state of the panel elements as pressed by the pressing member and while drawing off the second panel element from the second stage in a manner such that the two panel elements are progressively temporarily adhered on the first stage via the uncured adhesive material in a state of being pressed by the pressing member.

When the adhesive material has been partly applied to the specified end of the first panel element by the adhesive material-supplying device, the adhesive material is spread between the two panel elements by the pressing member.

The first and second drive devices have a partly common structure, or one of them may be part of the other.

On completion of temporarily adhering operation in this way, the two panel elements are relatively positioned by the positioning device and the adhesive material is cured by the permanently adhering device to permanently adhere the two panel elements.

The pressing member to be used herein may be one having a convex curved panel element-pressing surface having a specified curvature. The superimposed ends of the two panel elements can be held as pressed against the first stage by part of the panel element-pressing surface. In this case, the panel element-pressing surface is rolled against the first panel element via the first and second panel elements by the second drive device, whereby the two panel elements are temporarily adhered on the first stage via the adhesive material while drawing the second panel element from the second stage.

Typical examples of the pressing member having the convex curved panel element-pressing surface include a pressing roller with a circular section. It is also possible to use a pressing member having a panel element-pressing surface with an arc or a sector shape when viewed from the side surface. When a pressing roller with a circular section is used, an inverted-crown shaped pressing roller with the central portion smaller in diameter than the end portions may be used to avoid creation of wrinkles in the panel element by compression with the pressing member.

A vacuum chamber may be provided for adjusting the pressure of the air surrounding the two panel elements to a level of reduced pressure at least in temporarily adhering the first and second panel elements to sufficiently discharge the air from between the two panel elements.

If three or more panel elements are to be adhered, the adhered panel elements obtained by finally adhering operation is taken as one of the paired panel elements to be adhered to each other.

The positioning device may be the following.

(1) A positioning device including a camera for observing register marks formed on the two panel elements and a X-Y-θ drive device for moving the second panel element on the first panel element to position them by matching the register marks of the two panel elements.

(2) A positioning device including a camera for observing register marks formed on the two panel elements, a X-Y-θ drive device for moving the second panel element on the first panel element to position them by matching the register marks of the two panel elements and a controller for control of operation of the X-Y-θ drive device for moving the second panel element on the first panel element to position the elements by matching the register marks of the two panel elements based on the mark information (such as positional information) from the camera. Such controllers include, for example, means utilizing the image processing method for positioning substrates or panels.

The permanently adhering device may be devices which can cure the adhesive material between the two panel elements depending on the kind of adhesive materials. For example, such devices may include a lamp for irradiating the adhesive material with light when a photo-curing adhesive material is used.

The [D] type method and apparatus for producing a display panel as described above are applicable to the production of various display panels. Description is given below to a specific example of method and apparatus for producing a liquid display panel with reference to FIGS. 25 to 29.

Figure 25:
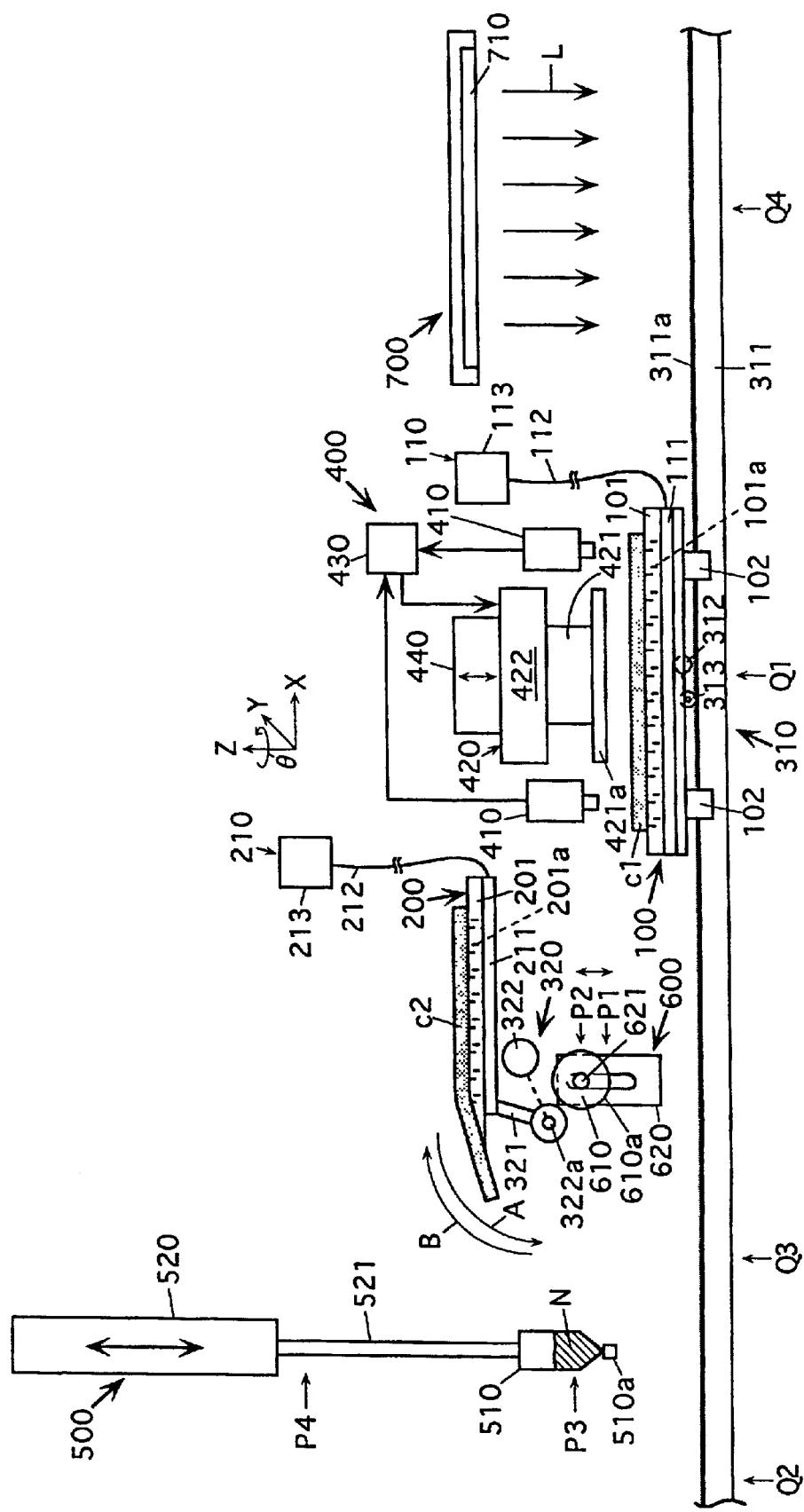
FIG. 25 schematically shows a structure of a further example of an apparatus for producing the liquid crystal display panel shown in FIG. 1.

FIG. 25 schematically shows a structure of an example of an apparatus for producing the liquid crystal display panel A shown in FIG. 1.

The apparatus for producing a display panel comprises: a first stage 100 for holding a first panel element c1; a second stage 200 for holding a second panel element c2; a device 500 for supplying an uncured adhesive material N exhibiting fluidity under increased pressure to the first panel element c1 held by the first stage 100; a first drive device 320 for relatively moving the first and second stages 100, 200 to bring, to an opposed position, the first and second panel elements c1, c2 held by the first and second stages 100, 200, respectively and to superimpose specified ends of the first and second panel elements c1, c2; a pressing-holding device 600 including a pressing member 610 for holding the superimposed specified ends of the first and second panel elements c1, c2 as pressed against the first stage 100; and a second drive device 310 for moving, relatively to the pressing member and the second stage, the first stage 100 against which the ends of the two panel elements c1, c2 are pressed by the pressing member 610, while maintaining the state of the panel elements as pressed by the pressing member 610 and while drawing off the second panel element c2 from the second stage 200 in a manner such that the two panel elements c1, c2 are progressively temporarily adhered via an adhesive material N as pressed by the pressing member 610 on the first stage 100; a device 400 for positioning the temporarily adhered first and second panel elements c1, c2; and a permanently adhering device 700 for permanently adhering the two panel elements c1, c2 by curing the adhesive material between the first and second panel elements after positioning the first and second panel elements by the positioning device 400.

The second drive device 310 serves also as part of the first drive device 320.

The first and second stages 100, 200 include first and second suction tables 101, 201 and panel element-holding devices 110, 210 for holding a panel element, respectively.

The first and second suction tables 101, 201 have a plurality of perforations 101a, 201a formed in the region for holding the first and second panel elements, respectively, as spaced away from each other at a specified distance.

The panel element-holding devices 110, 210 have not only such perforations 101a 201a, but exhaust chambers 111, 211 on the suction tables, flexible tubes 112, 212, and exhausting devices 113, 213. The exhausting devices 113, 213 are connected to one end of the tubes 112, 212, and exhaust chambers 111, 211 are connected to the other end of the tubes 112, 212. Exhaust chambers 111, 211 are communicated with the perforations 101a, 201a of the tables 101, 201. In this way, the air is sucked from the perforations 101a, 201a through the exhaust chambers 111, 211 and tubes 112, 212 by the operation of the exhausting devices 113, 213.

The second drive device 310 is such that, although not limited thereto, a pinion gear 313 provided on the first stage 100 is engaged with a rack gear 311a arranged along a guide rail 311 and is reciprocatingly rotated by a motor 312 mounted on the first stage 100. The first stage 100 is moved along the guide rail 311 by the first stage-driving device 310, and is disposed in a location Q1 where the panel elements are positioned, a location Q2 where the adhesive material is supplied, a location Q3 for starting the temporal adhesion between the two panel elements c1, c2 or a location Q4 where the two panel elements c1, c2 are permanently adhered. In this movement, a slider 102 provided on the first stage 100 slides along the guide rail 311.

The first drive device 320 includes the above-mentioned second drive device 310 and further includes a second stage-supporting arm 321 and a rotational drive portion 322 for driving the arm 321, i.e. a second stage-driving portion.

The second stage-supporting arm 321 is supported at its one end by an axle 322a of the rotational drive portion 322, and is connected at the other end to the second stage 200. The rotational drive portion 322 is disposed in a specified place and is capable of rotating the axle 322a in the specified direction (a direction A in the drawing) with a specified timing or in a direction (a direction B in the drawing) opposite to the specified direction. In this way, the supporting arm 321 and the second stage 200 are turned in the direction A or B with the specified timing due to the rotation of the axle 322a by operation of the rotational drive portion 322.

The pressing-holding device 600 is disposed in a specified place and includes a pressing member 610 and a device 620 for driving the member 610 for upward and downward movement. The device 620 has a vertically (direction z) movable member 621 which rotatably supports the pressing member 610. The device 620 is capable of ascending and descending the movable member 621 supporting the pressing member 610 with the specified timing. In this way, the pressing member 610 is moved with the specified timing by the device 620 to a pressing location P1 where the pressing member 610 presses the first and second panel elements c1, c2 against the first stage 100 at a location Q3 for initiating the temporarily adhering operation or to a retraction location P2 located above the location P1.

The pressing member 610 is a pressing roller having a circular section with a panel element-pressing peripheral surface 610a. The pressing member 610 is rotatably supported by the movable member 621 of the device 620. Although the pressing roller of circular section is used herein, it is possible to use a pressing member having a panel element-pressing surface showing a an arc or a sector shape when viewed from the side surface. The pressing roller 610 may be the so-called inverted-crown shaped pressing roller having a central portion smaller in diameter than the end portions to avoid creation of wrinkles in the panel element by compression with the pressing member.

The adhesive material-supplying device 500 is disposed above the location Q2 and includes an adhesive material-supplying portion 510 and portion 520 for driving the portion 510 for upward and downward movement.

The adhesive material-supplying portion 510 accommodates the above-mentioned uncured adhesive material N (photo-curing one which exhibits fluidity under increased pressure) and has a supply outlet 510a at its lower end.

The driving portion 520 for driving the supplying portion 510 for upward and downward movement is disposed in a specified position and has a vertically (direction z) movable member 521 connected to the adhesive material-supplying portion 510. The device 520 can ascend and descend the member 521 with the specified timing. Consequently, the adhesive material-supplying portion 510 is moved with the specified timing by the driving portion 520 to the P3 (where the adhesive material-supplying portion 510 supplies the adhesive material N to the first panel element c1) or a retraction location P4 located above.

According to the adhesive material-supplying device 500, the adhesive material N can be supplied to the specified end of the panel element c1 situated at the location Q2 (where the adhesive material is supplied) when the adhesive material-supplying portion 510 is moved to the location P3 (where the adhesive material is supplied) with the specified timing by the driving portion 520 to release the specified amount of adhesive material N from the adhesive material-supplying outlet 510a.

The positioning device 400 is provided above the location for relatively positioning the two panel elements c1, c2.

The positioning device 400 is provided with two cameras (CCD camera), X-Y-θ drive device 420, controller 430 and a driving device 440 for upward and downward movement.

The two panel elements c1, c2 as relatively positioned when viewed from above are as shown in FIG. 7. The first stage 100, positioning device 400 and the like are not shown in FIG. 7.

As shown in FIG. 7, the two panel elements c1, c2 have register marks m1, m2 are formed for positioning purposes outside the display region. A crisscross pattern is formed in the region of two ends on diagonal line, although not limited thereto. Any register pattern can be used if it is useful in positioning the two panel elements relatively. The pattern may be formed in any location if outside the display region. The register marks may be formed by printing. In forming electrodes for panel elements, electrodes for markers (register marks) can be arranged outside the display region and may emit a light by application of a voltage to the electrodes for markers. In this example, register marks m1, m2 are printed on the two panel elements c1, c2.

The CCD cameras 410 shown in FIG. 25 is connected to the controller 430, and is adapted to inspect the register marks m1, m2 formed on the panel elements c1, c2 for transmission of the obtained information to the controller 430.

The X-Y-θ drive device 420 includes a panel element-holding arm 421, and X-Y-θ drive portion 422. The panel element-holding arm 421 is connected to a X-Y-θ-direction movable portion of the drive portion 422, and at one end 421a, can suck and hold the panel element c2 at the location Q1 substantially without raising it. The X-Y-θ drive portion 422 is connected to the controller 430 and can move the panel element-holding arm 421 and the panel element c2 held thereby along the surface of the panel element c1 sucked and held by the first stage 100 in a specified direction (x direction in the drawing) or a direction vertical to that direction (y direction in the drawing) and can rotate the element c2 around an axis vertical to the X-Y plane (θ direction in the drawing). Thereby the panel element c2 can be moved on the panel element c1 held by the first stage 100 under the directions from the controller 430.

The controller 430 is connected, as mentioned above, to the CCD cameras 410 and the X-Y-θ drive device 420. The information on the register marks m1, m2 sent from the cameras 410 is processed and the operation of the X-Y-θ drive device 420 is controlled to move the panel element c2 for positioning purpose by matching the register marks m1, m2. The controller 430 includes means for using the positioning method by image processing for alignment of substrates, panels and the like.

The driving device 440 for upward and downward movement is disposed above the X-Y-θ drive device 420, and can move upward and downward the drive device 420 (z direction) at the specified timing. When the X-Y-θ drive device 420 is moved downward by the device 440, the drive portion 422 can be contacted at its lower end 421a with the panel element c2 situated at location Q1 where the positioning operation is conducted.

The permanently adhering device 700 is set above a location Q4 where the two panel elements are permanently adhered, and includes a lamp 710 for curing the adhesive material N by irradiating the two panel elements with light L. Thereby the photo-curing adhesive material N can be cured.

Figure 27:
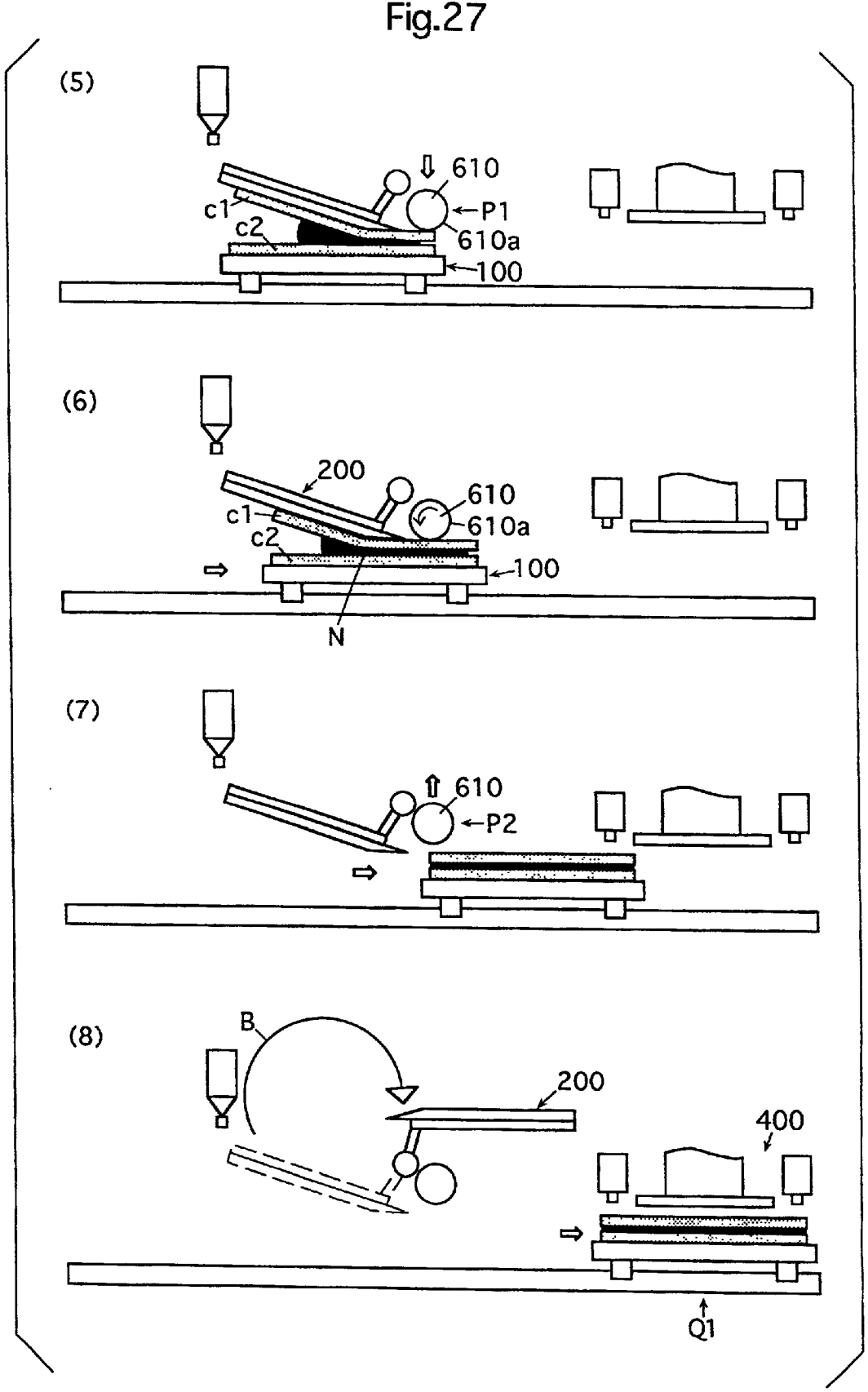
FIG. 27 is a view for describing the steps (5) to (8) subsequent to the steps shown in FIG. 26.
Figure 28:
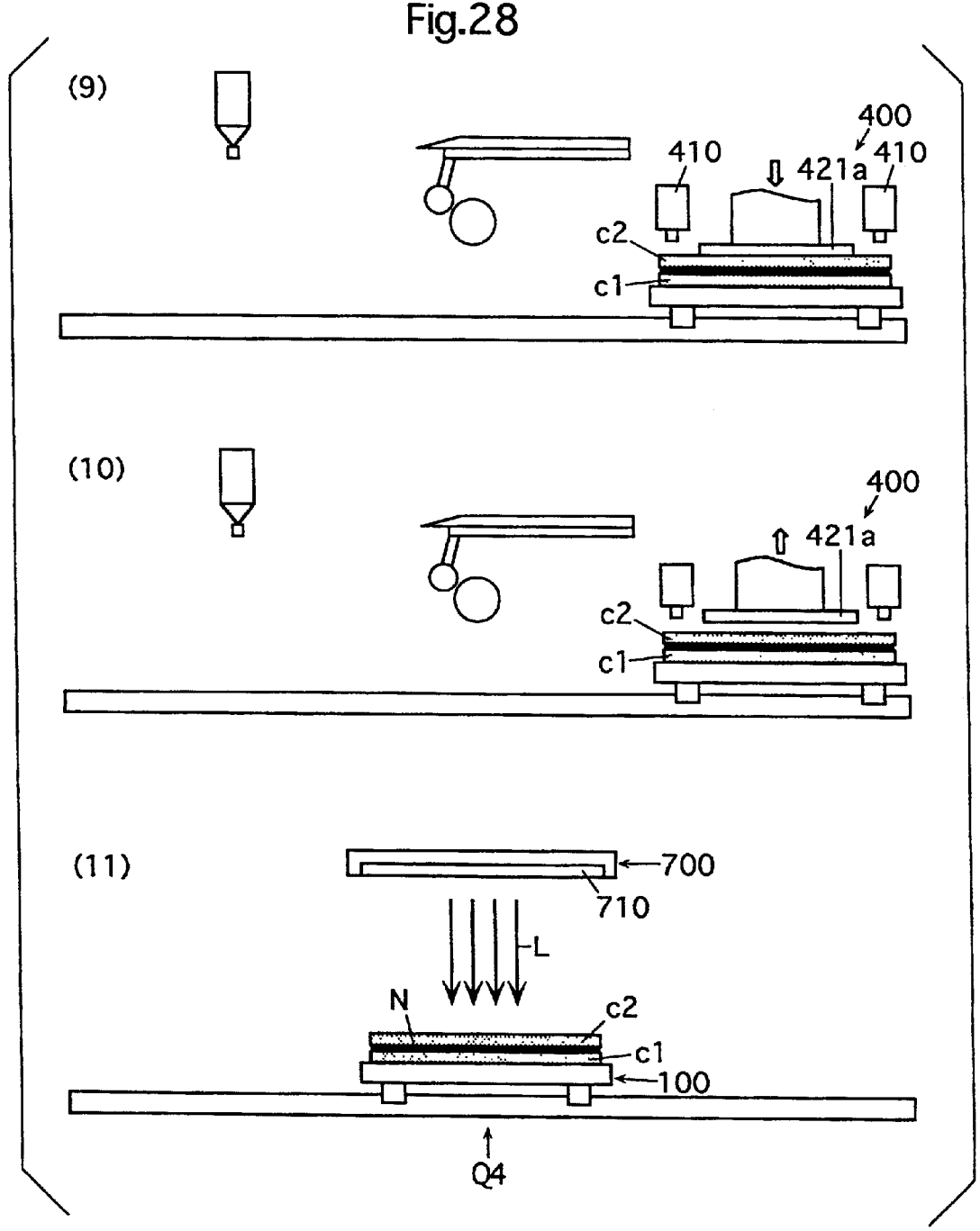
FIG. 28 is a view for describing the steps (9) to (11) subsequent to the steps shown in FIG. 27.

An example of production of the liquid crystal display panel of reflection type shown in FIG. 1 by said apparatus is described with reference to FIGS. 26, 27 and 28.

Figure 26:
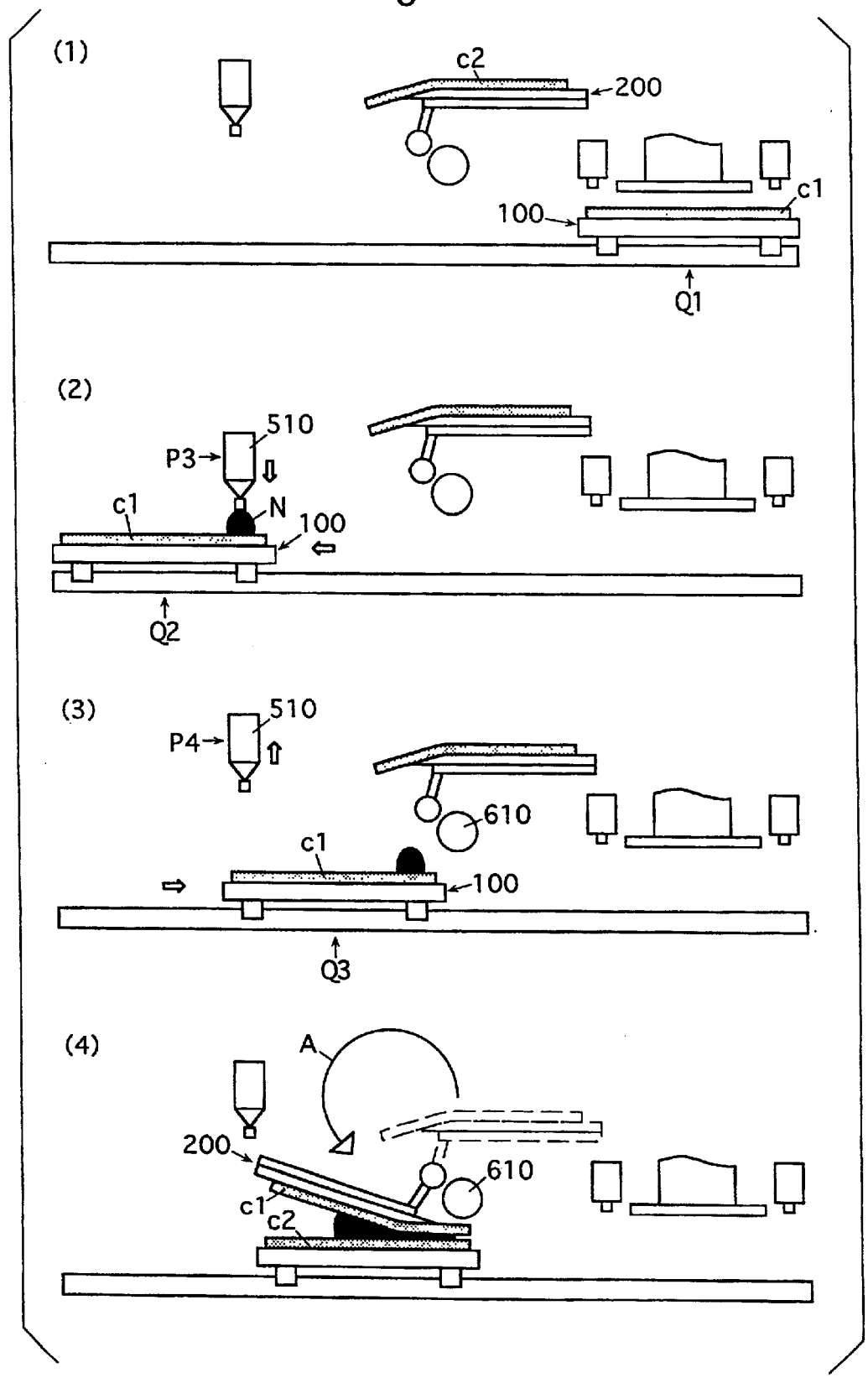
FIG. 26 is a view for describing the steps (1) to (4) in an example of steps for producing a liquid crystal display panel by the apparatus for producing the liquid crystal display panel shown in FIG. 25.

FIG. 26 is a view for describing the steps (1) to (4) in an example of steps for producing a liquid crystal display panel by the apparatus for producing the liquid crystal display panel shown in FIG. 25. FIG. 27 is a view for describing the steps (5) to (8) subsequent to the steps shown in FIG. 26. FIG. 28 is a view for describing the steps (9) to (11) subsequent to the steps shown in FIG. 27. FIGS. 26, 27 and 28 omit the indication of some parts for simplification.

First, each of R, G, B panel elements for red, green and blue displays is produced in advance in the production of reflection type liquid crystal display panel A shown in FIG. I (one element for each kind).

Any one of R, G, B panels (R panel element in this example) is taken as a first panel element (hereinafter referred to as "first panel element") c1 and a panel element (G panel element in this example) to be adhered to the element c1 is taken as another panel element (hereinafter referred to as "second panel element") c2. These two panel elements are adhered to each other in the steps (1) to (4) shown in FIG. 26, the steps (5) to (8) shown in FIG. 27 and the steps (9) to (11) shown in FIG. 28.

(1) The first panel element c1 (R panel element in this example) with a surface to be adhered facing up (i.e. a side other than the side having the light absorbing layer BK of the first panel element c1) is set onto the first stage 100 and is sucked and held onto the suction table 101 of the stage 100 by the panel element-holding device 110. Similarly the panel element c2 (G panel element in this example) with a surface to be adhered facing up is set onto the second stage 200 and is sucked and held to the suction table 201 of the second stage 200 by the panel element-holding device 210 while the end of the panel element c2 is partly drawn from the second stage 200.

(2) The first stage 100 holding the first panel element c1 is moved by the second drive device 310 until the specified end of the first panel element c1 is moved to a location where the specified end of the panel element c1 is below the adhesive material-supplying device 500, namely to the location Q2 (position for supply of adhesive material) while the adhesive material-supplying portion 510 is descended by the device 520 of the adhesive material-supplying device 500 to a location (for supply of adhesive material) above the panel element c1, namely to the location P3. The photo-curing adhesive material N is applied to the specified end of the panel element c1 to arrange the adhesive material N in the form of a line in the direction of width of the panel element c1.

(3) Thereafter, when the adhesive material-supplying portion 510 is ascended by the device 520, the supplying portion 510 is retracted from the location P3 to the retraction location P4. The first stage 100 holding the first panel element c1 is moved by the second drive device 310 to a location where the specified end of the panel element c1 lies below the pressing member 610, i.e. to the location Q3 for temporarily adhering operation.

(4) The second stage 200 holding the second panel element c2 is rotated in a direction A by the drive portion 322 of the first drive device 320, and is moved to a location where the specified ends of the panel elements c1, c2 are brought to a location below the pressing member 610, i.e. to the location Q3 for temporarily adhering operation, whereby the surfaces to be adhered are brought to a face-to-face position and the ends of the panel elements are superimposed on each other.

(5) The pressing member 610 is descended to a pressing location P1 by the device 620 of the pressing-holding device 600 so that the superimposed ends of the panel elements c1, c2 are held as pressed against the first stage 100 by part of the panel element-holding surface 610a of the pressing member 610.

(6) Thereafter the first stage 100 is moved by the second drive device 310, relative to the second stage 200 and the pressing member 610, while maintaining the state of the panel elements being pressed by the pressing member 610 and drawing the panel element c2 from the second stage 200. In this way, the panel elements c1, c2 are temporarily adhered as pressed by the pressing member 610 on the first stage 100, progressively via the adhesive material N. At this time, the adhesive material N is spread between the the first and second panel elements c1, c2 by the pressing member 610. Accordingly, it is difficult for the outside air to penetrate into between the two panel elements. Consequently the two panel elements are temporarily adhered smoothly.

(7) The pressing member 610 is relatively moved to the terminal ends of the panel elements c1, c2 and ascended by the device 620 for upward and downward movement to a retraction position P2.

(8) After completion of temporarily adhering the panel elements c1, c2, the suction operation of the second stage 200 by the panel element-holding device 210 is made inoperative, and the stage 200 is turned in a B direction for return to its original location by the first drive device 320. Then the first stage 100 holding the panel elements c1, c2 thus temporarily adhered is moved by the second drive device 310 to a location below the positioning device 400, namely the location Q1 for positioning operation.

(9) The X-Y-θ drive device 420 is descended by the device 440 for upward and downward movement to position the panel elements c1, c2 relatively.

The positioning operation is performed as follows. The panel element c2 disposed on the panel element c1 is set on the lower end 421a of the positioning device 400 substantially without raising the element c2. In that state, while the register marks m1, m2 formed on the two panel elements c1, c2 are observed by CCD cameras 410, the second panel element c2 is moved on the panel element c1 by the X-Y-θ drive device 420 to match the register marks m1, m2 of the two panel elements c1, c2. This positioning operation is carried out by automatic control of X-Y-θ drive device 420 based on the positional information obtained by image processing of information detected by the cameras 410.

(10) After positioning the first and second panel elements c1, c2, the panel element c2 is disengaged from the panel element-holding arm 421 of the X-Y-θ drive device 420. Then the device 420 is ascended.

(11) The first stage 100 holding the positioned first and second panel elements c1, c2 is moved by the second drive device 310 to a location below the permanently adhering device 700, i.e. the location Q4 where the permanently adhering operation is conducted. Light L from a lamp 710 in the permanently adhering device 700 is irradiated to the photo-curing adhesive material N between the panel elements c1, c2, whereby the permanently adhering operation is completed by curing the adhesive material N. In this way, the R and G panel elements are adhered together.

On completion of adhering the two panel elements, the light irradiation is discontinued by the permanently adhering device 700, while the first stage is returned to the initial location Q1, holding the adhered panel elements.

In the production of a display panel by the panel-producing apparatus shown in FIG. 25, the first and second panel elements having superimposed ends are temporarily adhered all over the entire region while pressed from the both sides of the panel elements ends and adhering from the superimposed ends toward the entire region with a pressing force to be successively applied, so that the temporarily adhering operation assures the discharge of air which enables an intimate contact of the two panel elements and unlikelihood of forming wrinkles.

While the adhesive material remains uncured, namely while the two panel elements can be displaced relatively, the positioning operation is conducted and the adhesive material between the two panel elements is cured to permanently adhere the two panel elements. Consequently the two panel elements are finally adhered as precisely positioned.

After completion of adhering the two panel elements R and G, the permanently adhered R and G panel elements is taken as the first panel element c1, and one B panel element to be adhered next is taken as the second panel element c2. The B panel element to be adhered next is adhered to the panel elements already adhered by substantially repeating the respective steps (1) to (11) described above. In this way, a display panel A comprising layered G, R, B panel elements is produced.

A vacuum chamber may be provided to bring about a desired reduced pressure in the atmosphere surrounding the first and second panel elements c1, c2 at least in temporarily adhering the first and second panel elements c1, c2 in order to sufficiently discharge the air from between the first and second panel elements c1, c2.

Figure 29:
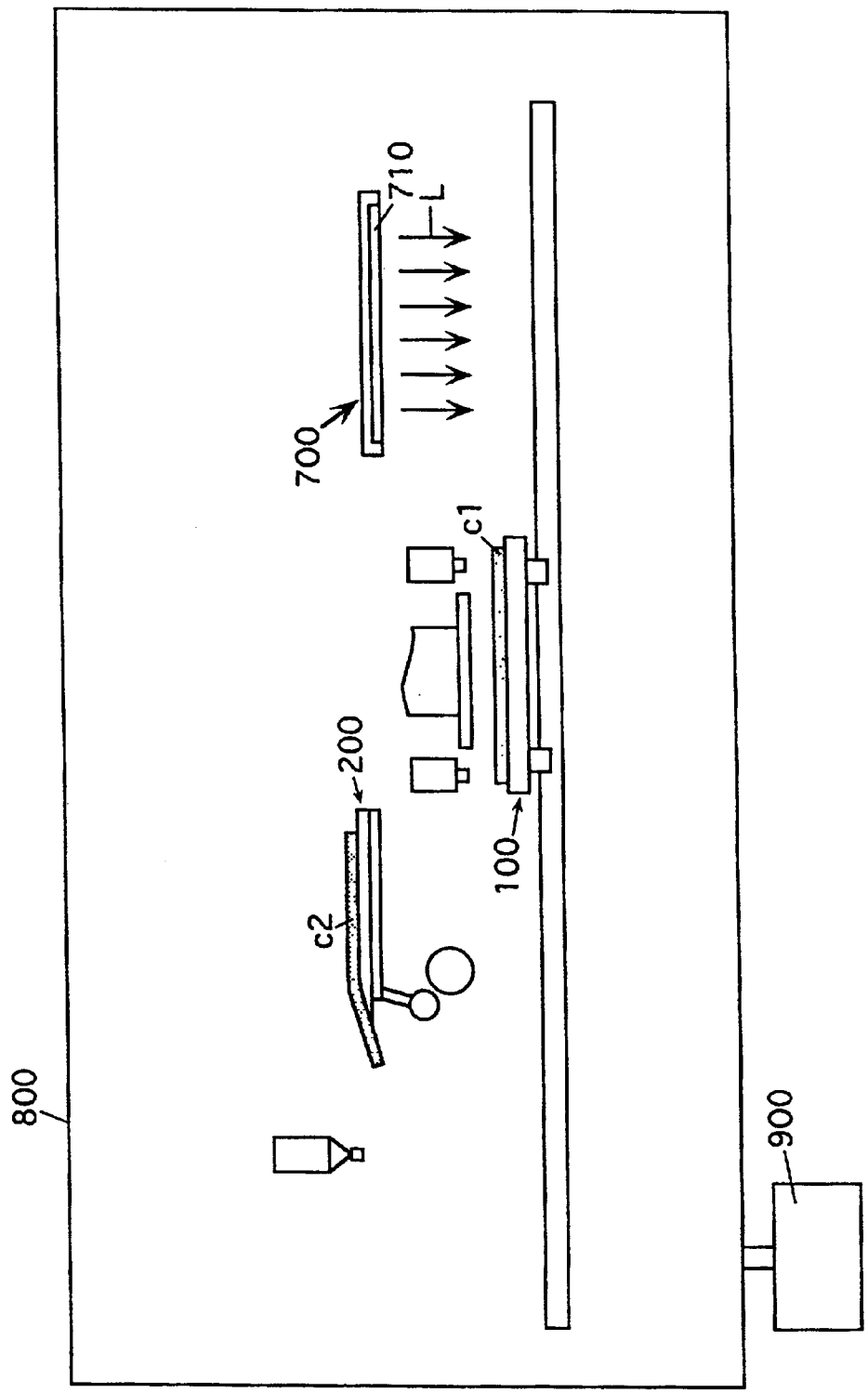
FIG. 29 schematically shows a structure of the apparatus for producing a display panel shown in FIG. 25 in which a vacuum chamber and an exhauster for exhausting the air and reducing the pressure are provided.

FIG. 29 schematically shows a modified structure of the apparatus for producing a display panel shown in FIG. 25 in which a vacuum chamber 800 and an exhausting device 900 for exhausting the air from and reducing the pressure in the chamber 800 are provided.

The vacuum chamber 800 is airtight and can enclose the first and second stages 100, 200. The above-mentioned exhausting devices 113, 213 and the like are disposed outside the vacuum chamber 800. The exhausting device 900 includes a rotary pump in this example. Thus the air pressure is reduced to sufficiently discharge the air in such chamber. The vacuum chamber 800 has an airtight door (not shown) for egress or ingress of a panel element.

When such vacuum chamber 800 is used, the air pressure in the vacuum chamber 800 is in the range of about 13 Pa to 40 Pa (about 0.1 Torr to about 0.3 Torr) in which the step (2) of supplying the adhesive material to the step (11) of permanently adhering the two panel elements are conducted.

[E] Method and Apparatus for Producing a Display Panel Relating to FIGS. 30 to 35

The method and apparatus for producing a display panel relating to FIGS. 30 to 35 are based on at least one of the following methods and apparatuses for producing a display panel.

(Method for Producing a Display Panel)

The method is to produce a display panel by layering panel elements for forming a display panel for display of images, and includes the steps of: supplying an adhesive material to at least one of surfaces to be adhered of first and second panel elements; relatively positioning the first and second panel elements and setting the surfaces to be adhered of the panel elements as opposed to each other; pressure-splicing (splicing under pressure) the positioned first and second panel elements with the adhesive material under a specified first condition (first pressure-splicing step); and pressure-splicing (splicing under pressure) the first and second panel elements after the first pressure-splicing step under a specified second condition which is different from the first condition (second pressure-splicing step).

A typical example of the method is as follows.

The method is to produce a display panel by layering panel elements for forming a display panel for display of images, and includes the steps of: causing a first stage to hold a first panel element; causing a second stage to hold a second panel element; bringing the first and second panel elements held by the first and second stages to a position wherein surfaces to be adhered of the panel elements are opposed to each other; positioning the first and second panel elements relatively; supplying an adhesive material to at least one of the surfaces to be adhered of the first and second panel elements; pressure-splicing (splicing under pressure) the first and second panel elements as positioned and held by the first and second stages and as interposed therebetween via the adhesive material under a specified first condition (first pressure-splicing step); and pressure-splicing (splicing under pressure) the first and second panel elements as interposed between the first and second stages via the adhesive material after the first pressure-splicing step under a specified second condition which is different from the first condition (second pressure-splicing step).

In any of theses methods, the step of supplying an adhesive material onto at least one of the surfaces to be adhered of the first and second panel elements may include the step of removing a protective releasable sheet from pressure sensitive adhesive double-coated tape or adhesive sheet (or tape) adhered in advance to the surface of the panel element to expose an adhesive surface and the step of applying an adhesive material to the panel element surface by hands or by an applicator for applying the adhesive material. The adhesive material may be applied or supplied by any optional methods which are not problematic.

The step of applying or supplying the adhesive material is carried out prior to the first pressure-splicing step, and may be done at any stage insofar as it is conducted prior to the first pressure-splicing step.

The first pressure-splicing step is carried out after supplying the adhesive material, positioning the two panel elements relatively and bringing the surfaces to be adhered of the two panel elements to an opposed position.

In any of the foregoing producing methods, the first and second panel elements can be relatively positioned by various methods, for example, by per se known methods of positioning a substrate or a panel.

Examples of positioning methods are as follows.

(1) Register mark(s) are formed on respective panel elements. After one of the first and second panel elements is fixed to a specified position, the other panel element is set on the former panel element, and the register marks of the two panel elements are visually inspected or observed through a camera so that the other panel element is manually moved to achieve matching of register marks.

When this positioning method is employed in a manner to set the respective panel elements on the first and second stages, e.g. one of the panel elements is set on the corresponding stage and the other panel element is overlaid on the former panel element. Then the register marks of the two panel elements are visually inspected or observed through a camera so that the other panel element is moved manually to match the register marks of the two panel elements. Thereafter the other panel element can be set on the other stage.

(2) Register mark(s) are formed on respective panel elements. After one of the first and second panel elements is fixed to a specified position, the other panel element is set on or above the former panel element, and the register marks of the two panel elements are observed through a camera so that the other panel element is moved by a X-Y-θ drive device to match the register marks of the two panel elements.

When this positioning method is employed in a manner to set the respective panel elements on the first and second stages, e.g. one of the panel elements is set on the corresponding stage and the other panel element is overlaid on the former panel element. Then the register marks of the two panel elements are observed through a camera while moving the other panel element by the X-Y-θ drive device to match the register marks of the two panel elements.

The stage for holding the other panel element may include a X-Y-θ drive device. In this case, the device may be operated to position the other panel element after the other panel element is set on the stage. When the stage for holding the other panel element does not include a X-Y-θ drive device, the other panel element thus positioned beforehand is set to the corresponding stage after once overlaying the other panel element on the former panel element.

The register marks include, for example, liquid crystal marks, electroluminescence marks and the like which emit light rays on application of electric power thereto.

The alignment with use of X-Y-θ drive device may be conducted by manually operating the X-Y-θ drive device. Optionally the operation of X-Y-θ drive device may be controlled so as to position the panel elements according to the mark data (e.g. information on the position) obtained by inspection with a camera. In the latter case, an image processing method for alignment of substrates, panels and the like can be employed.

In any of the above-mentioned methods for producing a display panel, the first pressure-splicing operation is conducted to adhere the first and second panel elements via the adhesive material under the specified first condition.

Then, the second pressure-splicing operation is conducted to adhere the first and second panel elements via the adhesive material under the specified second condition, giving a layered display panel elements.

When adhered as held by the first and second stages, the first and second panel elements are pressure-spliced as interposed between the stages.

When three or more panel elements are adhered, the panel elements adhered by the second pressure-splicing step may be regarded as the first panel element and a panel element to be adhered next may be regarded as the second panel element. In this way, new panel elements may be adhered, one by one, to the previously adhered panel elements substantially by repeating the foregoing respective steps.

The first condition in the first pressure-splicing step and the second condition in the second pressure-splicing step are at least one of the pressure or pressing force to be applied or to be exerted in pressure-splicing the two panel elements, rate of adhering the two panel elements, pressure of atmosphere surrounding the two panel elements, temperature around the two panel elements, temperature for heating the two panel elements, wavelength of light to be irradiated to the two panel elements and the like.

The first condition in the first pressure-splicing step differs from the second condition in the second pressure-splicing step as a whole.

The first condition and the second condition are determined according to the type of the adhesive material to be used, the desired state of adhered two panel elements (e.g., absence of air between adjacent panel elements), etc.

Typical examples of conditions which seriously affect the desired state of adhered two panel elements are as follows. The first condition in the first pressure-splicing step includes the pressure or pressing force to be applied in the pressure-splicing step. For example, using the specified first pressure, the first pressure-splicing step is conducted, and a pressure to be applied in pressure-splicing operation is included as the second condition for the second pressure-splicing step. In this case, a greater second pressure or pressing force (typically a constant second pressure) than the first pressure or pressing force may be employed in conducting the second pressure-splicing step.

By employing such first pressure and such second pressure higher than the former, the two panel elements can be adhered as kept from displacement and as finally precisely positioned.

The first pressure or force to be applied in the first pressure-splicing step may be, e.g. a minimum pressure or force or a little higher pressure than that, which is required to superimpose the two panel elements partially (a limited area such as a dot, a line or the like) or entirely or substantially entirely. The second pressure or force to be applied in the second pressure-splicing step may be, e.g. a higher specific pressure or force which is required to permanently adhere the two panel elements finally entirely. In this case, finally the two panel elements can be firmly adhered.

The first pressure or force may be gradually increased. The condition of second pressure or force may include a specific period of time involved in application of the pressure or force.

The first and second conditions may also include the following. A specific level of pressure of atmosphere surrounding the two panel elements is included as the first condition in the first pressure-splicing step. Namely, The first pressure-splicing step may be conducted under a specific surrounding air pressure. Likewise, the second pressure-splicing step may be conducted under a specific surrounding air pressure which is the second condition.

In this case, at least one of the first air pressure and second air pressure surrounding the two panel elements is at least in the range of about 13 Pa to about 40 Pa (about 0.1 Torr to 0.3 Torr).

The air can be easily discharged from between the two panel elements by employing at least one of the first and second pressures of air surrounding the two panel elements which is lower than the atmospheric pressure, whereby the two panel elements can be more intimately contacted with each other. This prevents the creation of wrinkles, which are caused by the presence of air.

If in the first pressure-splicing step, the two panel elements are contacted with each other all or almost all over the entire region, this step may be conducted under a first air pressure lower than the atmospheric pressure and the second pressure-splicing step may be performed under the atmospheric pressure. Of course the second air pressure may be lower than the atmospheric pressure. In this case, the second air pressure may be equal to the first air pressure.

If in the first pressure-splicing step, the two panel elements are contacted with each other only in a limited area, this step may be conducted under the atmospheric pressure and the second pressure-splicing step may be performed under a second air pressure lower than the atmospheric pressure. Of course the first pressure-splicing step may be performed under a first pressure lower than the atmospheric pressure. In this case, the second air pressure may be equal to the first air pressure.

With regard to such first and second air pressures, description is given to the following. When the two panel elements are adhered together as held by the first and second stages, the first and second panel elements may be surrounded with an elastically deformable ring member in at least one of the first and second pressure-splicing steps, so that an airtight chamber may be formed so as to surround the two panel elements with the ring member interposed between the first and second stages in which case the reduced atmospheric pressure may be given by exhausting the air from the airtight chamber.

To adhere the two panel elements with the air being discharged from between the two panel elements, the two panel elements may be contacted with each other initially partially (e.g., like a dot or a line) in the first pressure-splicing step, extending the contacted area from the initial limited contacted area to a broader area.

Referring to more specific examples, the first and second panel elements may be pressure-spliced in the first pressure-splicing step, initially in the center thereof, broadening the pressure-spliced area (e.g. toward the surrounding area or the ends thereof) from the initial area. Optionally the two panel elements may be contacted with each other initially in any of their ends, developing the contacted area (e.g., toward the ends on the other side) into pressure-spliced area, which is extended.

When the two panel elements are pressure-spliced in this way in the first pressure-splicing step, the two panel elements are pressure-spliced all over the entire region in the second pressure-splicing step.

When the two panel elements are adhered as held by the first and second stages in a manner to discharge the air, at least one of the first and second stages may have an elastic pad having a panel element-holding surface, and the panel element-holding surface is a convex face having a specified curvature. The first and second panel elements are initially partially pressure-spliced as pressed by the convex curved surface of elastic pad in the first pressure-splicing step when moving the first and second stages closer to each other, broadening the pressure-spliced area from the initial small region to an extended region in a state as pressed by the pad elastically deformed when bringing them into closer contact.

Stated more specifically, for example, when the elastic pad has an convex curved surface which is high in the center, e.g. having a spherical, semi-spherical, or truncated cylinder-like peripheral shape, the first and second panel elements are pressure-spliced in the first pressure-splicing step, initially coming into contact with each other at a point or a line or the like in the center thereof, broadening the contacted area, thus the pressure-spliced area (e.g. toward the surrounding area or the ends thereof).

Optionally the pad may have a convex curved surface which is high in one end and is gradually declined from the end toward the other end, and the two panel elements are pressure-spliced initially as contacted at a point or line, or the like at one end and broadening from the initial contacted area into the pressure-spliced area toward the other end.

Even when the two panel elements are pressure-spliced in this manner in the first pressure-splicing step, the two panel elements are pressure-spliced in the second pressure-splicing step all over the entire region.

To adhere the first and second panel elements without damage to the two panel elements and keeping the two panel elements from displacement and from problems arising in permanently adhering and discharging the air from between the two panel elements, it is recommendable to use the elastic pad formed of an elastic body having an elastic coefficient of 60 kgf/cm$^2$ to 200 kgf/cm$^2$. The convex curved surface may be a smoothly curved face having a spherical, truncated cylinder-like peripheral shape or curved surface which is high in one end and is gradually declined from the end toward the other end. In this case, the convex curved surface has preferably a radius of curvature in the range of about 2000 mm to about 5000 mm.

In any case, when the first the pressure-splicing step is conducted gradually extending the pressure-sliced area in this way, the first and second air pressures surrounding the panel elements need not always be lower than the atmospheric pressure. However, at least one of the first and second air pressures may be lower than the atmospheric pressure according to the type of the adhesive material to be used, the desired state of adhered two panel elements, etc.

At the stage of first pressure-splicing step, the two panel elements need not always be pressure-spliced all over the entire region, as stated above.

In any case, when the first and second panel elements are set on the first and second stages, the first and second panel elements can be held by the first and second stages, typically by means for causing the stages to hold them by sucking and holding the panel element by air through perforations formed in the stage, although not limited thereto. Such perforations are formed at least in the elastic pad which the stage has the elastic pad.

Such elastic pad may have fine perforations for holding the panel element as pressed against the convex curved surface of the pad by vacuum suction. The fine perforations can be closed in the pressure-splicing step due to deformation of the elastic pad. The elastic pad can release a portion, pressure-spliced to another panel element, of the panel element held by the pad when the two panel elements are pressure-spliced in the pressure-splicing step, whereby the two panel elements can be more smoothly adhered together.

In any case, the two panel elements can be temporarily adhered with the adhesive material in the first pressure-splicing step and can be permanently adhered with the adhesive material firmly in the second pressure-splicing step.

In this case, the two panel elements relatively positioned are pressure-spliced to achieve temporarily adhering operation with the adhesive material in the first pressure-splicing step and are pressure-spliced to achieve permanently adhering operation with the adhesive material in the second pressure-splicing step.

The second condition in the second pressure-splicing step may include irradiation of the adhesive material with light for curing the same if it is curable and also may include heating the adhesive material to the specified temperature if it is heat-curable.

(Apparatus for Producing a Display Panel)

The apparatus for producing a display panel comprises: a first stage for holding a panel element; a second stage for holding another panel element; and a stage-driving device for driving the first and second stages to move the first and second stages closer to or away from each other with panel element-holding surfaces of the stages as opposed to each other, wherein at least one of the first and second stages has an elastic pad having a panel element-holding surface, and the panel element-holding surface is a convex face having a specified curvature and wherein the first and second panel elements held by the first and second stages are pressure-spliced under a first pressure and are pressure-spliced under a second pressure which is higher than the first pressure, in moving the first and second stages closer to each other by the stage-driving device.

The first and second stages have a device for holding the panel element. Examples of the holding device include perforations formed in the stage and connected to an exhausting device for sucking and holding the panel element. Such perforations are formed at least in the elastic pad in the stage when the stage has such elastic pad.

Such elastic pad may have fine perforations for holding the panel element on the convex curved surface by vacuum suction. The fine perforations can be closed in the pressure-splicing step due to elastic deformation of the elastic pad under the splicing pressure. The elastic pad is can release a portion, pressure-spliced to another panel element, of the panel element held by the pad, when the two panel elements are pressure-spliced in the pressure-splicing step, whereby the two panel elements can be more smoothly adhered together.

According to the above-mentioned apparatus for producing a display panel, one of the panel elements to be adhered is held by the first stage and the other is held by the second stage.

Thereafter the first and second stages are relatively moved closer to each other by the stage-driving device with their panel element-holding surfaces as opposed. In other words, the surfaces to be adhered of the panel elements held by the stage are in opposed positions, and are relatively moved closer to each other, whereby the two panel elements are adhered as interposed by the stages.

The two panel elements are adhered with an adhesive material. The adhesive material is supplied to at least one of the surfaces to be adhered of the two panel elements in the same manner as described concerning the method for producing a display panel before the adhering operation.

The producing apparatus may have an applicator for applying the adhesive material.

The two panel elements are relatively positioned before adhering the two panel elements. The positioning operation is conducted in the same manner as described concerning the above-mentioned method for producing a display panel.

The producing apparatus may be provided with a device for relatively positioning the two panel elements, such as a device for relatively positioning the two panel elements on the first or second stages. For example, the following devices can be used.

(1) A positioning device including a camera for observing register marks formed on the two panel elements and a X-Y-θ drive device for moving a panel element on or above the other panel element held by any one of the first and second stages to position them by matching the register marks of the two panel elements.

(2) A positioning device including a camera for observing the register marks formed on the two panel elements, a X-Y-θ drive device for moving a panel element on or above the other panel element held by any one of the first and second stages, and a controller for control of operation of the X-Y-θ drive device for moving the panel element on or above the other panel element held by any one of the first and second stages to position the elements by matching the register marks of the two panel elements based on the mark information (such as positional information) from a camera. Such controller may be, for example, one employing a positioning method by image processing for alignment of substrates, panels and the like.

The two panel elements are adhered as follows The two panel elements are initially partially (at a dot, a line or the like) contacted with each other using the convex curved surface of the elastic pad, developing the contacted area into the pressure-spliced area, and gradually extending the initial pressure-spliced area. In this way, keeping the two panel elements from displacement and from formation of wrinkles and discharging the air from between the two panel elements, the pressure-spliced area is extended and the two panel elements are temporarily adhered partially (e.g., in a limited area like a dot, line or the like) or substantially all or all over the entire region. This pressure-splicing operation is done under a first pressure when the first and second stages are moved closer to each other by the stage-driving device. The first pressure may be increased during the first pressure-splicing operation. Subsequently the two panel elements are pressure-spliced under a second pressure higher than the first pressure all over the entire region to permanently adhere them firmly. The second pressure may be applied for a specified period of time. Thus, a display panel can be produced.

If three or more panel elements are to be adhered, the adhered panel elements obtained by the finally adhering operation is taken as one of the paired panel elements to be adhered to each other.

The elastic pad provided in one of two stages may have an convex curved surface which is high in the center, e.g. having a spherical, semi-spherical, or truncated cylinder-like peripheral shape. If such pad is used, the first and second panel elements are pressure-spliced under a first pressure in the first pressure-splicing step, initially coming into contact with each other at a point, a line, or the like in the center thereof, broadening the contacted area, eventually the pressure-spliced area (e.g. toward the surrounding area or the ends thereof).

Optionally the pad may have a convex curved surface which is high in one end and is gradually declined from the end toward the other end. In this case, the two panel elements are pressure-spliced initially at one end thereof at an area in the shape of a line or the like, broadening the pressure-spliced area toward the other end.

The two panel elements are pressure-spliced under the second pressure all over the entire region due to the elastic deformation of the pad.

To adhere the first and second panel elements without damage to the two panel elements and keeping the two panel elements from displacement and from problems arising in permanently adhering and discharging the air from between the two panel elements, it is recommendable to use the elastic pad formed of an elastic body having an elastic coefficient of 60 kgf/cm² to 200 kgf/cm². The convex curved surface may be a smoothly curved face having a spherical, semi-spherical, or truncated cylinder-like peripheral shape, or curved surface which is high in one end and is gradually declined from the end toward the other end. In this case, the convex curved surface has preferably a radius of curvature in the range of about 2000 mm to about 5000 mm. At the stage of first pressure-splicing step, the two panel elements may be allowed to become pressure-spliced all over the entire region, but need not always be so done.

An exhausting device capable of discharging the air for reduction of pressure from between the two panel elements may be provided for assuring the exhaust of air from between the two panel elements in adhering the two panel elements.

A simplified mode of the exhausting device is a device including an elastically deformable ring member for forming an airtight chamber in which the air pressure is reduced by the discharge of air from the chamber, the ring member being adapted to surround the two panel elements together with the first and second stages as interposed between the stages coming closer to each other.

The above-mentioned [E] type method and apparatus can be applied to the production of display panels. Specific examples of methods and apparatus for producing a liquid crystal display panel are described below with reference to FIGS. 30 to 35.

Figure 30:
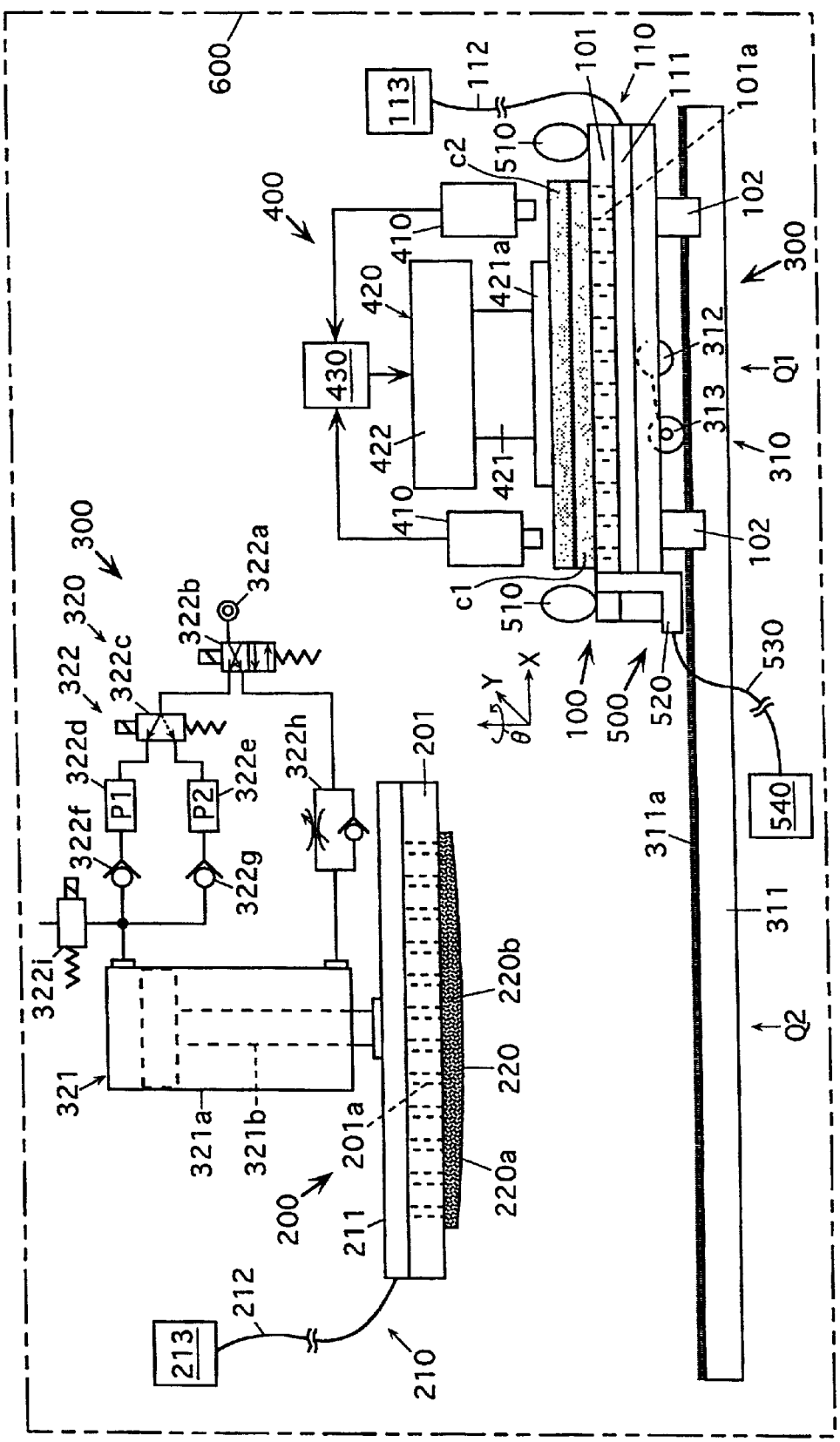
FIG. 30 schematically shows a structure of a further example of an apparatus for producing the liquid crystal display panel shown in FIG. 1.

FIG. 30 schematically shows a structure of an example of an apparatus for producing the liquid crystal display panel A shown in FIG. 1.

The foregoing apparatus for producing a display panel comprises: a first stage 100 for holding a panel element c1; a second stage 200 for holding another panel element c2; and a stage-driving device 300 for driving the first and second stages 100, 200 to move the first and second stages 100, 200 closer to or away from each other with the panel element-holding surfaces of the stages as opposed to each other.

In this producing apparatus, the second stage 200 has an elastic pad 220 having a panel element-holding surface 220a, and the panel element-holding surface 220a is a convex curved face having a specified curvature. As described later with reference to FIGS. 31 and 32, the stage-driving device 300 brings the first and second stages 100, 200 to a face-to-face position and moves them closer to each other to pressure-splice the first and second panel elements c1, c2 held by the first and second stages 100, 200, under a first pressure and then under a second pressure higher than the first pressure, giving a display panel comprising layered panel elements c1, c2.

The first and second stages 100, 200 include a first and second suction tables 101, 201, and panel element-holding devices 110, 210.

The first and second suction tables 101, 201 are made of a rigid material and have a plurality of perforations 101a, 201a for suction of panel elements, spaced away from each other at a specified distance in an area where the panel elements c1, c2 are held.

The panel element-holding devices 110, 210 have not only such perforations 101a 201a, but exhaust chambers 111, 211, flexible tubes 112, 212, and exhausting devices 113, 213. The exhausting devices 113, 213 are connected to one end of the tubes 112, 212, and exhaust chambers 111, 211 are connected to the other end of the tubes 112, 212. The exhaust chambers 111, 211 are communicated with the perforations 101a, 201a of the tables 101, 201. In this way, the air is sucked from the perforations 101a, 201a through the exhaust chambers 111, 211 and tubes 112, 212 by the operation of the exhausting devices 113, 213.

The second stage 200 has a elastic pad 220 having a panel element-holding surface 220a as mentioned above. The elastic pad 220 is provided on the other side than the side on which the exhaust chamber 211 of the second suction table 201 is provided.

The elastic pad 220 is formed of an open-cell elastic rubber foamed body, and has fine perforations 220b for keeping the panel element c2 at the convex curved surface 220a thereof by suction of air. The perforations 220b are closed due to elastic deformation of the elastic pad 220 when compressed. In this example, the elastic pad 220 is formed of an open-cell elastic rubber foamed body having a plurality of perforations. But the elastic pad 220 may be formed of an elastic rubber body in which perforations are formed.

The panel element-holding surface 220a is a convex curved face which is high in the center of the surface (convex cured face having a radius of curvature in the range of about 4000 mm to about 5000 mm) and can hold the panel element thereon. The convex curved surface, e.g., can assume a spherical, semi-spherical, or truncated cylinder-like peripheral shape, and a spherical shape in this example. By employing such convex curved surface, the first and second panel elements c1, c2 come into contact with each other initially in the center thereof under the first pressure in the pressure-splicing step, broadening the pressure-spliced area gradually toward the surrounding area.

The elastic pad 220 can release a portion, pressure-spliced to the panel element c1, of the panel element c2 held by the pad because the perforations of the pad are closed due to compression of the pad when the two panel elements c1, c2 are pressure-spliced in the pressure-splicing step, whereby the two panel elements c1, c2 are more smoothly adhered together.

To adhere the two panel elements c1, c2 without damage to the two panel elements and keeping the two panel elements c1, c2 from displacement and from problems arising in permanently adhering and discharging the air from between the two panel elements, it is recommendable to use the elastic pad formed of an elastic body having an elastic coefficient of 70 kgf/cm² to 120 kgf/cm².

The stage-driving member 300 is provided for driving the stages 100, 200 and includes a first stage-driving portion 310 and a second stage-driving portion 320. The first stage-driving portion 310 is such that although not limited thereto, a pinion gear 313 provided on the first stage 100 is engaged with a rack gear 311a arranged along a guide rail 311 and is reciprocatingly rotated by a motor 312 mounted on the first stage 100. The first stage 100 is moved along the guide rail 311 by the driving portion 310, and is disposed in a location Q1 for holding the panel element or a location Q2 where the panel elements are adhered. For this movement, a slider 102 provided on the first stage 100 slides along the guide rail 311.

The driving portion 320 includes a piston cylinder device 321 and a pneumatic circuit 322 for driving the same although not limited thereto. The piston cylinder device 321 is of double acting type and a cylinder member 321a is disposed in a specified place while a piston rod 321b is connected to the second stage 200. The pneumatic circuit 322 includes a compressed air source 322a, a 4-port, 2-position spring offset type electromagnetic valve 322b, 3-port, 2-position spring offset type electromagnetic valve 322c, pressure regulating valves 322d, 322e, check valves 322f, 322g, a speed controller 322h comprising a parallel circuit for the check valve and a restricting valve, and an open-close electromagnetic valve 322i.

The pressure regulating valve 322d supplies compressed air of pressure P1, while the pressure regulating valve 322e supplies compressed air of pressure P2 (>P1), respectively to the piston cylinder device 321.

In the illustrated state, the solenoids for all of electromagnetic valves are in off-state while the piston rod 321b is retracted to the interior of a cylinder member 321a and the stage 200 is in an ascended position.

When the solenoid for the 4-port electromagnetic valve 322b is turned on and the valve 322i is turned on (closed), the compressed air supplied from the compressed air source 322a flows through the 4-port valve 322b, 3-port valve 322c, pressure regulating valve 322d toward the cylinder head side of the piston cylinder device 321, so that the piston rod 321b is projected under the pressure P1 at the speed controlled by the speed controller 322h, whereby the second stage 200 is descended.

At this stage, when the solenoid for the 3-port valve 322c is turned on, the compressed air is supplied through the pressure regulating valve 322e while the piston rod 321b and the second stage 200 are moved downward under the pressure P2 (>P1).

If the solenoids for all of electromagnetic valves are turned off from this state, the valve 322i is open and the rod 321b and the second stage 200 are ascended for return to the illustrated state.

The producing apparatus of FIG. 30 is provided with a positioning device 400 for positioning two panel elements c1, c2 relatively before adhering the panel elements c1, c2.

The positioning device 400 is substantially the same as the positioning device shown in FIGS. 18 and 21. Thus the description is omitted in this regard. Like parts having like structure and like function are given like reference numerals or so.

As shown in FIG. 7, the two panel elements c1, c2 have register marks m1, m2 formed for positioning purposes outside the display region.

The two panel elements c1, c2 are relatively positioned by the device 400.

The foregoing producing apparatus has an exhausting device 500 capable of discharging the air from between the first and second stages 100, 200 for reduction of pressure to assure the discharge of air from between the first and second panel elements in adhering the two panel elements.

The exhausting device 500 is substantially the same as the exhausting device shown in FIGS. 18 and 21. Like parts having like structure and like function are given like reference numerals or so.

The foregoing producing apparatus is also provided with the airtight chamber 600 as shown in 2-dot chain line in FIG. 30. The chamber 600 may surround the first and second stages 100, 200 and the like, but the apparatus in this example is not provided with the chamber 600. The chamber 600 is described later.

Figure 32:
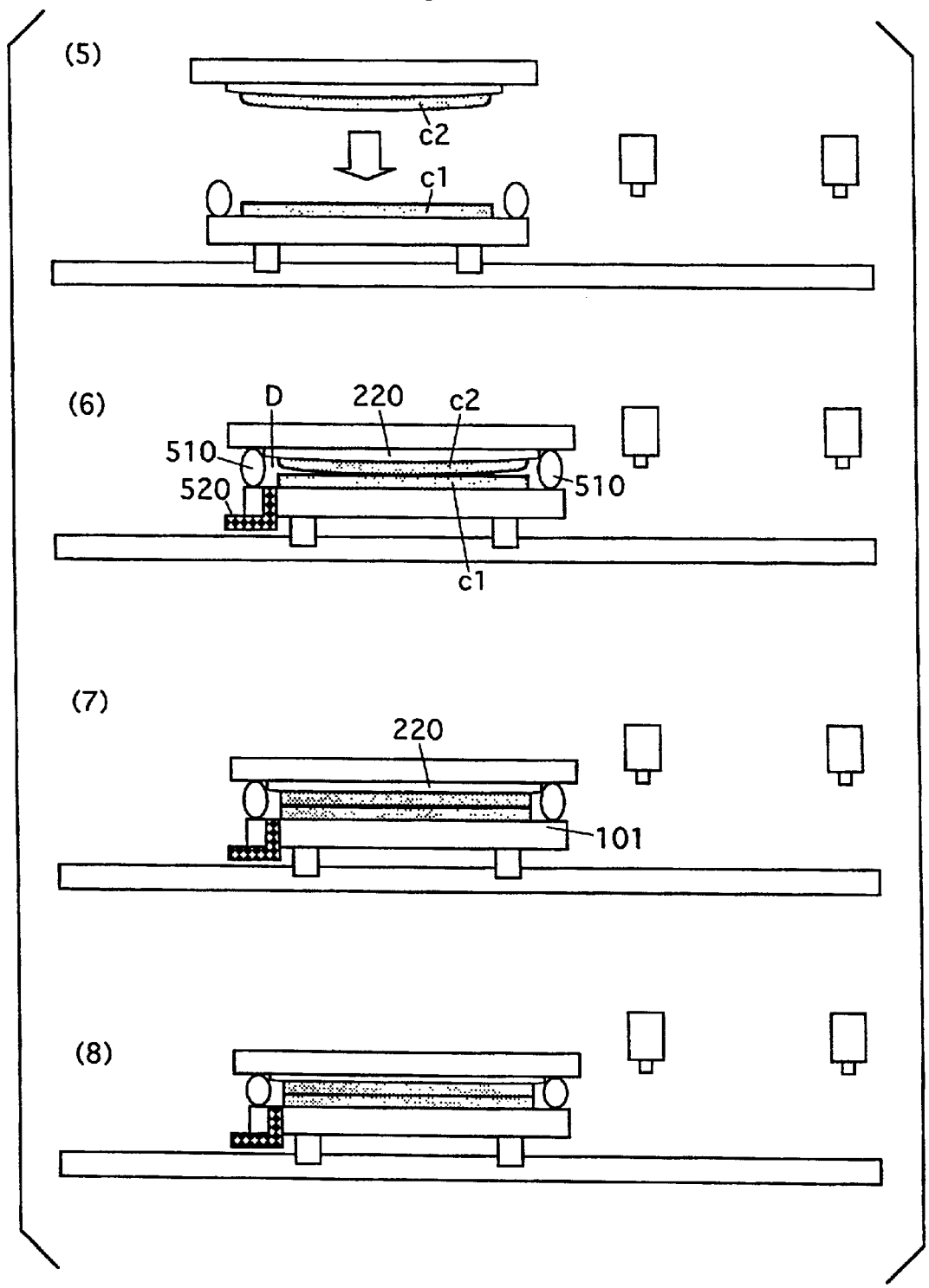
FIG. 32 is a view for describing the steps (5) to (8) subsequent to the steps shown in FIG. 31.

An example of production of the liquid crystal display panel of reflection type shown in FIG. 1 by said apparatus is described with reference to FIGS. 31 and 32.

FIG. 31 is a view for describing the steps (1) to (4) in an example of steps for producing a liquid crystal display panel by the apparatus shown in FIG. 30. FIG. 32 is a view for describing the steps (5) to (8) subsequent to the steps shown in FIG. 31. FIGS. 31 and 32 omit the indication of some parts for simplification.

First, each of R, G, B panel elements for red, green and blue displays is produced in advance in the production of reflection type liquid crystal display panel A shown in FIG. 1 (one element for each kind).

Any one of R, G, B panels (R panel element in this example) is taken as a first panel element (hereinafter referred to as "first panel element") c1 and a panel element (G panel element in this example) to be adhered to the element c1 is taken as another panel element (hereinafter referred to as "second panel element") c2. These two panel elements are adhered to each other in the steps (1) to (4) shown in FIG. 31 and the steps (5) to (8) shown in FIG. 32.

(1) Pressure sensitive adhesive double-coated tape NN (or adhesive sheet) covered, at one side, with a protective releasable sheet NN1 is adhered to at least one of the opposed surfaces to be adhered of the first and second panel elements c1, c2, i.e. to a side other than the side having the light absorbing layer BK of the first panel element c1 in this example (R panel element in this example). In this example, the adhesive double-coated tape is used although not limited thereto. In any case, an adhesive material may be applied or supplied to the panel element surface by hands or by an applicator for applying the adhesive material. The adhesive material may be applied or supplied by optional methods which are not problematic. The step of applying or supplying the adhesive material is carried out prior to first pressure-splicing step at any stage, which is not problematic.

The first panel element c1 having the light absorbing layer BK facing down and the adhesive double-coated tape on the other side is set onto the first stage 100, and is sucked to and held by suction table 101 of the stage 100 by a panel element-holding device 110.

(2) The second panel element c2 (G panel element) is set on the first panel element c1 to relatively position the first and second panel elements c1, c2.

This positioning operation is conducted as follows. The panel element c2 disposed on the panel element c1 is once held by the lower end of the positioning device 400. In this state, while the register marks m1, m2 formed on the two panel elements c1, c2 are observed by CCD cameras 410, the second panel element c2 is moved by the X-Y-θ drive device 420 to match the register marks m1, m2 of the two panel elements c1, c2. This positioning operation is carried out by automatic control of the X-Y-θ drive device 420 based on the positional information obtained by image processing of information detected by the cameras 410. The panel element c2 is set again on the panel element c1 after positioning operation.

The alignment with use of the X-Y-θ drive device 420 may be conducted by manually operating the X-Y-θ drive device 420. Optionally the second stage 200 for holding the second panel element c2 may include the X-Y-θ drive device 420. At that time, the second panel element c2 may be driven by the X-Y-θ drive device to position the second panel element c2 after setting the panel element c2 to the stage 200. The register marks m1, m2 of the two panel elements c1, c2 may be matched by manually moving the second panel c2 without use of the X-Y-θ drive device 420 while visually inspecting and observing the marks m1, m2 of the two panel elements c1, c2, if necessary, using the cameras 410.

(3) After positioning the first and second panel elements c1, c2, the panel element c2 is disengaged from the panel element-holding arm 421 of the X-Y-θ drive device 420 and is overlaid on the panel element c1, and the first stage 100 is moved to a location below the second stage 200 (location Q2 in FIG. 30) by the first stage-driving portion 310 of the stage-driving device 300 so that the panel element-holding surfaces of the first and second stages are opposed.

The second stage 200 is descended by the second stage-driving portion 320 of the stage-driving device 300. When the elastic pad 220 of the stage 200 comes into contact with the second panel element c2, the second panel element c2 is sucked and held at the convex curved surface 220a by vacuum suction of air with the panel element-holding device 210. Thereafter the second stage 200 holding the second panel element 2 is ascended by the second stage driving portion 320 for standby.

(4) The protective releasable sheet NN1 is removed from the adhesive double-coated tape NN adhered to the first panel element c1 on the first stage to expose the adhesive material N.

(5) The second stage 200 is descended by the second stage-driving portion 320 of the stage-driving device 300, and the first and second stages are relatively moved closer to each other with their panel element holding surfaces opposed, or with the surfaces to be adhered of the panel elements c1, c2 held by the stages 100 and 200 in opposed positions.

(6) The first and second panel elements c1, c2 start contact under a specified pressure P1 by the second stage-driving portion 320 of the stage-driving device 300 initially partially (in the center thereof in this example) using the convex curved surface 220a of the elastic pad 220. At that time, the stage 200 is contacted with the ring member 510 made of rubber to form an airtight chamber D for discharge of air by reduction of pressure. The vacuum pump 540 starts operation immediately before the formation of the chamber D to evacuate the air from the chamber D by the pump 540, whereby the air pressure in the chamber D is adjusted to a specified level (20 Pa to 30 Pa) lower than the atmospheric pressure.

After start of operation in the step (6), the second stage 200 is further descended. The pressure-spliced area is extended from the initial contacted area with the two panel elements as pressed by slightly elastically deforming the pad 200 having the convex curved surface while the air is discharged from between the two panel elements. In this way, the pressure-spliced area is broadened keeping the two panel elements from displacement and from formation of wrinkles and discharging the air from between the two panel elements, whereby the two panel elements are fixed and temporarily adhered partially or all or substantially all over the entire region. The two panel elements may be allowed to become pressure-spliced all over the entire region at this stage, but need not always be so done.

(7) and (8) While retaining the air pressure in the chamber D at a low level after the step (6), the second stage 200 is further pressed against the first stage 100 due to second pressure P2 (>P1) by the second stage-driving portion 320 of the stage- driving device 300. Thus, the first and second panel elements are pressure-spliced under the second pressure of specific level higher than the first pressure all over the entire region while being interposed between the first and second stages to conduct the permanently adhering operation. The second pressure is applied for a specified period of time. Under the second pressure, the first and second panel elements are pressure-spliced all over the entire region while being pressed by the elastically deformed convex curved surface 220a of the pad 220. In this way, the R and G panel elements are firmly adhered.

After adhering the two panel elements, the vacuum suction involving the operations of the vacuum pump 540 and the panel element-holding device 210 is stopped so that the second stage 200 is ascended for return to the initial location, and the first stage 100 holding the adhered panel elements is returned to the initial location Q1.

By employing such first pressure and the second pressure higher than the former, the two panel elements can be adhered as kept from displacement and as precisely and firmly positioned.

The panel elements thus obtained by adhering the R and G panel elements is taken as a first panel element c1 and the B panel element to be adhered next is taken as a second panel element c2. The B panel element is adhered to the adhered panel elements by substantially repeating the foregoing steps (1) to (8).

When the first stage 100 holding the adhered panel elements is returned to the location Q1, the step (1) may be considered to have been partially carried out. In this way, a display panel A comprising layered R, G, B panel elements is produced.

Figure 33:
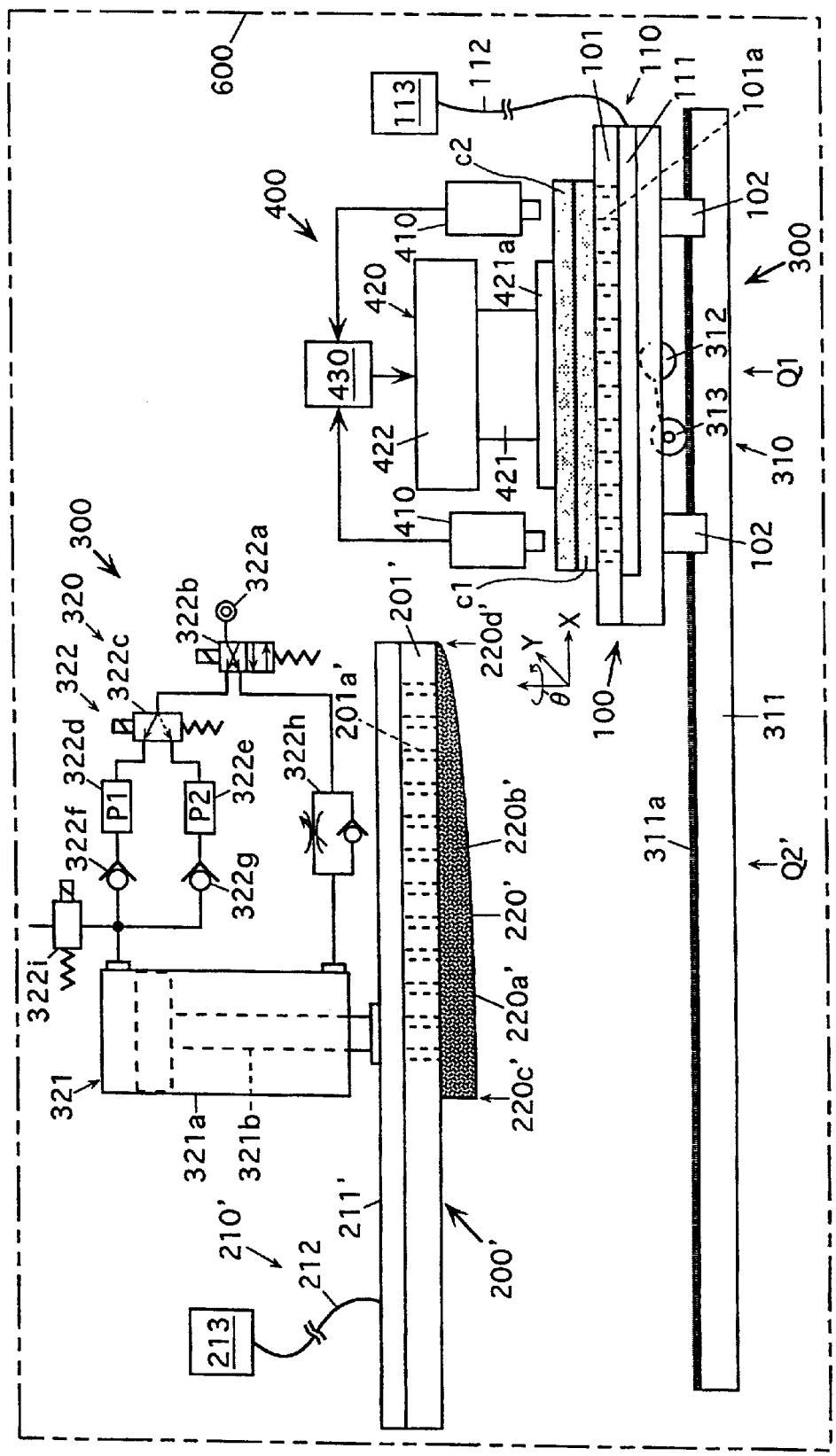
FIG. 33 shows a still further example of an apparatus for producing the liquid crystal display panel shown in FIG. 1.

FIG. 33 shows a still further example of the apparatus for producing the liquid crystal display panel A shown in FIG. 1.

The producing apparatus shown in FIG. 33 is identical with the apparatus of FIG. 30 except that the exhausting device 500 is removed from the first stage 100 and a second stage 200' is disposed instead of the second stage 200. In other respects, it is similar to that of FIG. 30. Like parts having like structure and like function are given like reference numerals.

Description is given below to the producing apparatus shown in FIG. 33 mainly about differences from the apparatus of FIG. 30.

The apparatus of FIG. 33 for producing a display panel comprises: a first stage 100 for holding a first panel element c1; a second stage 200' for holding a second panel element c2; and a stage-driving device 300 for relatively moving the first stage 100 and the second stage 200' in a manner to bring to an opposed position the panel element-holding surfaces thereof.

In the above-mentioned apparatus, the second stage 200' has an elastic pad 220' having a panel element-holding surface 220a'. The panel element-holding surface 220a' is a convex curved face of specified curvature. As stated later with reference to FIGS. 34 and 35, the stage-driving device 300 brings the first and second stages 100, 200' to an opposed position and relatively moves them closer to or away from each other, whereby the first and second panel elements c1, c2 held by the first and second stages 100, 200' are pressure-spliced under a first pressure and are pressure-spliced under a specific second pressure higher than the first pressure, thereby producing a display panel element comprising layered panel elements c1, c2.

The second stage 200' includes a second suction table 201' and a panel element-holding device 210'.

The second suction table 201' is formed of a rigid material and includes a plurality of perforations 201a' for suction of panel element formed as spaced away from each other in a region wherein the panel element c2 is held.

The panel element-holding device 210' includes not only such perforations 201a' but also an exhaust chamber 211', a flexible tube 212 and an exhausting device 213. The exhausting device 213 is connected to one end of the tube 212 and the exhaust chamber 211' is connected to the other end of the tube 212. The exhaust chamber 211' is communicated with perforations 201a' of the suction table 201'. Thus, the air is sucked from the perforations 201a' via the exhaust chamber 211' and the tube 212 by the operation of the exhausting device 213.

The second stage 200' is provided, as mentioned above, with the elastic pad 220' having the panel element-holding surface 220a'. The elastic pad 220' is disposed on the other side than the side where the exhaust chamber 211' of the second suction table 201' is provided.

The elastic pad 220' is formed of an open-cell elastic rubber foamed body which is the same material as used for the elastic pad 220 in the apparatus of FIG. 30 and has perforations 220b' for keeping the panel element c2 at the convex curved surface 220a' by suction of air. The perforations 220b' are closed due to elastic deformation of the elastic pad 220' when compressed.

The panel element-holding surface 220a' is a convex curved surface which is high in one end 220c' and is gradually declined from the end toward the other end 220d'. The curved surface has a specified curvature (curved surface with a radius of curvature in the range of about 4000 mm to about 5000 mm in this example). The second panel element c2 can be retained along the curved surface. By employing such convex curved surface, the first and second panel elements c1, c2 come into contact with each other initially at one end thereof under the first pressure in the pressure-splicing step, broadening the pressure-spliced area gradually toward the other end.

The elastic pad 220' can release a portion, spliced to the panel element c1, of the panel element c2 due to compressed-deformation of the pad when the two panel elements c1, c2 are pressure-spliced in the pressure-splicing step, whereby the two panel elements c1, c2 are more smoothly adhered together.

To adhere the two panel elements c1, c2 without damage to the two panel elements and keeping the two panel elements from displacement and from formation of wrinkles, discharging the air from between the two panel elements and free from any problem on the pressure-splicing operation for permanently adhering them, it is recommendable that the elastic pad is formed of an elastic body having an elastic coefficient of 70 kgf/cm$^2$ to 120 kgf/cm$^2$.

The producing apparatus includes an airtight chamber 600 and an exhausting device for discharge of air for reduction of air pressure (not shown). The chamber 600 encloses the first and second stages 100, 200' and other means. FIG. 6 shows the provision of exhausting devices 113, 213 and pneumatic circuit 322 in the chamber 600, but actually any means and devices are provided outside the chamber 600 if their provision therein is improper.

An example of the production of a liquid crystal display panel using such apparatus is described below with reference to FIGS. 34 and 35.

Figure 34:
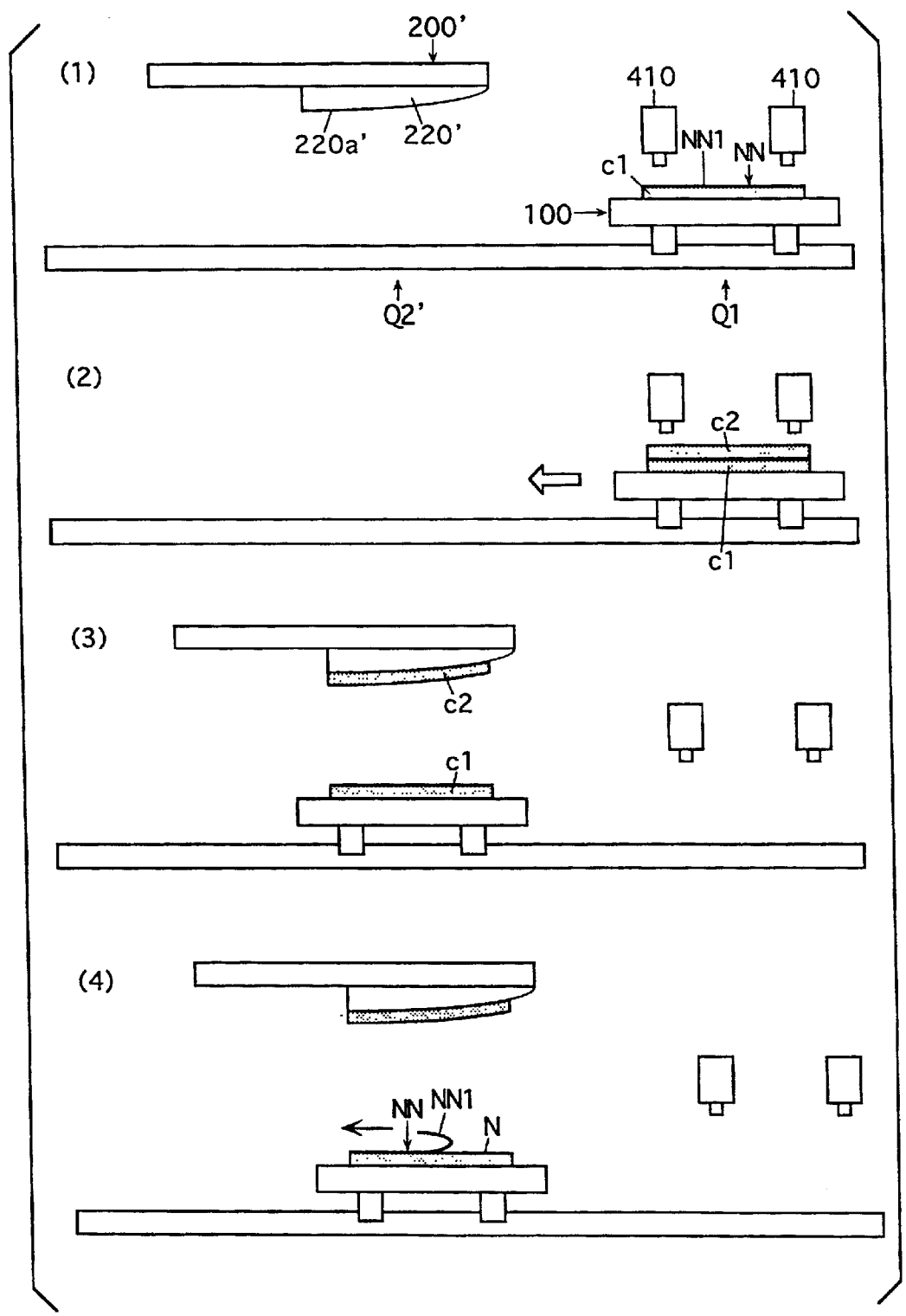
FIG. 34 is a view for describing the steps (1) to (4) in an example of steps for producing a liquid crystal display panel by the apparatus for producing the liquid crystal display panel shown in FIG. 33.
Figure 35:
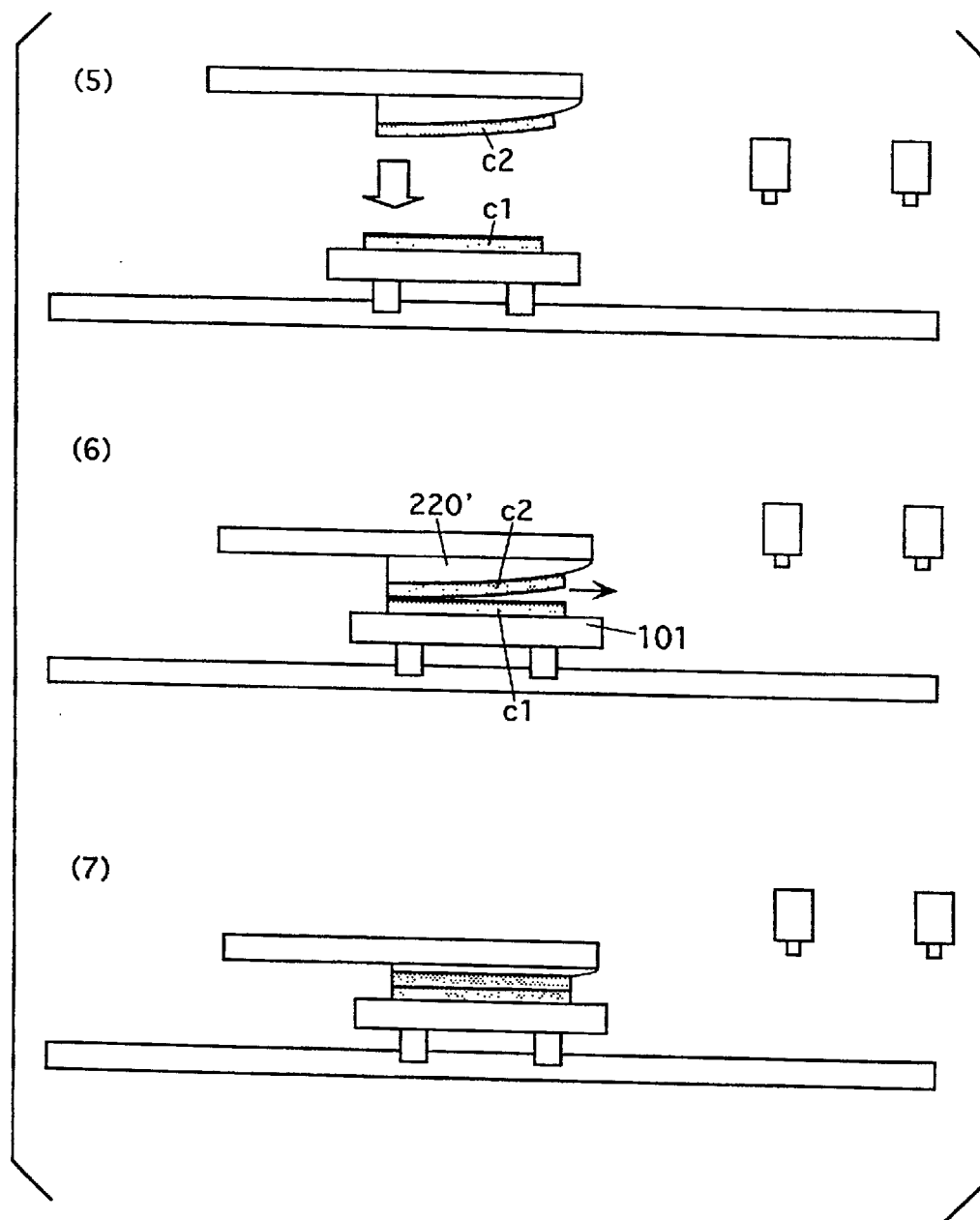
FIG. 35 is a view for describing the steps (5) to (7) subsequent to the steps shown in FIG. 34.

FIG. 34 is a view for describing the steps (1) to (4) in an example of steps for producing a liquid crystal display panel by the apparatus for producing a liquid crystal display panel shown in FIG. 33. FIG. 35 is a view for describing the steps (5) to (7) subsequent to the steps shown in FIG. 34. FIGS. 34 and 35 omit the indication of some parts for simplification.

Any one of R, G, B panels (R panel element in this example) is taken as a panel element (hereinafter referred to as "first panel element") c1 and a panel element (G panel element) to be adhered to the element c1 is taken as another panel element (hereinafter referred to as "second panel element") c2. These two panel elements are adhered to each other in the steps (1) to (4) shown in FIG. 34 and the steps (5) to (7) shown in FIG. 35.

(1) Pressure sensitive adhesive double-coated tape NN (or adhesive sheet) covered on one side with a protective releasable sheet NN1 is adhered to at least one of surfaces to be adhered of the first and second panel elements c1, c2, i.e. to a side other than the side having the light absorbing layer BK of the first panel element c1 (R panel element in this example). The first panel element c1 having the light absorbing layer BK facing down and the adhesive double-coated tape on the other side is set onto the first stage 100, and is sucked to and held by the suction table 101 of the stage 100 by the panel element-holding device 110.

(2) The second panel element c2 (G panel element) is set on the first panel element c1 to relatively position the first and second panel elements c1, c2. The positioning operation is conducted in the same manner as done in the step (2) of FIG. 31 by the apparatus of FIG. 30. Thus, the description is omitted in this regard.

(3) After positioning the first and second panel elements c1, c2, the panel element c2 is disengaged from the panel element-holding arm 421 of the X-Y-θ drive device 420 and is overlaid on the panel element c1, and the first stage 100 is moved to a location below the second stage 200' (location Q2' in FIG. 33) by the first stage-driving portion 310 of the stage-driving device 300 so that the panel element-holding surfaces of the first and second stages (accordingly, the two panel elements c1, c2) are opposed.

The second stage 200' is descended by the second stage-driving portion 320 of the stage-driving device 300. When the elastic pad 220' of the stage 200' comes into contact with the second panel element c2, the second panel element c2 is sucked and held at the convex curved surface 220a' of the pad 220' by vacuum suction of air with the panel element-holding device 210'. The second stage 200' holding the second panel element c2 is ascended by the second stage driving portion 320 for standby.

(4) The protective releasable sheet NN1 is removed from the adhesive double-coated tape NN adhered to the first panel element c1 on the first stage to expose the adhesive material N.

(5) The second stage 200' is descended by the second stage-driving portion 320 of the stage-driving device 300, and the first and second stages are relatively moved closer to each other with their panel element holding surfaces opposed, or with the surfaces to be adhered of the panel elements c1, c2 held by the stages 100 and 200' in opposed positions.

Until then, the exhausting device should have started the discharge of air for pressure reduction to adjust the air pressure in the airtight chamber 600 to a specified level (20 Pa to 30 Pa) lower than the atmospheric pressure. The reduction of pressure in the chamber 600 can be performed at any stage if it is before the next step (6) and if it is not problematic.

(6) The first and second panel elements c1, c2 are contacted under a specified pressure P1 by the second stage-driving portion 310 of the stage-driving device 300 initially partially (in ends thereof in this example) as pressed by the convex curved surface 220a' of the elastic pad 220', and are pressure-spliced gradually extending the pressure-spliced area toward the other end while slightly deforming the rubber portion of the elastic pad 220' with the convex curved surface and discharging the air. In this way, the first and second panel elements are fixed and temporarily adhered partially or all over the entire region.

(7) While maintaining the air pressure at a low level in the airtight chamber 600, the second stage 200' is more pressed under a second pressure (pressure P2>P1) by the second stage-driving portion 320. Therefore the first and second panel elements are pressure-spliced all over the entire region when the second pressure P2 higher than the first pressure P1 is applied and are permanently adhered as interposed between the two stages 100, 200'. Thus, the R and G panel elements are firmly adhered together.

By employing such first pressure and the second pressure higher than the former, the two panel elements can be adhered as kept from displacement and as precisely and firmly positioned.

After adhering the two panel elements, the apparatus shuts off the operation of the exhausting device (not shown)

connected to the chamber 600 for discharging the air from the chamber and the operation of vacuum suction by the panel element-holding device 210', and the second stage 200' is ascended for return to the initial location, and the first stage 100 holding the adhered panel elements is returned to the initial location Q1.

The panel elements thus obtained by adhering the R and G panel elements is taken as a first panel element c1 and the B panel element to be adhered next is taken as a second panel element c2. The B panel element is adhered to the adhered panel elements by substantially repeating the foregoing steps (1) to (7).

When the first stage 100 holding the adhered panel elements is returned to the location Q1, the step (1) may be considered to have been partially carried out. In this way, a display panel A comprising layered R, G, B panel elements is produced.

In the producing apparatus shown in FIGS. 30 and 33, a pneumatic drive may be employed as a stage drive by the second stage-driving portion 320, but hydraulic and like drive means can be used. An eccentric cam or like means can be also used as the second stage-driving portion.

In the producing apparatus shown in FIG. 30, the airtight chamber 600 and an exhausting device for exhausting the air from or reducing the pressure in the chamber may be provided instead of or in combination with the exhausting device 500 to discharge the air, to reduce the pressure, from between the stages 100,200. When the airtight chamber 600 is provided in the producing apparatus shown in FIG. 30, any means and devices may be provided outside the chamber 600 if their provision therein is improper. Although the provision of exhausting devices 113, 213 and pneumatic circuit 322 in the airtight chamber is shown in FIG. 30, actually they are provided outside of the chamber 600.

[F] Method for Adhering an Adhesive Sheet and a Method for Adhering Plates Relating to FIGS. 36 to 44

According to the method for adhering an adhesive sheet and the method for adhering plates described below, an adhesive sheet can be adhered to a plate, and a pair of plates can be adhered to each other, without inclusion of air bubbles. Description is given below to first and second embodiments of the methods with reference to FIGS. 36 to 44.

First Embodiment

In this embodiment, specific examples are described in which a liquid crystal cell is fixed to a polarizing plate via an adhesive sheet in producing a liquid crystal display element. However, the embodiment can be applied to all cases where two plates are adhered to each other using an adhesive sheet.

Figure 36:
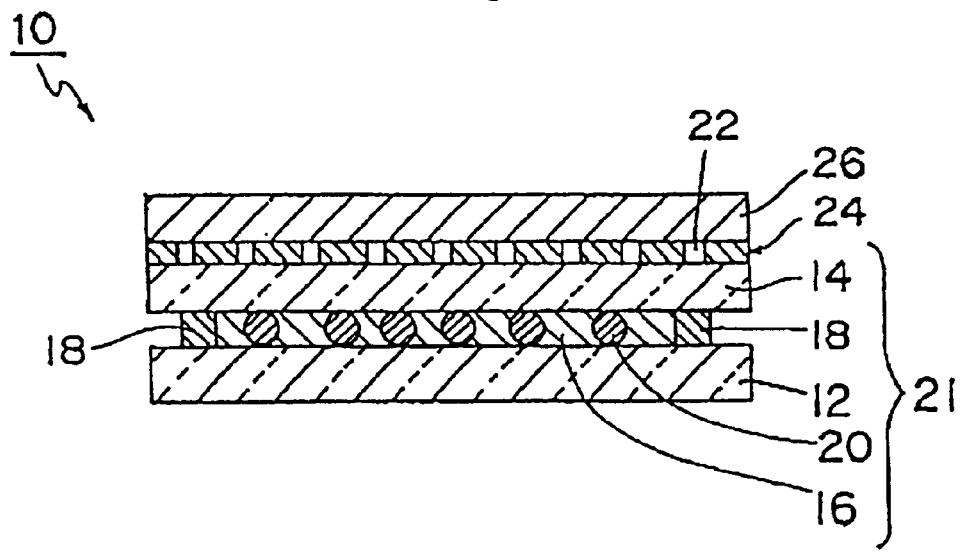
FIG. 36 is a schematic section view of another example of a liquid crystal display element (panel).

FIG. 36 is a schematic section view of a liquid crystal display element in which a polarizing plate is fixed to a liquid crystal cell by the fixing method according to the first embodiment.

A liquid crystal display element 10 has a lower substrate 12 made of a transparent material (such as glass), an upper substrate 14 made of a transparent material and a liquid crystal 16 interposed between the substrates 12, 14.

Electrodes (not shown) are formed on the opposed surfaces to be fixed of the substrates 12, 14. The substrates 12, 14 are fixed to each other with an adhesive material 18 continuously deposited along the peripheral portions of the substrates. The adhesive material 18 is also used as a seal material to enclose the liquid crystal 16 in the liquid crystal display element 10. The liquid crystal 16 contains spherical spacers 20 of specified size (e.g. 5 $\mu$m in outer diameter) which serve to keep the space between the lower and upper substrates 12, 14 at a specified distance. The structure comprising these components as a whole is hereinafter called a liquid crystal cell 21.

Figure 37:
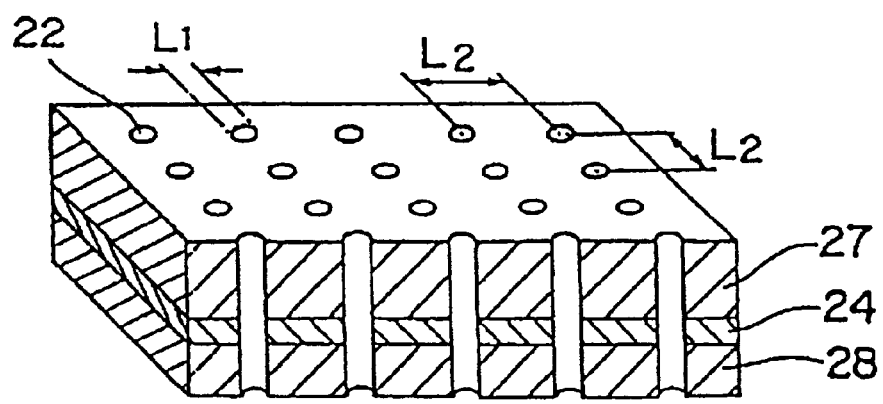
FIG. 37 is a perspective view of an adhesive sheet having through-holes which is used for adhering a liquid crystal cell of the liquid crystal display element of FIG. 36 to a polarizing plate.

A polarizing plate 26 is fixed, on the upper substrate 14, via an adhesive sheet 24 having a plurality of fine through-holes 22. The adhesive sheet 24 have separators 27, 28 on both sides thereof before use as shown in FIG. 37. Generally through-holes are circular apertures which are formed by boring the adhesive sheet 24 still retaining the separators 27, 28 by e.g., an excimer laser or a press.

The apertures 22 have a diameter L1 of 50 $\mu$m or less, preferably 30 $\mu$m which are so small in diameter to make the apertures unnoticeable. However, the apertures should have a diameter of 5 $\mu$m or larger which is sufficient to allow the air bubbles to pass through the apertures 22 and to prevent clogging thereof. Further the apertures 22 are formed properly at a number density of 10 holes/cm$^2$ or more. At a number density of less than 10 holes/cm$^2$, the air bubbles can not sufficiently pass through the apertures 22. The adhesive sheet has a thickness preferably in the range of about 5 $\mu$m to about 100 $\mu$m. If it has a thickness of less than 5 $\mu$m, the inclusion of contaminant is noticeable, whereas at a thickness of more than 10 $\mu$m, clogging is likely to occur.

Figure 38:
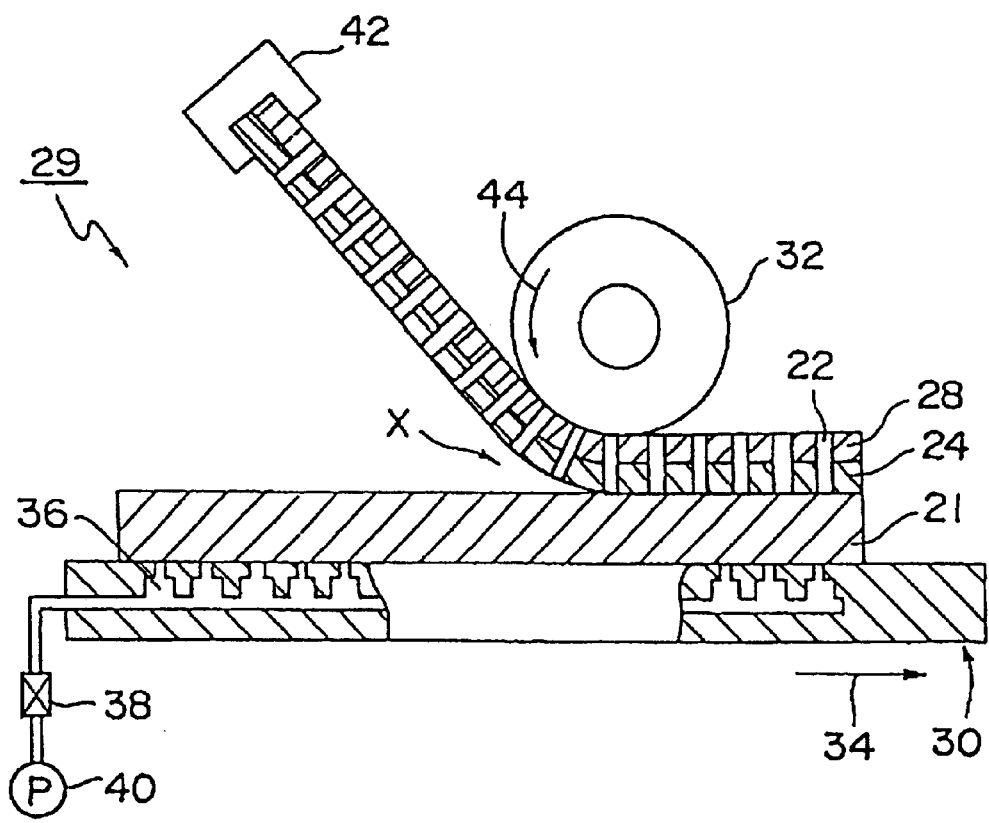
FIG. 38 is a section view of a device for adhering the adhesive sheet of FIG. 37 to a liquid crystal cell.
Figure 39:
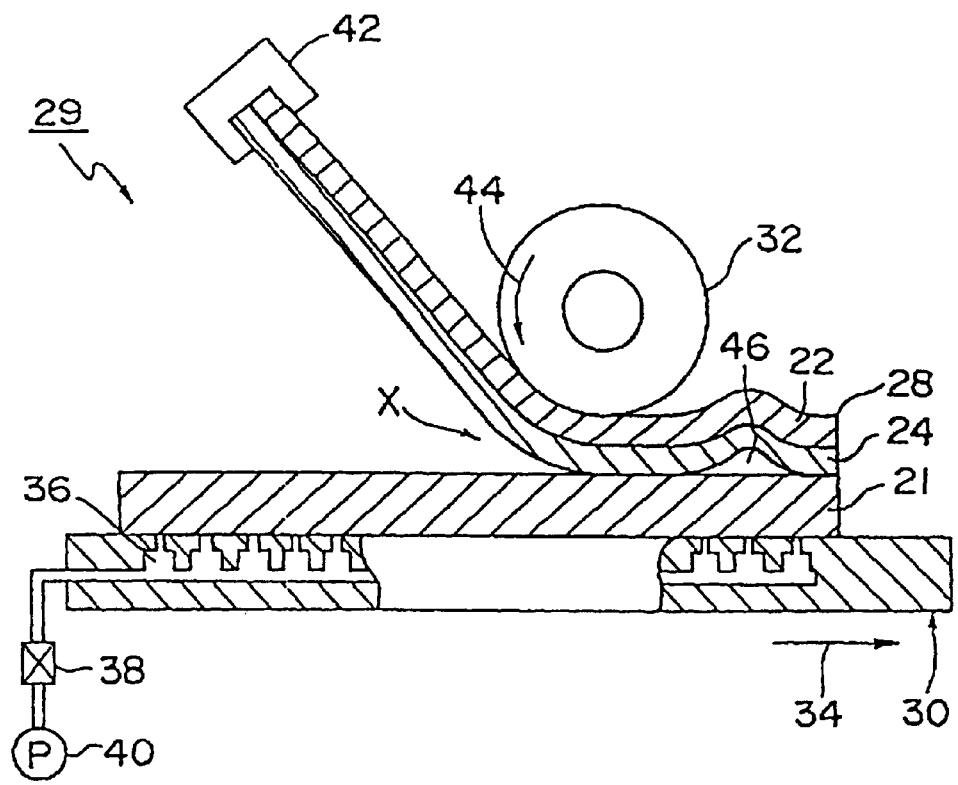
FIG. 39 is a section view showing air bubbles created in adhering the adhesive sheet to a liquid crystal cell with use of the adhering device of FIG. 38 when the through-holes are not formed in the adhesive sheet.

FIG. 38 is a section view of a fixing device for adhering the adhesive sheet 24 to a liquid crystal cell 21. The fixing device 29 has a table 30 for setting the liquid cell 21 thereon, a pressing roller 32 disposed above the table 30 and having a rotation axis in parallel with the surface of the table 30. The table 30 is adapted to slide in an arrow direction 34.

The table 30 has a plurality of perforations 36 formed in the surface portion of the table 30 holding the liquid crystal cell 21 thereon in order to suck and hold the liquid crystal cell 21 under a negative pressure. These perforations are all in communication with each other in the table 30 and is connected to a vacuum pump 40 via an electromagnetic valve 38.

One end portion of the adhesive sheet 24 (the end on the left side in the drawing) is raised and held by a movable holding member 42. When the adhesive sheet 24 is pressed against the liquid crystal cell 21 by the pressing roller 32, there is specified an angle between the adhesive sheet 24 and the liquid crystal cell 21 which is formed at a position immediately before the position in which the former has becomes just fixed to the latter. The angle can be any of 0 to 180 degrees. The holding member 42 is adapted to properly pull the end portion of the adhesive sheet to prevent loosening of the adhesive sheet 24.

Next, description is given to the method for adhering the adhesive sheet 24 (and the polarizing plate 26) to the liquid crystal cell 21. First, a separator 27 is removed from one side of the adhesive sheet 24 in FIG. 37. Then the liquid crystal cell 21 is sucked and held on the table 30 as shown in FIG. 38 by opening the electromagnetic valve 38. Thereafter in this state, the other end portion of the adhesive sheet 24 (the end portion the right side in the drawing) with the adhesive surface of the sheet 24 facing down is superimposed on end portion of the liquid crystal cell 21. The table 30 is slid in the arrow direction 34 while said end portion of the adhesive sheet 24 (and the separator 28) is raised in a manner to bend the adhesive sheet 24. At that time, the pressing roller 32 is rotated in the depicted arrow direction 44, pressing the adhesive sheet 24 against the liquid crystal cell 21 so that the adhesive sheet 24 is superimposed on the liquid crystal cell 21 all over the entire region. Optionally the table 30 may be fixedly disposed instead of moving the table 30 relative to the pressing roller 32 and the pressing roller 32 may be moved and rotated in a direction reverse to the direction 34. Optionally the table 30 and the roller 32 may be moved, each in opposed directions.

When through-holes 22 are not formed in the adhesive sheet 24 as conventionally done, air bubbles 24 are likely to remain between the adhesive sheet 24 and the liquid crystal cell 21 in fixing the adhesive sheet 24 to the liquid crystal cell 21. On the other hand, in this example, even if the air bubbles are likely to remain, they would escape from the through-holes 22 when the adhesive sheet 24 is pressed downward by the pressing roller 32 (even if it is not pressed, the air bubbles would escape to some extent through the through-holes 22 in superimposing the adhesive sheet 24 over the liquid crystal cell 21). The fine apertures 22 can be collapsed by applying an higher pressure, thereby becoming unnoticeable. The volume of the apertures 22 is preferably reduced to 50% or more under a pressing pressure applied by the pressing roller 32. If the reduction of volume is less than 50%, the apertures 22 would fail to become desirably small after application of pressure and may be visually seen, when the original diameter of the apertures exceeds 30 $\mu$m or more, namely is comparably large.

After fixing the adhesive sheet 24 to the liquid crystal cell 21, the separator 28 is removed from the adhesive sheet 24. Then, the polarizing plate 26 (FIG. 36) is fixed to the adhesive sheet 24 under a pressing pressure applied by the pressing roller, e.g. in the same manner as in fixing the adhesive sheet 24 to the liquid crystal cell 21 (the polarizing plate 26 being a film substrate in this embodiment).

Figure 40:
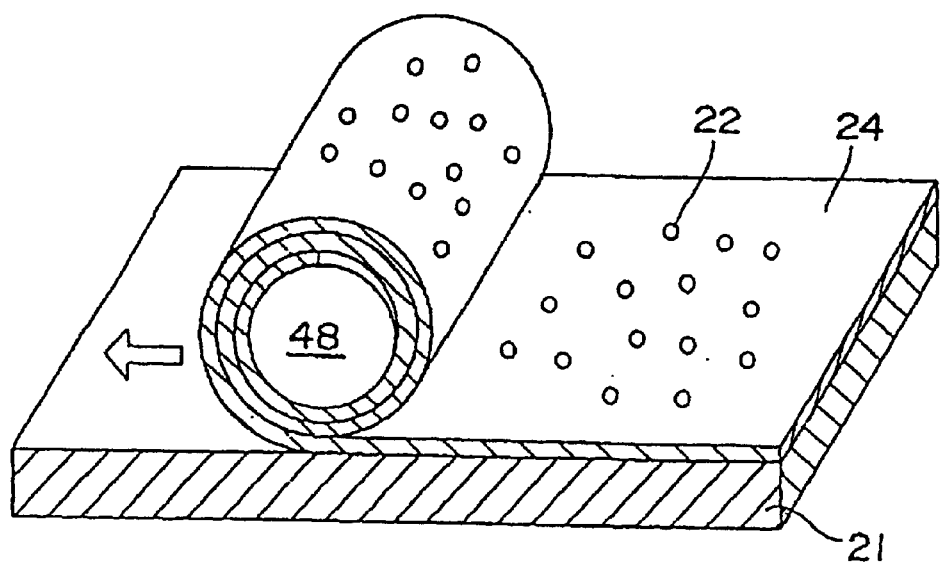
FIG. 40 is a perspective view showing a rolled adhesive sheet being adhered to a liquid crystal cell.

FIG. 40 shows a modified example of this embodiment. Stated more specifically, an adhesive sheet 24 having a separator (not shown) only on one side is bored to form fine apertures. The adhesive sheet 24 is wound into a roll around a cylindrical core 48 circular in section in a way to bring the adhesive surface to the outside (so that the separator lies on the upper surface of the adhesive sheet 24 in fixing the adhesive sheet 24 to the liquid crystal cell 21). The adhesive sheet 24 can be adhered to the liquid crystal cell 21 by rolling the roll over the liquid crystal cell 21.

This structure of the rolled adhesive sheet is effective in reducing the amount of waste since a separator is fixed on one side. The adhesive sheet 24 is a roll by itself and eliminates a need to use a pressing roll in adhering the adhesive sheet to the cell. One end of the adhesive sheet 24 need not be held by the holding member 42 (FIG. 38) or the like to keep the adhesive sheet 24 out of contact with the liquid crystal cell 21 as in said example until they come to the position immediately before fixing them (position X of FIG. 38).

Given below are specific examples illustrating the first embodiment and comparative examples.

EXAMPLE 1

There were provided a liquid crystal cell having a display region, 200 mm×300 mm (a region wherein the liquid crystal 16 was enclosed by an adhesive material 18 in FIG. 36) and adhesive double-coated tape having the same external shape as the liquid crystal cell (Sekisui Chemical Co., Ltd.). The tape comprises an acrylic adhesive sheet having a thickness of 25 $\mu$m as interposed between two separators made of PET 38 $\mu$m and 25 $\mu$m in thickness. Fine apertures having a diameter (L1) of 30 $\mu$m and spaced away from each other at a distance (L2) of 300 $\mu$m were bored in the form of a lattice-like pattern (FIG. 37) over the entire surface of the tape using excimer laser.

Then, one of the separators was removed from the tape, and the tape with the adhesive surface facing down was disposed on the liquid crystal cell held on the table by vacuum suction and fixed to the liquid crystal cell at one end portion (end portion on the right side in FIG. 38). Then the other end portion of the tape (end portion on the left side in FIG. 38) was pulled with a constant force so as to bend the tape while the roller was rolled from the fixed end portion to fix the adhesive sheet to the liquid crystal cell. The angle was kept at 20 degrees between the adhesive sheet and the liquid crystal cell at the position (position X in FIG. 38) immediately before the position in which the former had become just fixed to the latter. The pressure of the roller is about $2.0 \times 10^4 \text{N/m}^2$. Finally, the separator was separated from the upper side of the adhesive sheet and a film-like polarizing plate was fixed to the adhesive sheet under a pressing pressure applied by the roller.

The foregoing fixing method left no air bubbles between the liquid crystal cell and the adhesive sheet. The liquid crystal display panel element thus produced had no apertures which can be visually seen and possessed good display performance.

EXAMPLE 2

Fine apertures having a diameter (L1) of 50 $\mu$m and spaced away from each other at a distance (L2) of 300 $\mu$m were bored in the form of a lattice-like pattern (FIG. 37) over the entire surface of the tape, which is the same as in example 1, using a press device in place of excimer laser. The adhesive sheet was adhered to the liquid crystal cell in the same manner as in Example 1.

Then, to make the apertures unnoticeable by collapsing them, the adhesive sheet was pressed under a pressure of about $1.0 \times 10^5 \text{N/m}^2$ by the roller all over the entire surface. Then, one of the separators was removed from the upper side of the adhesive sheet, and a polarizing plate was fixed to the adhesive sheet in the same manner as in Example 1.

The liquid crystal display panel element thus produced had no apertures which can be visually seen because the apertures were reduced to small size by collapsing. The liquid crystal display panel element thus produced had good display performance.

Comparative Example 1

A liquid crystal display panel element was produced in substantially the same manner as in Example 2. However, the adhesive sheet was not pressed by a roller. The liquid crystal display panel element thus produced had apertures which can be visually seen and possessed low display performance.

Second Embodiment

Figure 41A:
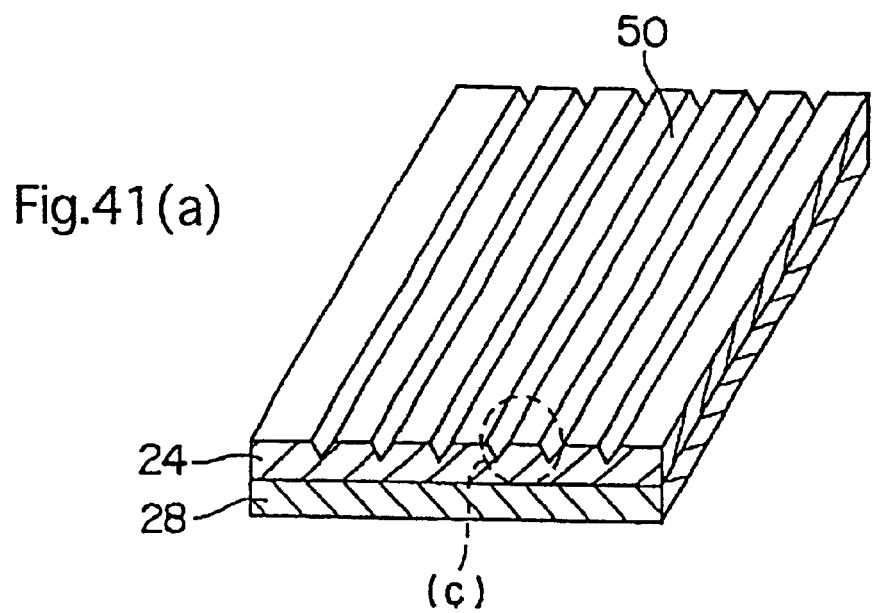
FIG. 41(a) is a perspective view of an adhesive sheet having grooves extending in a specific direction.
Figure 41B:
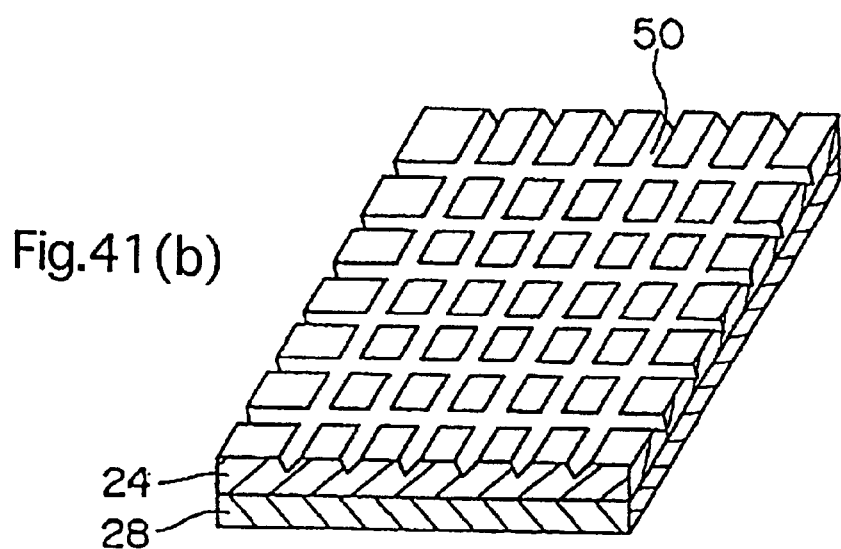
FIG. 41(b) is a perspective view of an adhesive sheet having lattice-like grooves.
Figure 41C:
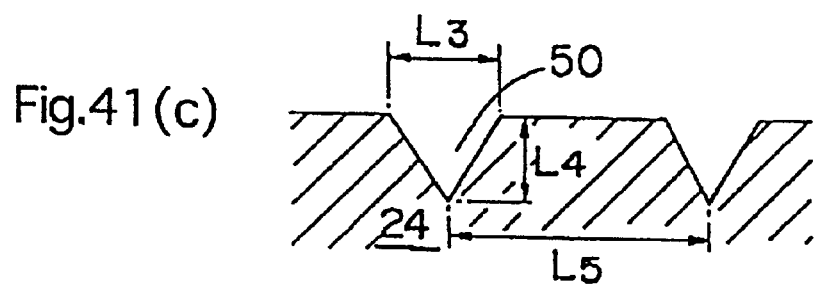
FIG. 41(c) is an enlarged section view of the grooves.

In the adhering method according to the second embodiment, grooves are formed along the surface of the adhesive sheet 24 instead of through holes so that air bubbles are allowed to escape through the grooves. Stated more specifically, a plurality of grooves 50 are formed to extend in a specified direction from one end (an end on the upper side in the drawing) of the sheet 24 to the other end (an end on the lower side in the drawing) thereof as shown in FIG. 41(*a*). The patterns of grooves 50 are not limited to those shown in FIG. 41(*a*) and can be any, as stated later, insofar as they have a structure in which air bubbles can escape along the grooves 50 to the outside of the sheet 24. For example, the patterns may be in the lattice form as shown in FIG. 41(b). The section of the grooves 50 need not be triangular as shown in FIGS. 41(a) or 41(b). An oblong shape and other shapes may be employed. For example, when the sectional shape of the grooves 50 is triangular, the grooves 50 have a width (L3) and a depth (L4) (FIG. 41(c)) of 50 μm or less, respectively, preferably 30 μm which is required to make the grooves unnoticeable, and at least 5 μm or more is required to allow the air bubbles to sufficiently escape along the grooves 50 as described later.

Figure 42:
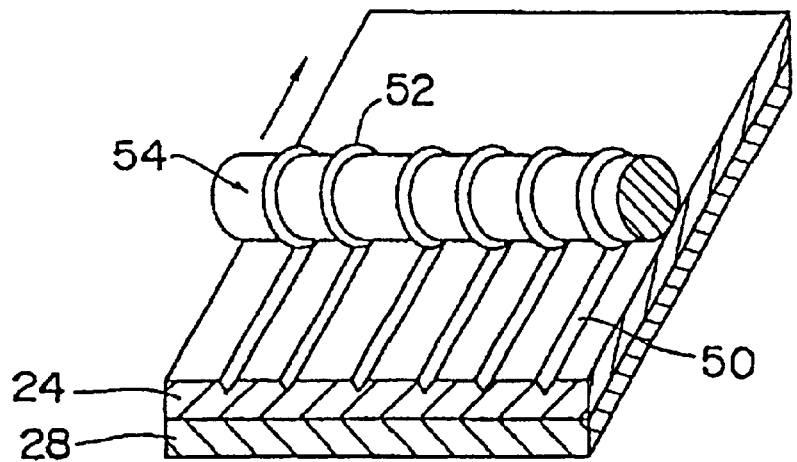
FIG. 42 is a perspective view showing an example of means for forming the grooves in an adhesive sheet.

To form grooves 50 in the adhesive sheet 24, a roller 54 having a projection 52 in the desired shape on an outer peripheral surface as shown in FIG. 42 is rolled on an adhesive sheet 24 from which at least a separator 27 (FIG. 37) is removed on one side. (When grooves 50 are formed in a lattice pattern as shown in FIG. 41(b), the roller 54 is rolled twice, i.e. in directions vertical to each other.) Depending on the materials of the separator 27, grooves can be formed on the adhesive sheet 24 with the separators.

Figure 43:
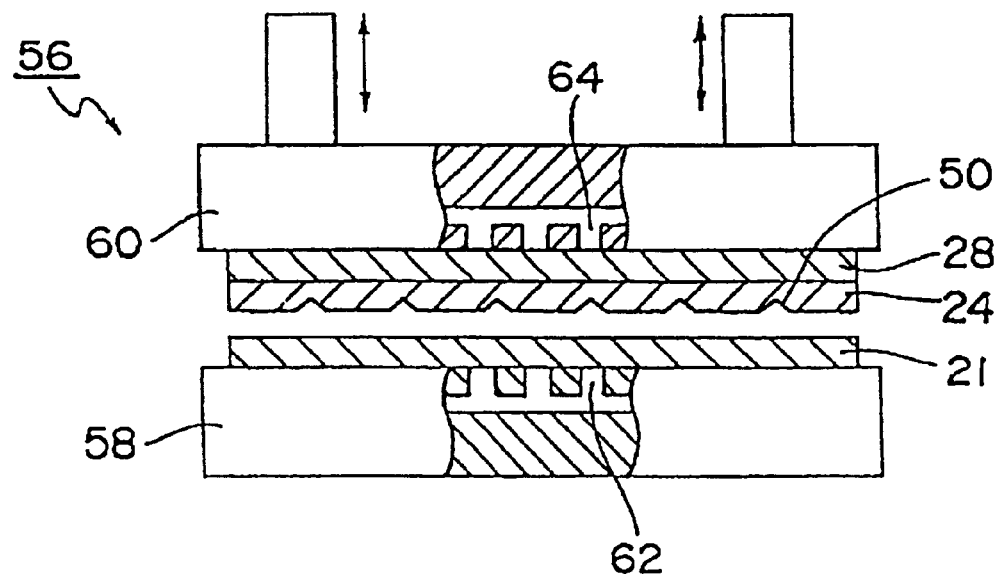
FIG. 43 is a section view of a device for adhering the adhesive sheet of FIG. 41(a) to a liquid crystal cell at one time.

FIG. 43 is a section view of a device 56 for adhering the adhesive sheet 24 to the liquid crystal cell 21 all over the entire region at one time. The fixing device 56 comprises a lower stage 58 for sucking and holding a liquid crystal cell 21; and an upper stage 60 provided above the lower stage 58 in parallel therewith to suck and hold the adhesive sheet 24 (and a separator 28). The upper stage 60 is movable in an arrow direction in the drawing (a direction vertical to the upper surface of the lower stage 58). The lower stage 58 has a plurality of perforations 62 for suction of air as in the table 30 in FIG. 38. The perforations 62 are connected to a vacuum pump (not shown) via an electromagnetic valve (not shown). According to this structure, the upper stage 60 can hold and release the adhesive sheet 24 by opening and closing the electromagnetic valve.

Figure 44:
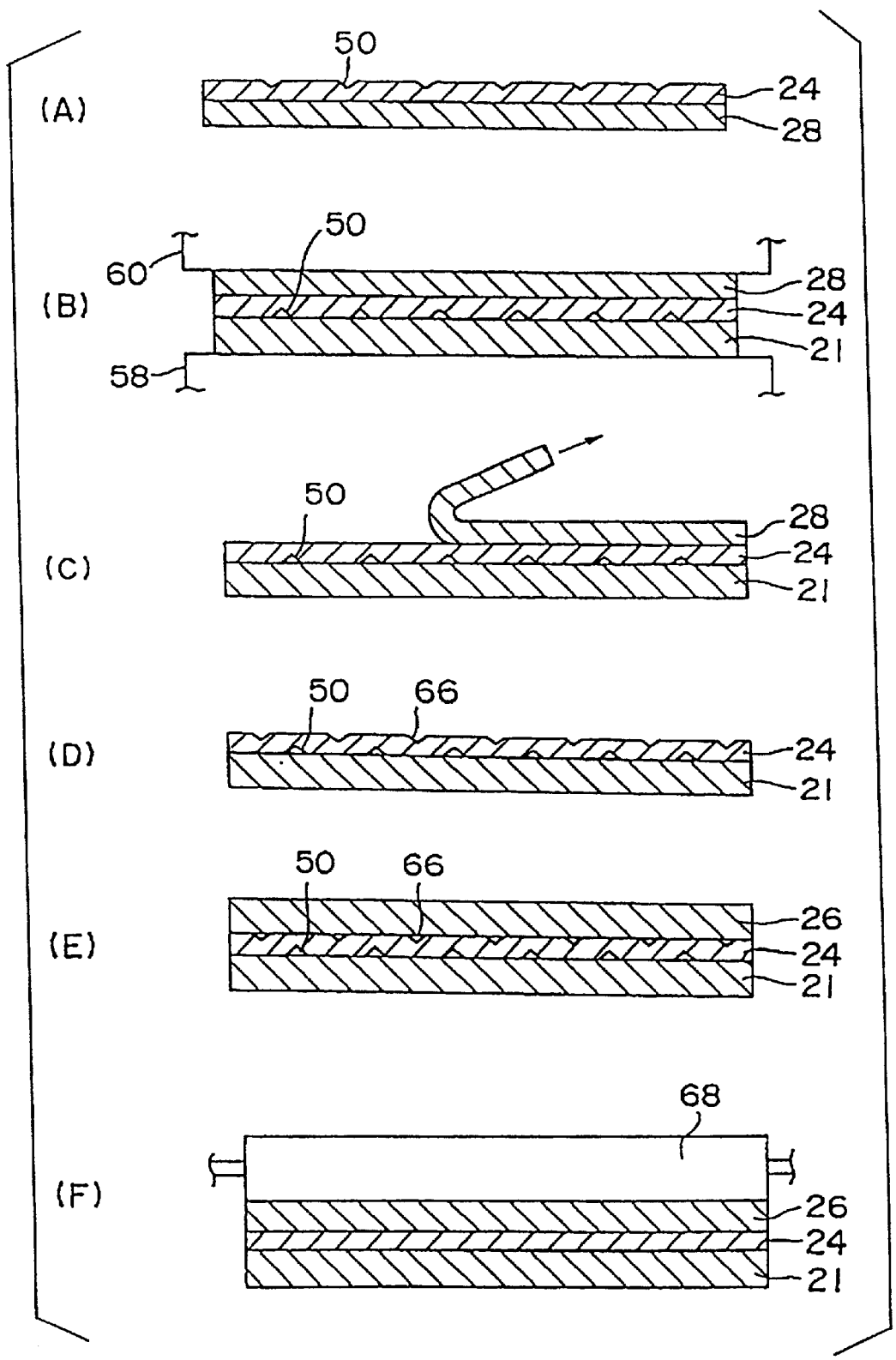
FIG. 44 is a view showing the step of adhering a liquid crystal cell to a polarizing plate with an adhesive sheet interposed between them.

Next, referring mainly to FIG. 44, a method for adhering the adhesive sheet 24 and the polarizing plate 26 to a liquid crystal cell 21 is described. First, a separator 27 is removed from one side of the adhesive sheet 24 in FIG. 37, and a plurality of grooves 50 are formed (step (A) of FIG. 44) on the adhesive sheet 24 by the method shown in FIG. 42.

The grooves 50 are formed on the adhesive sheet 24 from one end to the other end in the step (A) of FIG. 44. Using the fixing device 56 (FIG. 43), the adhesive sheet 24 with the surface having grooves facing down is held by the upper stage 60, and the upper stage 60 is descended, whereby the adhesive sheet 24 is adhered to the liquid crystal cell 21 sucked and fixed to the lower stage 58 at one time (the step (B) of FIG. 44). Then, after separation of the adhesive sheet 24 from the upper stage 60, the separator 28 is removed from the adhesive sheet 24 (the step (C) of FIG. 44). A plurality of grooves 66 are formed on the adhesive sheet 24 from which the separator 28 is removed (the step (D) of FIG. 44). These grooves 66 are formed on the adhesive sheet 24 from one end to the other end in the step (D) of FIG. 44.

Further a polarizing plate 26 is adhered to the adhesive sheet 24 (the step (E) of FIG. 44).

Finally the plate 26 is pressed down by rolling the pressing roller 68, e.g. in parallel with the direction of formation of grooves, whereby air bubbles can escape through the grooves 50, 66 formed on the upper and lower surfaces. The pressure applied by the roller is suitably sufficient to destroy the grooves and to bring the adhesive sheet 24 into close contact with the liquid crystal cell 21 and the polarizing plate 26 (the step (F) of FIG. 44). The volume of grooves 50, 66 is preferably reduced to 50% or more due to the pressure applied by the roller. If the volume of grooves 50, 66 is reduced to less than 50%, the grooves would not sufficiently become small after application of pressure in the case of the original groove width being comparably as large as 30 μm or more, and can be visually seen. Hence, they are undesirable.

When grooves are formed on both sides of the adhesive sheet, the adhering operation can be conducted without inclusion of air bubbles, in the step of adhering the adhesive sheet 24 to the liquid crystal cell 21, and in the step of adhering various sheets or plates (polarizing plate 26, phase difference plate, touch panel, or protective sheet) to the adhesive sheet 24.

When grooves are formed only on one side of the adhesive sheet, a pressure may be applied by the roller prior to fixing the polarizing plate 26.

An example is given below to illustrate the second embodiment.

EXAMPLE 3

The tape in Examples 1 was used and one separator was separated from the tape. Grooves in the form of a lattice were formed by rolling a roller having projections as shown in FIG. 42 on the tape twice, i.e. in directions vertical to each other. The lattice-like grooves had a width (L3) of 10 μm and a depth (L4) of 5 μm, and a distance (L5) between adjacent grooves of 300 μm (FIG. 4(c)). The adhesive sheet with the surface having grooves facing down was adhered to the same liquid crystal cell as used in Example 1 at one time. Then, the other separator was removed from the upper side of the adhesive sheet. Lattice-like grooves were formed by rolling the projected roller on the upper side of the sheet to produce grooves of the same size as those on the underside. Thereafter the same polarizing plate as used in Example 1 was fixed to the adhesive sheet at one time. The grooves were destroyed and the adhesive sheet was closely contacted with the liquid crystal cell and the polarizing plate by gradually rolling the roller on the plate under a pressure of about $1.0 \times 10^5 N/m^2$.

The liquid crystal display panel element produced in this way did not contain air bubbles, had no grooves which can be visually seen and possessed good display performance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for producing a display panel for display of images, the method comprising the steps of:

opposing a first panel element and a second panel element, each having at least one display layer of a light modulating layer, including positioning the first and second panel elements relatively to each other (panel-opposing step); and progressively adhering, after the panel-opposing step, the first and second panel elements from a starting position with an adhesive material (panel-adhering step).

2. The method according to claim 1, wherein the panel-opposing step includes the step of positioning the first panel element and causing a first stage to hold the first panel element and the step of positioning the second panel element and causing a second stage to hold the second panel element.

3. The method according to claim 1, wherein the starting position is located on ends of the first and second panel elements.

* * * * *